United States Patent
Weisberger et al.

(10) Patent No.: US 9,691,131 B1
(45) Date of Patent: Jun. 27, 2017

(54) SYSTEM AND METHOD FOR IMAGE RESIZING

(71) Applicant: Knapsack, LLC, Atlanta, GA (US)

(72) Inventors: Matt Weisberger, Marietta, GA (US);
John M. Mann, Roswell, GA (US);
Steven Alan Googe, Canton, GA (US);
Ryan Michael Bifulco, Smyrna, GA (US); Jim Axelsson, Woodstock, GA (US)

(73) Assignee: Knapsack, LLC, Atlanta, GA (US)

( * ) Notice: Subject to any disclaimer, the term of this patent is extended or adjusted under 35 U.S.C. 154(b) by 0 days.

(21) Appl. No.: 15/252,546

(22) Filed: Aug. 31, 2016

(51) Int. Cl.
*G06T 3/40* (2006.01)
*G06F 3/0484* (2013.01)

(52) U.S. Cl.
CPC ............ *G06T 3/40* (2013.01); *G06F 3/04842* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 2002/0000998 A1* | 1/2002 | Scott ................ | G06F 17/30274 345/667 |
| 2004/0073873 A1* | 4/2004 | Croney ................ | G06T 3/4092 715/273 |
| 2012/0041822 A1* | 2/2012 | Landry ............. | G06Q 30/0261 705/14.58 |
| 2012/0050334 A1* | 3/2012 | Velthoven ............ | G06T 3/4092 345/660 |
| 2012/0266189 A1* | 10/2012 | Zaslavsky ............. | G06Q 30/02 725/32 |

OTHER PUBLICATIONS

PhpThumb( ) The Php Thumbnail creator; downloaded Apr. 1, 2016, available at http://phpthumb.sourceforge.net/.
Batch script to create multilple sizes on one image; downloaded Apr. 1, 2016, available at http://www.imagemagick.org/discourse-server/viewtopic.php?t=20784.

* cited by examiner

*Primary Examiner* — Michelle Chin
(74) *Attorney, Agent, or Firm* — Gordon & Jacobson, P.C.

(57) ABSTRACT

An image processing method and corresponding system stores in computer memory image size data representing a plurality of image sizes. First user interface controls are displayed on a display device to allow a user to specify a source image. The image size data stored in computer memory is used to produce data representing a plurality of transformed images corresponding to the source image with sizes that correspond to the image sizes represented by the image size data. A display window is displayed on the display device where the data representing the plurality of transformed images is used to simultaneously display representations of the plurality of transformed images in a particular area of the display window for viewing by the user.

30 Claims, 40 Drawing Sheets

$TI_{height}$ (in pixels) $\alpha$ $2(TI_{ym} - TI_{yc})$ $TI_{width}$ (in pixels) $\alpha$ $2(TI_{xm} - TI_{xc})$ $O_{height}$ (in pixels) $\alpha$ $2(O_{ym} - O_{yc})$ $O_{width}$ (in pixels) $\alpha$ $2(O_{xm} - O_{xc})$

SYSTEM AND METHOD FOR IMAGE RESIZING

BACKGROUND

1. Field

The present disclosure relates to systems and methods that resize digital images.

2. State of the Art

Online services and software applications provide functionality that resize a single image to a user-specified size. Such services and applications also provide additional image processing that is performed in conjunction with the resizing, such as converting the image from one format to another, making the background of the image transparent, and compressing the image.

Such services and software applications are useful but are cumbersome to use and inefficient for resizing a single image to multiple different sizes at they require repeating the entire resizing workflow (including the user specifying the source image and the desired image size) for each one of the multiple different sizes.

SUMMARY

An image processing method is provided that stores in computer memory image size data representing a plurality of image sizes. First user interface controls are displayed on a display device to allow a user to specify a source image. The image size data stored in computer memory is used to produce data representing a plurality of transformed images corresponding to the source image with sizes that correspond to the image sizes represented by the image size data. A display window is displayed on the display device. The data representing the plurality of transformed images is used to simultaneously display representations of the plurality of transformed images in a particular area of the display window for viewing by the user.

The representations of the plurality of transformed images that are displayed in the particular area of the display window can be selected from thumbnails of the plurality of transformed images and the plurality of transformed images themselves.

The image processing method can further include storing in computer memory the data representing the plurality of transformed images.

The display window can also display a representation of the source image together with the representations of the plurality of transformed images. The representation of the source image can be selected from a thumbnail of the source image and the source image itself. The representation of the source image can be displayed adjacent the particular area of the display window.

In one embodiment, the representations of the plurality of transformed images can be simultaneously displayed in the particular area of the display window in an automatic manner upon the user specifying the source image.

In still another embodiment, the first user interface controls can allow the user to specify a plurality of source images, and the image size data stored in computer memory can be used to produce data representing a plurality of transformed images for each one of the plurality of source images with sizes that correspond to the image sizes represented by the image size data. The particular area of the display window can simultaneously display representations of the plurality of transformed images corresponding to each one of the plurality of source images, and the display window can display representations of the plurality of source images together with the representations of the plurality of transformed images.

In yet another embodiment, the plurality of image sizes can correspond to sizes for at least one publisher or channel that is used by a particular user-selected advertiser.

The image processing method can further include second user interface controls displayed on the display device that allows the user to edit a user-selected one of the plurality of transformed images displayed in the particular area of the display window.

The image processing method can further include third user interface controls displayed on the display device that allows the user to specify at least one graphic item for overlay on at least one of the plurality of transformed images displayed in the particular area of the display window. The display window can also display a representation of the at least one graphic item together with the representations of the plurality of transformed images.

In one embodiment, a graphic item can be simultaneously overlaid on the plurality of transformed images displayed in the particular area of the display window in an automatic manner upon the user specifying the graphic item.

The image processing method can further include fourth user interface controls displayed on the display device that allows the user to overlay a graphic item specified by the user on a user-selected one of the plurality of transformed images displayed in the particular area of the display window. For example, the fourth user interface controls can involve drag and drop operations of a user input device from a representation of a graphic item to a representation of the user-selected one of the plurality of transformed images displayed in the particular area of the display window.

In another embodiment, the fourth user interface controls can allow the user to simultaneously overlay a graphic item specified by the user on the plurality of transformed images displayed in the particular area of the display window. For example, the fourth user interface controls can involve drag and drop operations of a user input device from a representation of a graphic item to a part of the particular area that is not occupied by the display of any representation of the plurality of transformed images.

The image processing method can further include fifth user interface controls displayed on the display device that allows the user to edit a graphic item overlaid on at least one of the plurality of transformed images displayed in the particular area of the display window.

In one embodiment, the fifth user interface controls can allow the user to edit properties of a graphic item. Some or all of the properties of the graphic item that are edited by the user can be applied globally to the display of the graphic item as overlaid on the plurality of plurality of transformed images displayed in the particular area of the display window. Alternatively, some or all of properties of the graphic item that are edited by the user can be selectively applied to only those transformed images displayed in the particular area of the display window where the corresponding local overlay graphic property has not been changed.

In another embodiment, the fifth user interface controls can allow the user to adjust size and/or position of a graphic item overlaid on a user-selected one of the plurality of transformed images displayed in the particular area of the display window.

In still embodiment, the fifth user interface controls can allow the user to simultaneously adjust position of a graphic item overlaid on the plurality of transformed images displayed in the particular area of the display window. For example, the fifth user interface controls can include a grid of predefined overlay positions that are selectable by the user.

In yet another embodiment, at least one attribute of the graphic item (such as file type extension and minimum size in pixels) can be dictated by advertiser-specific settings.

The image processing method can further include sixth user interface controls displayed on the display device that allows the user to specify at least one text item for overlay on at least one of the plurality of transformed images displayed in the particular area of the display window. The display window can display a representation of the at least one text item together with the representations of the plurality of transformed images.

In one embodiment, a text item can be simultaneously overlaid on the plurality of transformed images displayed in the particular area of the display window in an automatic manner upon the user specifying the text item.

The image processing method can further include seventh user interface controls displayed on the display device that allow the user to overlay a text item specified by the user on at least one of the plurality of transformed images displayed in the particular area of the display window.

In one embodiment, the seventh user interface controls can allow the user to overlay a text item specified by the user on a user-selected one of the plurality of transformed images. For example, the seventh user interface controls can involve drag and drop operations of a user input device from a representation of the text item to a representation of the user-selected one of the plurality of transformed images displayed in the particular of the display window.

In another embodiment, the seventh user interface controls can allow the user to simultaneously overlay a text item specified by the user on the plurality of transformed images displayed in the particular area of the display window. For example, the seventh user interface controls can involve drag and drop operations of a user input device from a representation of the text item to a part of the particular area that is not occupied by the display of any representation of the plurality of transformed images.

The image processing method can further include eighth user interface controls displayed on the display device that allows the user to edit a text item for overlay on at least one of the plurality of transformed images displayed in the particular area of the display window.

In one embodiment, the eighth user interface controls can allow the user to edit properties of a text item (such as color, font family, font size, text box layout, opacity, blur, justification, and the text itself). Some or all of the properties of the text item that are edited by the user can be applied globally to the display of the text item as overlaid on the plurality of plurality of transformed images displayed in the particular area of the display window. Alternatively, some or all of properties of the text item that are edited by the user can be selectively applied to only those transformed images displayed in the particular area of the display window where the corresponding local overlay text property has not been changed.

In yet another embodiment, the eighth user interface controls can allow the user to adjust font size and/or position of a text item as overlaid on a user-select one of the plurality of transformed images displayed in the particular area of the display window.

In still another embodiment, the eighth user interface controls can allow the user to simultaneously adjust position of a text item as overlaid on the plurality of transformed images displayed in the particular area of the display window. For example, the eighth user interface controls can include a grid of predefined overlay positions that are selectable by the user.

In yet another embodiment, least one attribute of a text item (such as font family, font size, and color) can be dictated by advertiser-specific settings.

The image processing method can further include ninth user interface controls displayed on the display device that allows the user to filter the plurality of transformed images displayed in the particular area of the display window. The filter can involve selecting one or more online publishers or channels that support image sizes that belong to the plurality of image sizes represented by the stored image size data.

The image processing method can further include tenth user interface controls displayed on the display device that allows the user to copy or download one or more of the plurality of transformed images displayed in the particular area of the display window.

The image processing method can further include eleventh user interface controls displayed on the display device that allows the user to select a particular advertiser, wherein the plurality of transformed images displayed in the particular area of the display window corresponds to sizes for at least one publisher or channel that is used by the particular advertiser selected by the user.

The image processing method can be carried out by a client computing device in conjunction with a remote server. In one embodiment, at least part of the operations of the method can be embodied in a client-side script downloaded from the remote server to the client computing device for execution on the client computing device. In another embodiment, at least part of the operations of the method can be embodied in a server-side script or function executed by the remote server to the client computing device. The client computing device can execute an application (such as web browser) to carry out the method. In yet another embodiment, the image processing method can be carried out by a desktop application executing on a computing device.

Corresponding image processing systems are also described and claimed.

BRIEF DESCRIPTION OF THE DRAWINGS

FIGS. 3ZA and 3ZB are views of an exemplary graphical user interface that can be implemented by cooperation of the client computer device and the image resizer application component of the server of FIG. 1B as part of blocks 249 and 251 of the image resizing application program of FIGS. 2A to 2H according to an embodiment of the present disclosure.

FIG. 3ZC is a view of an exemplary graphical user interface that can be implemented by cooperation of the client computer device and the image resizer application component of the server of FIG. 1B as part of blocks 267 to 271 of the image resizing application program of FIGS. 2A to 2H according to an embodiment of the present disclosure.

DETAILED DESCRIPTION OF THE PREFERRED EMBODIMENTS

Figure 1A:
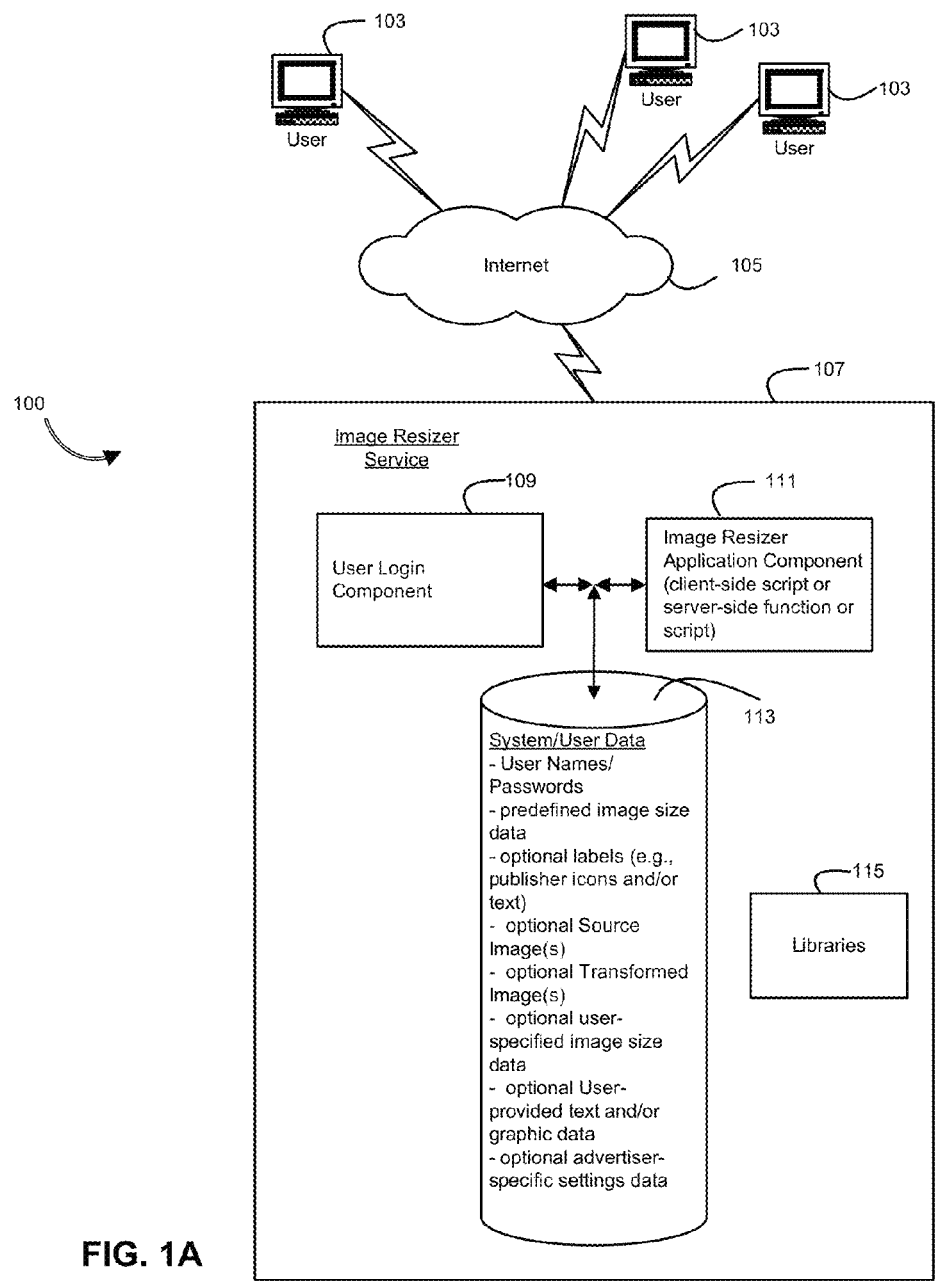
FIG. 1A is a schematic diagram of a system that can implement an image resizing application program according to an embodiment of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, well-known structures and components are shown in block diagram form in order to avoid obscuring the concepts of the subject technology.

As used herein, a "display window" is an area of one or more display screens that displays information for a specific program. A display window can optionally include a title bar along its top that describes the contents of the display window and a toolbar that contains user interface mechanisms (such as buttons or drop down lists). The display window can optionally be minimized, maximized or adjusted in size by user input operations. Furthermore, the location of the display window on the display screen(s) can optionally be manipulated by user input operations, such as drag and drop operations that slide the display window over the display screen(s).

As used herein, a "digital image" or "image" is a numeric representation of a two-dimensional image. Depending on whether the image resolution is fixed, it may be of vector-type or raster- or bitmapped-type.

As used herein, a "thumbnail" of an image or "image thumbnail" is a small image representation of a larger image.

As used herein, a "representation" of an image as displayed on a display device is a rendering of the image into pixel values for display on the display device.

As used herein, a "graphic item" is an image that is intended to be overlaid on another image.

As used herein, a "text item" is a string of text characters (that can include uppercase or lowercase letters as well as punctuation and other symbols) that is intended to be overlaid on an image.

As used herein, "simultaneously displaying" or "simultaneous display" of a plurality of graphical elements (such as a multiple transformed images with or without one or more text items and/or graphic items overlaid thereon) is a display of the plurality of graphical items that occurs at or near the same time (within an interval of time of 100 milliseconds or less).

The subject disclosure describes a digital image resizing application program that provides a user with the ability to transform the size (in pixels) of one or more digital images (or source image(s)) to produce multiple digital images (or transformed images) that conform to a predefined set of sizes (in pixels) or subset thereof. The transformation of a source image can involve reducing the physical size of the source image by decreasing the number of pixels that the source image contains, which typically involves cropping or interpolation. The transformation of a source image can also involve enlarging the physical size of the source image by increasing the number of pixels that the source image contains, which typically involves interpolation such as a linear interpolation, cubic interpolation or other suitable interpolation method. The predefined set of sizes of the transformed images can include image sizes that conform to sizes supported by a number of well-known online publishers, such as popular online social networking services including Facebook, LinkedIn, Instagram, Pinterest, Tumblr, and Twitter. The predefined set of sizes of the transformed images can also be customized by the user. The multiple transformed images produced by the application (and/or thumbnails of such transformed images) can be simultaneously displayed together with associated labels in an area or region (referred to herein as a "TI area") of a display window. The labels can include text and/or publisher logos that are associated with respective sizes of the transformed images in order to convey to the user useful information regarding applicability of the transformed images. The user can optionally overlay a text item or a graphic item (such as a logo) onto the multiple transformed images displayed in the TI area of the display window simultaneously. The user can optionally overlay one or more text items and/or graphics items onto a user-select one (or all) of the multiple transformed images displayed in the TI area of the display window. The position of the text item or graphic item that is overlaid on a particular transformed image can be specified by user input. The position of the text item or graphic item that is overlaid on multiple transformed images can be common across the multiple transformed images and can be specified by user input. The user can filter the multiple transformed images displayed in the TI area of the display window for manipulation of a subset of the transformed images produced by the application. The user can copy and/or download one or more of the transformed images displayed in the TI area of the display window for storage and subsequent use by the user.

FIG. 1A illustrates an example of an architecture 100 for the digital image resizing application program. The architecture 100 includes client computing devices (labelled "user") 103 and one or more servers (labelled "Image Resizer Service") 107 connected over a network 105. The client computing devices 103 each can include one or more processors, a memory system, and one or more communications modules. The client computing devices 103 can be, for example, mobile computers, tablet computers, mobile devices (e.g., a smartphone or PDA), desktop computers, set top boxes (e.g., for a television), video game consoles, etc. The network 105 can include any one or more of the Internet, a personal area network (PAN), a local area network (LAN), a campus area network (CAN), a metropolitan area network (MAN), a wide area network (WAN), a broadband network (BBN), and the like. Further, the network 105 can include, but is not limited to, any one or more of the following network topologies, including a bus network, a star network, a ring network, a mesh network, a star-bus network, tree or hierarchical network, and the like. The server(s) 107 can be, for example, a stand-alone server, shared servers, dedicated servers, cluster/grid servers (e.g., a server farm), or cloud servers. The server(s) 107 may include one or more processors, a memory system, and one or more communications modules. The server(s) 107 may be configured to distribute workload (e.g., for load balancing) across multiple computing processing platforms.

Figure 1B:
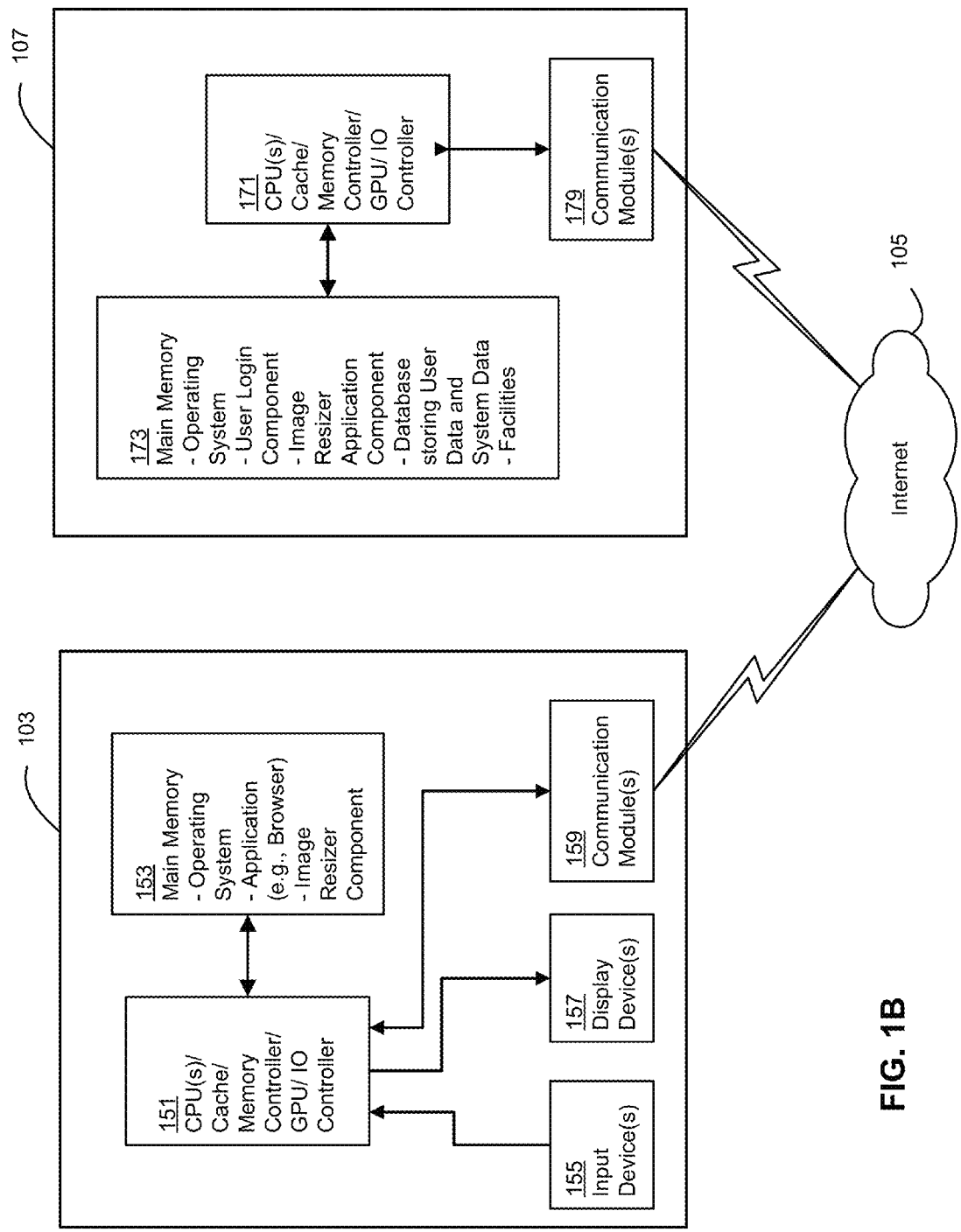
FIG. 1B is a schematic diagram of the components of the client computing devices and server of FIG. 1A that can implement an image resizing application program according to an embodiment of the present disclosure.

FIG. 1B is a block diagram illustrating an example of a client computing device 103 and a server 107 in the architecture 100 of FIG. 1A according to certain aspects of the disclosure. The client computing device 103 includes a computer processing platform 151, main memory 153, one or more input devices 155, one or more display devices 157, and one or more communication modules 159. The server 107 includes a computer processing platform 171, main memory 173, and one or more communication modules 179.

The computer processing platform 151 of the client computing device 103 includes one or more central processing units (CPUs), cache memory, a memory controller, a graphics engine and an Input-Output controller. The central processing unit is electronic circuitry that carries out the instructions of a computer program by performing the basic arithmetic, logical, control and input/output (I/O) operations specified by the instructions. The cache is electronic circuitry that stores instructions and/or data for fast access by the CPU(s). The memory controller is electronic circuitry that provides an interface between the platform 151 and main memory 153. The memory controller can include logic necessary to read and write to the main memory 153 and to "refresh" the main memory (for DRAM main memory). The main memory 153 can include volatile computer memory (such as DRAM or SRAM memory) as well as non-volatile memory (such as flash memory). The graphics processing unit (GPU) is a specialized electronic circuit designed to create image frames in a frame buffer intended for output to a display. The GPU can perform calculations related to hardware-accelerated video decoding and 3D computer graphics. The Input-Output controller is electronic circuitry that handles I/O functions, such as one or more PCI buses, one or more SPI buses, an SMBus, a DMA controller, one or more Interrupt controllers, mass storage controllers, a real-time clock, power management functions, non-volatile BIOS memory, USB or other serial interfaces, audio functions, and keyboard/mouse/serial ports. The I/O functions of the Input-Output controller can provide an interface to one or more mass storage devices, such as a hard disk drive or flash memory.

The input device(s) 155 of the client computing device 103 can be a mouse, a keyboard, a touchscreen, an audio input device (e.g., a microphone), a video input device (e.g., a camera, a motion detector), or any other device to enable a user to supply input to the client computing device 103.

The display device(s) 157 of the client computing device 103 can be a display screen, such as a LCD or OLED monitor and the like.

The communication module(s) 159 of the client computing device 103 connects the client computing device 103 to the network 105. The communication module(s) 159 can be configured to interface with the network 105 to send and receive information, such as data, requests, responses, and commands to other devices on the network 105. The communication module(s) 159 can implement electronic circuitry that communicates using a specific physical layer and data link layer standard such as Ethernet, Wi-Fi, etc. Such functions can provide a base for a full network protocol stack, allowing communication among small groups of computers on the same local area network (LAN) and large-scale network communications through routable protocols, such as Internet Protocol (IP), either by using cables or wirelessly.

The main memory 153 of the client computing device 103 includes software instructions and associated data which can be read by the CPU(s) of the processing platform 151. For example, the software instructions and associated data can include an operating system, an application (e.g., a web browser), and an image resizer application component 111 (for the case where the image resizer application component 111 is executed as a client-side script). The operating system is system software that manages computer hardware and software resources and provides common services for computer programs. The application (e.g., web browser) is a software application for retrieving and presenting information resources available on the server 107. The information resource can be identified by a Uniform Resource Identifier (URI/URL) or an API and may be a web page or other form of electronic content. The instructions and associated data of the operating system and the application can be loaded from mass storage on demand or otherwise and stored in the main memory 153 for processing by the platform 151. The image resizer application component 111 can be loaded from the server 107 (for example, as a client-side script) and stored in the main memory 153 of the client computing device 103 for processing by the platform 151. In this case, the image resizer application component 111 cooperates with the instructions and associated data of the application and possibly the operating system executing on the client computing device 103 to perform the digital image resizing operations as described herein. Alternatively, the image resizer application component 111 can be stored in the main memory 173 of the server 107 and can execute as a server-side function or script as described below.

The computer processing platform 171 of the server 107 includes one or more central processing units (CPUs), cache memory, a memory controller, a graphics engine and an Input-Output controller. The central processing unit is electronic circuitry that carries out the instructions of a computer program by performing the basic arithmetic, logical, control and input/output (I/O) operations specified by the instructions. The cache is electronic circuitry that stores instructions and/or data for fast access by the CPU(s). The memory controller is electronic circuitry that provides an interface between the platform 171 and main memory 173. The memory controller can include logic necessary to read and write to the main memory 173 and to "refresh" the main memory (for DRAM main memory). The main memory 173 can include volatile computer memory (such as DRAM or SRAM memory) as well as non-volatile memory (such as flash memory). The graphics processing unit (GPU) is a specialized electronic circuit designed to create image frames in a frame buffer intended for output to a display. The GPU can perform calculations related to hardware-accelerated video decoding and 3D computer graphics. The Input-Output controller is electronic circuitry that handles I/O functions, such as one or more PCI buses, one or more SPI buses, an SMBus, a DMA controller, one or more Interrupt controllers, mass storage controllers, a real-time clock, power management functions, non-volatile BIOS memory, USB or other serial interfaces, audio functions, and keyboard/mouse/serial ports. The I/O functions of the Input-Output controller can provide an interface to one or more mass storage devices, such as a hard disk drive or flash memory card.

The communication module(s) 179 of the server 107 connects the server to the network 105. The communication module(s) 179 can be configured to interface with the network 105 to send and receive information, such as data, requests, responses, and commands to other devices on the network 105. The communication module(s) 179 can implement electronic circuitry that communicates using a specific physical layer and data link layer standard such as Ethernet, Wi-Fi, Fibre Channel, etc. Such functions can provide a base for a full network protocol stack, allowing communication among small groups of computers on the same local area network (LAN) and large-scale network communications through routable protocols, such as Internet Protocol (IP), either by using cables or wirelessly. The communication functions of the communications module(s) 179 can provide an interface to one or more direct-attached storage device, network attached storage devices or storage area network devices.

The main memory 173 of the server 107 includes software instructions and associated data which can be read by the CPU(s) of the processing platform 171. For example, the software instructions and associated data can include an operating system, a user login component 109, an image resizer application component 111 (for the case where the image resizer application component 111 is executed as a server-side function or script), a database 113 storing system and user data, and facilities 115. The operating system is system software that manages computer hardware and software resources and provides common services for computer programs. The facilities 115 can provide software resources to create the application components (i.e., the user login component 109, the image resizer application component 111, and the database 113) as well as the server environment to run them. For example, the facilities 115 can provide software resources for the construction of dynamic pages and possibly other services (such as clustering, fail-over, and load-balancing). The user login component 109 cooperates with the instructions and associated data of the operating system (possibly in conjunction with the facilities 115) executing on the server 107 to perform user authentication as described herein. For the case where the image resizer application component 111 is executed as a server-side function or script, the image resizer application component 111 cooperates with the instructions and associated data of the operating system (possibly in conjunction with the facilities 115) executing on the server 107 to perform digital image resizing operations as described herein. The instructions and associated data of the operating system, the user login component 109, the image resizer application component 111, the database 113, and the facilities 115 can be loaded from one or more mass storage devices, direct-attached storage devices, network attached storage devices or storage area network devices on demand or otherwise and stored in the main memory 173 for processing by the platform 171. In alternate embodiments as described above, the image resizer application component 111 can be loaded from the server 107 (for example, as a client-side script) and stored in the main memory 153 of the client computing device 103 for processing by the platform 151 of the client computing device 103 as described above.

FIGS. 2A-2E, collectively, is a flow chart of an exemplary digital image resizing application program that provides a user with the ability to transform the size (in pixels) of one or more digital images (or source image(s)) to produce multiple transformed images that conform to a set of image sizes (in pixels) or a subset thereof.

The application program begins in block 201 where the database 113 of the server 107 is configured to store a set of a plurality of image sizes (in pixels). The image sizes (in pixels) are each typically represented by a product of two values (e.g., 640*480 pixels). The first value (e.g., 640) represents the number of pixels in each horizontal scan line or row of the image. The second value (e.g., 480) represents the number of horizontal scan lines or rows in the image. Note that the set of image sizes stored in the database 113 can conform to image sizes supported by a number of well-known online publishers, such as popular online social networking services including Facebook, LinkedIn, Instagram, Pinterest, Tumblr, and Twitter. Such image size data can be stored in the database 113 of the server 107 as shown in FIG. 1A.

Figure 3A:
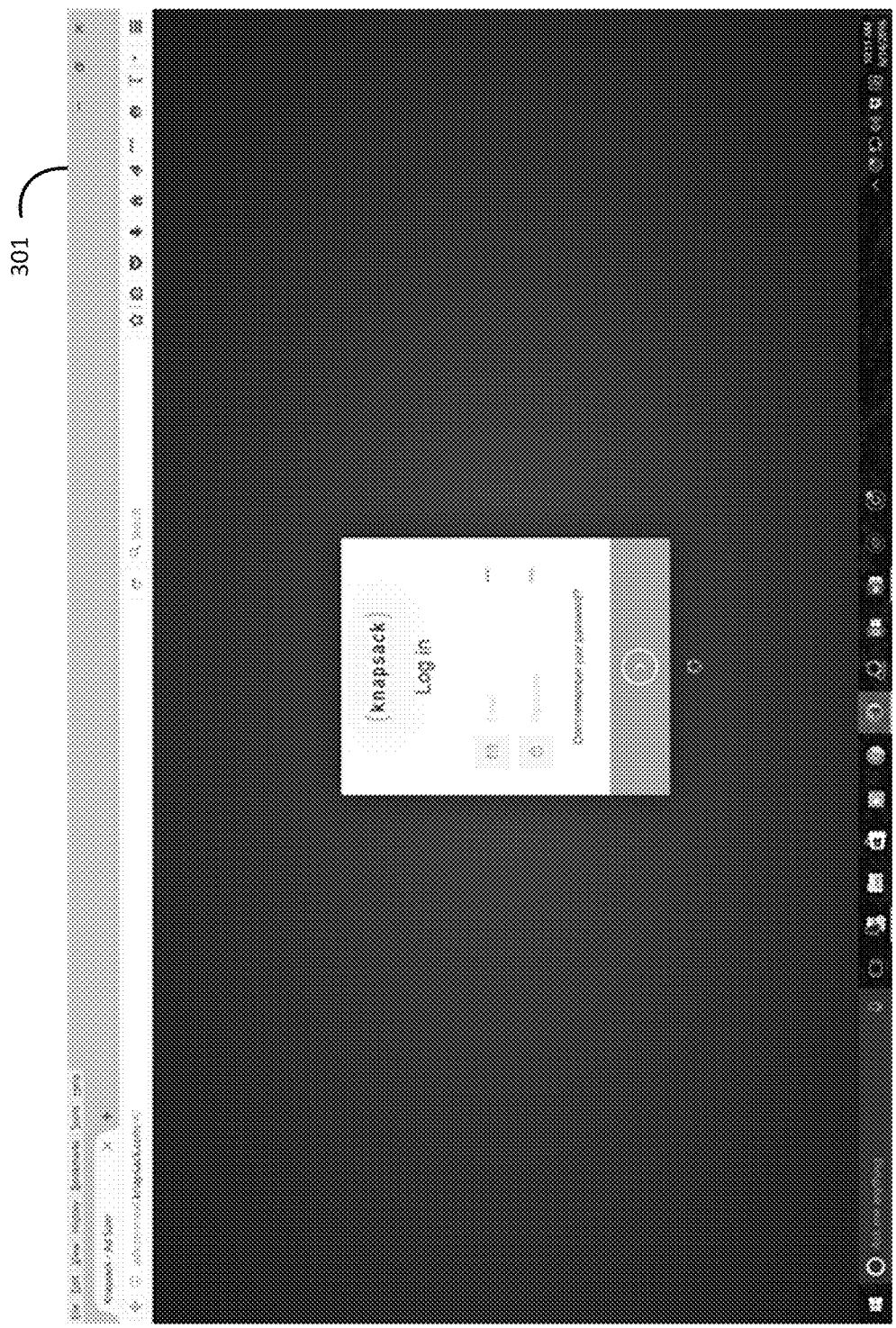
FIG. 3A is a view of an exemplary graphical user interface that can be implemented by cooperation of the client computer device and the user login component of the server of FIG. 1B as part of block 205 of the image resizing application program of FIGS. 2A to 2H according to an embodiment of the present disclosure.

In block 203, the database of the server 107 can be configured to optionally store labels (such as text and/or publisher logos) that are associated with the set of the plurality of image sizes stored in block 201. For example, one or more image sizes that conform to image sizes supported by Facebook can be associated with a well-known Facebook logo 311a (FIG. 3C). In another example, one or more predefined image sizes that conform to image sizes supported by Twitter can be associated with a well-known Twitter logo 311f (FIG. 3C). Such label data can be stored in the database 113 of the server 107 as shown in FIG. 1A.

In block 205, the user executes the application (e.g., web browser or other suitable application) on the client computing device 103 to access the user login component 109 provided on the server 107. The execution of the application on the client computing device 103 and the user login component 109 of the server 107 cooperate to present and display a login screen on the display device(s) 157 of the client computing device 103 that allows the user to enter a user name and password (or other form of user authentication) using the input device(s) 155 of the client computing device 103. In response thereto, the user login component 109 authenticates the user by matching the user name and password (or other authentication information) entered by the user onto the login screen of the client computing device 103 to a user name and associated password (or other authentication information) stored in the database 113 of the server 107. An example of such a login screen is shown in FIG. 3A. The login screen is displayed as part of a display window 301 and allows the user to enter a user name (e.g., email address) into the field labelled "email" and enter a password into the field labelled "password". Note that the user name and associated password (or other authentication information) of all registered users can be stored in the database 113 of the server 107 as shown in FIG. 1A. If a successful match is found, the application program continues to block 207. If a successful match is not found, the application program can request that the user register and provide a user name and password (or other authentication information) and the application program can repeat block 205. If the user authentication of block 205 fails after registration, the user login component 109 can block access to the functionality of the image resizer application component 111 in blocks 207 to 271 as described below. In this manner, only authenticated registered users can be granted access to the functionality of the image resizer application component 111 in blocks 207 to 271 as described below.

In block 207, the application executing on the client computing device 103 and the image resizer application component 111 (whose execution can be invoked either on the client computing device 103 or the server 107 as described herein) cooperate to optionally present and display user interface controls on the display device(s) 157 of the client computing device 103 that allows the user to customize one or more advertiser-specific settings. In response thereto, the user interacts with such user interface controls by operation of the input device(s) 155 of the client computing device 103 to customize the one or more advertiser-specific settings. An advertiser is an organization, company or person that places advertisements in order to target customers. In this context, the advertisements can include an image or "ad image" that can include a graphic overlay and/or text overlay as part of the ad image, and the advertiser-specific settings can be used to control the processing of the image resizer application for generating ad images for a particular advertiser as described herein. For example, the advertiser-specific settings can specify the online publishers (or channels) that are used by a particular advertiser. Such advertiser-specific settings can be used to control the Source Image transformation and display operations (blocks 217 to 225) to produce Transformed Images ("Ad images") with image sizes that conform to the online publishers or channels used by the particular advertiser. The advertiser-specific settings can also specify format or style settings pertaining to text items. Such advertiser-specific settings can be used to control the text overlay operations (blocks 239 to 251) for Transformed Images ("Ad images") for use by the particular advertiser. The advertiser-specific settings can also specify format or style settings pertaining to graphic items. Such advertiser-specific settings can also be used to control the graphic overlay operations (blocks 253 to 265) for Transformed Images ("Ad images") for use by the particular advertiser. Where the image resizer application component 111 is executing on the client computing device 103, the main memory 153 and/or mass storage of the client computing device 103 can be used to store data representing the advertiser-specific settings specified by the user. Where the image resizer application component 111 is executing on the server 107, the main memory 173 and/or mass storage of the server 107 and/or the database 113 can be used to store data representing the advertiser-specific settings specified by the user.

Figure 3B:
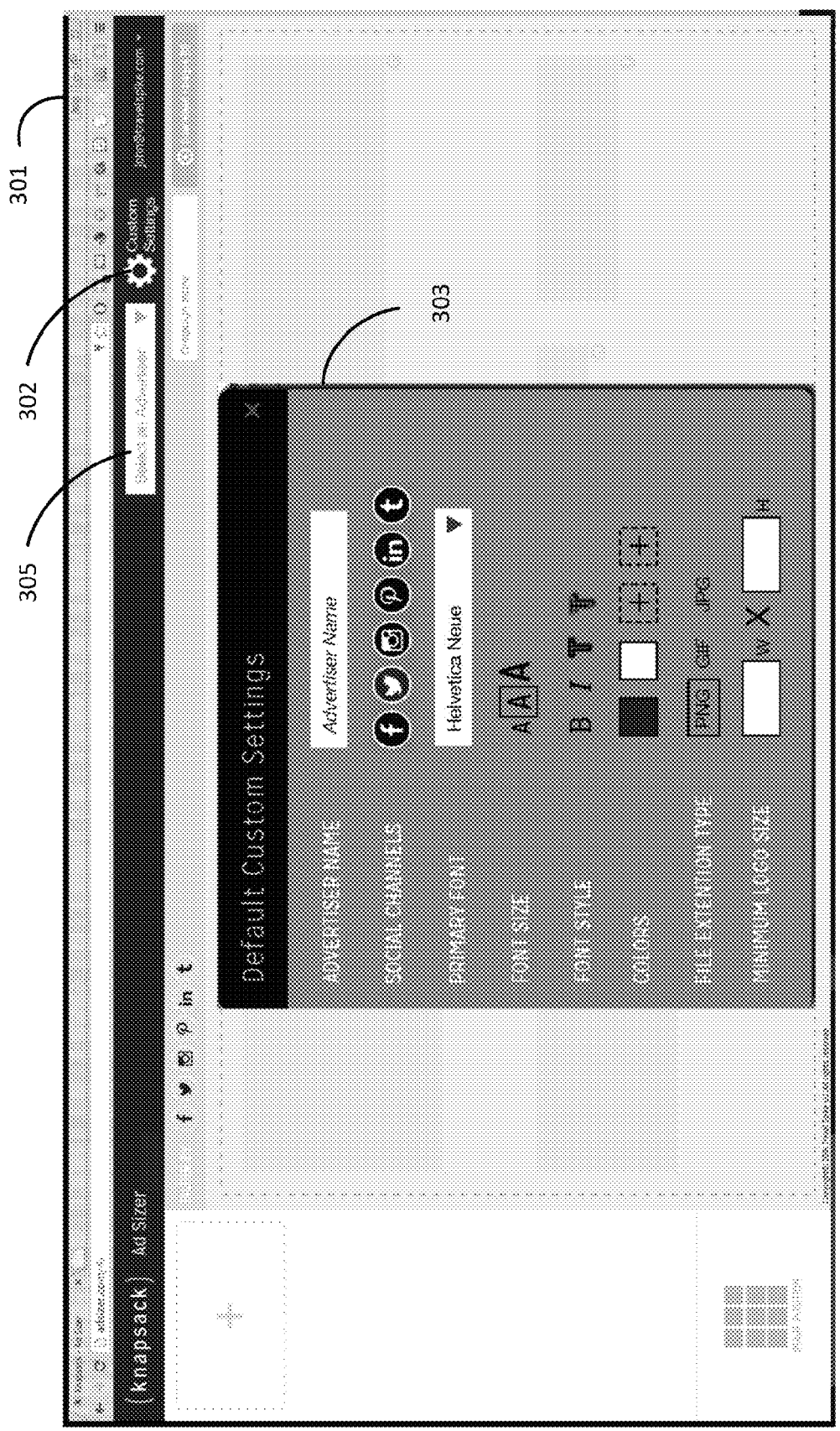
FIG. 3B is a view of an exemplary graphical user interface that can be implemented by cooperation of the client computer device and the image resizer application component of the server of FIG. 1B as part of blocks 207 and 209 of the image resizing application program of FIGS. 2A to 2H according to an embodiment of the present disclosure.
Figure 3C:
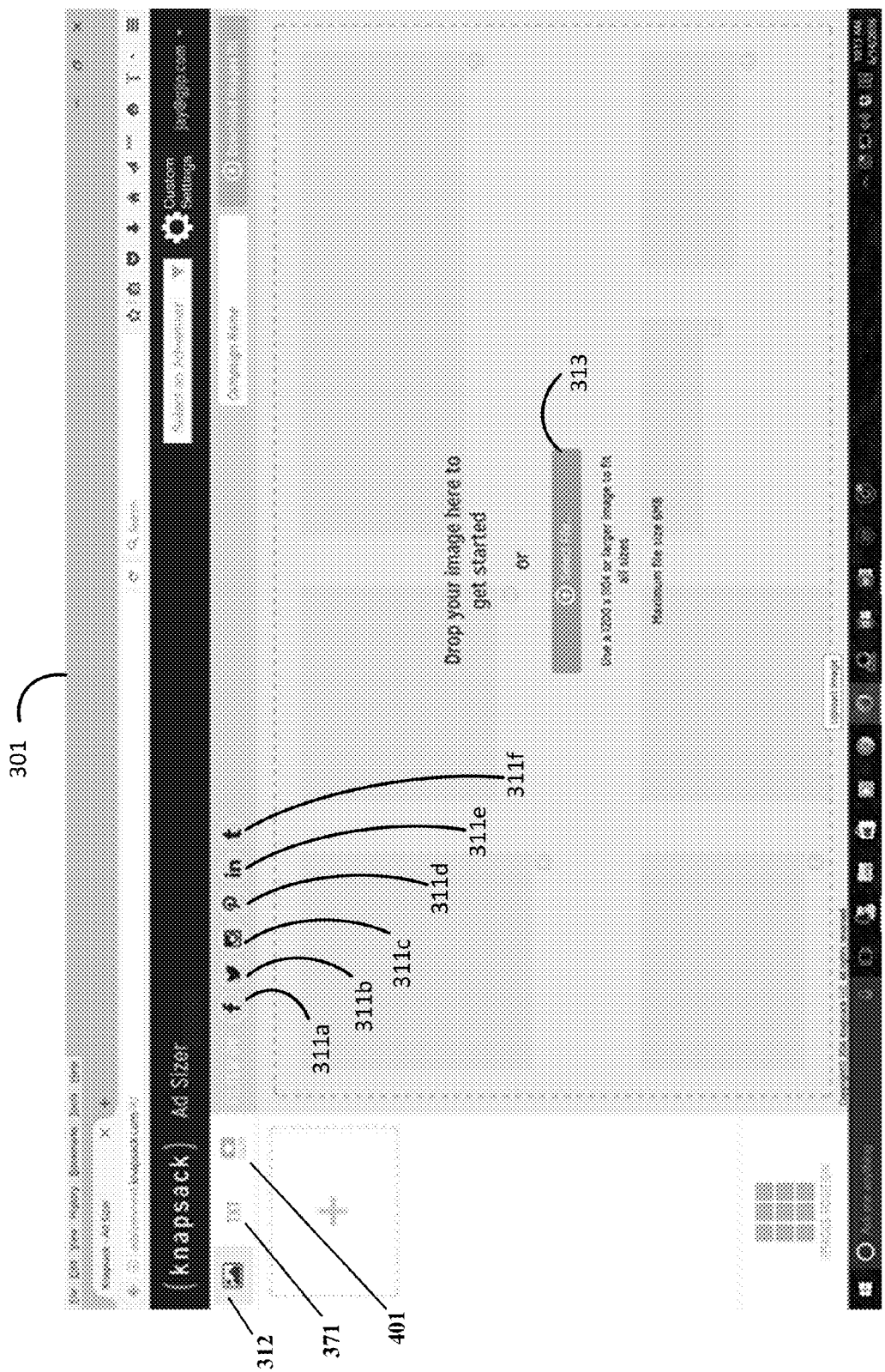
FIGS. 3C and 3D are views of an exemplary graphical user interface that can be implemented by cooperation of the client computer device and the image resizer application component of the server of FIG. 1B as part of block 211 of the image resizing application program of FIGS. 2A to 2H according to an embodiment of the present disclosure.

An example of the user interface controls of block 207 is shown in FIG. 3B where the user clicks on the "Custom Settings" toolbar button 302 of the display window 301 and is presented with the "Default Custom Settings" screen as part of the display window 301 as shown. The user can enter text that identifies a particular advertiser in the "Advertiser Name" field. The user can further click on the logos for one or more online publishers or channels in the "Social Channels" field in order to specify one or more online publishers or channels that are used by the particular advertiser. Such advertiser-specific settings can be used to control the Source Image transformation and display operations (blocks 217 to 225) to produce Transformed Images ("Ad images") with image sizes that conform to the online publishers or channels used by the particular advertiser. The user can further select a font family or primary font for text items from a drop-down list of font families presented in the "Primary Font" field. The user can further select a font size for text items from a graphical list of font sizes presented in the "Font Size" field. The user can further select a font style (such as bold, italic, shadowed, etc.) for text items from a graphical list of font styles presented in the "Font Style" field. The user can further specify one or more colors for text items from a selection of colors accessible from the "Colors" field. These advertiser-specific settings (i.e., font family, font size, font style, and color(s)) specify format or style settings pertaining to text items and can be used to control the text overlay operations (blocks 239 to 251) for Transformed Images ("Ad images") for use by the particular advertiser. The user can further specify one or more file types for graphic items from a selection of file types presented ion the "File Extension Type" field. The user can further specify a size limitation (such as a minimum image size in pixels) for graphic items by inputting pixel size values in the "Minimum Logo Size" field. These advertiser-specific settings (i.e., file type and size limitation) specify format or style settings pertaining to graphic items and can be used to control the graphic overlay operations (blocks 253 to 265) for Transformed Images ("Ad images") for use by the particular advertiser.

Note that in alternate embodiments, the advertiser-specific settings for one or more advertisers can be input and stored by a super-user, a system administrator or system designer for control over the processing of the image resizer application for generating ad images for one or more particular advertisers by users (or a certain group or class of users) of the system as described herein.

In block 209, the application executing on the client computing device 103 and the image resizer application component 111 cooperate to optionally present and display user interface controls on the display device(s) 157 of the client computing device 103 that allows a user to select a particular advertiser. In response thereto, the user interacts with such user interface controls by operation of the input device(s) 155 of the client computing device 103 to select a particular advertiser. An example of such user interface controls is shown in FIG. 3B where the user can select a particular advertiser from a drop-down list of advertisers 305 that is part of the toolbar of the display window 301 as shown.

Figure 3D:
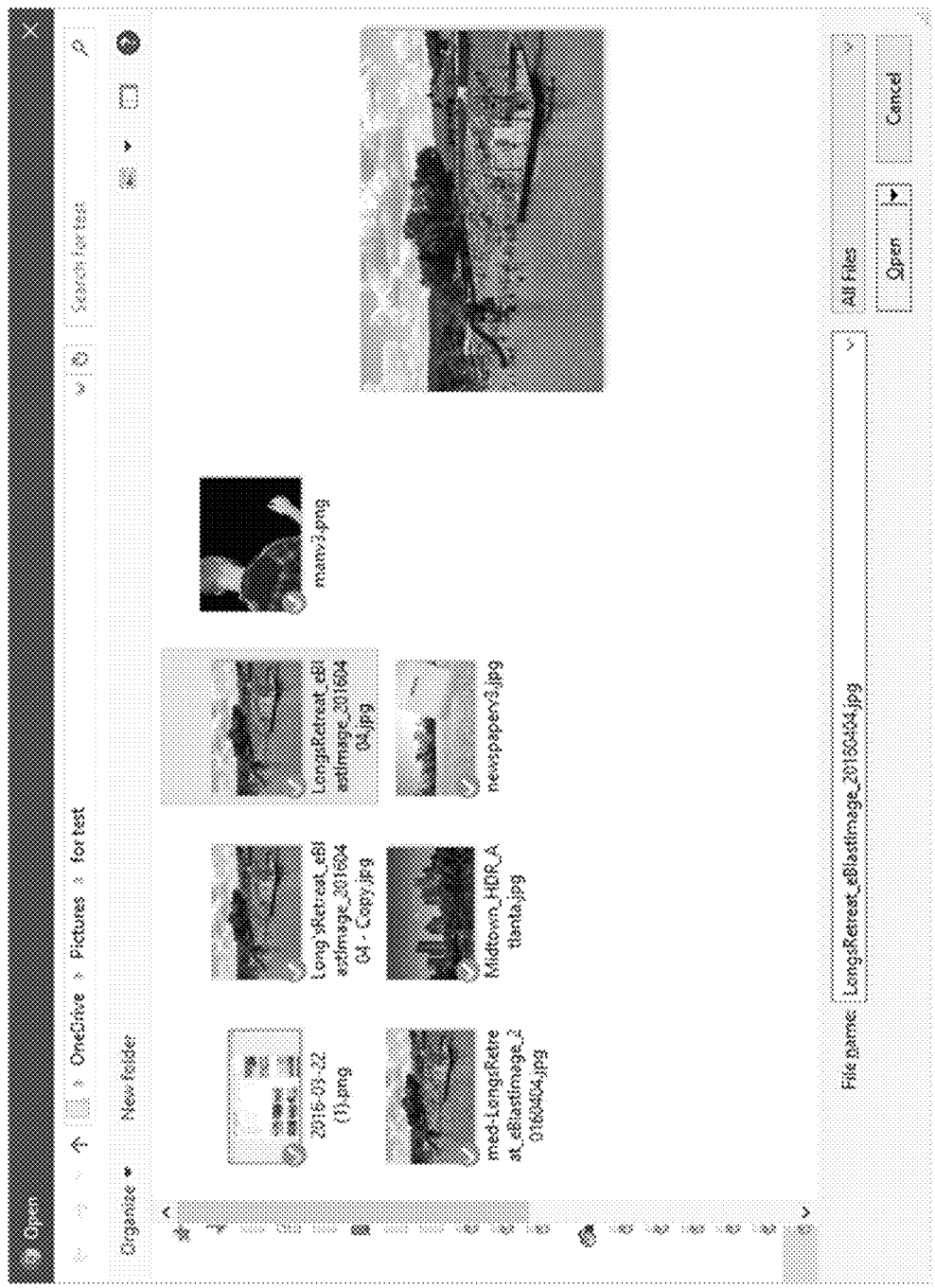

In block 211, the application executing on the client computing device 103 and the image resizer application component 111 cooperate to optionally present and display user interface controls on the display device(s) 157 of the client computing device 103 that allows a user to specify and/or upload a Source Image. In response thereto, the user interacts with such user interface controls by operation of the input device(s) 155 of the client computing device 103 to specify and/or upload a Source Image. An example of such user interface controls is shown in FIG. 3C where the left panel of the display window 301 includes an image button 312, a text button 371, and a logo button 401. User selection of the image button 312 enables and/or activates the processing of one or more Source Images and corresponding Transformed Images as described herein with respect to blocks 211 to 237. User selection of the text button 371 enables and/or activates the processing of one or more overlay text items as described herein with respect to blocks 239 to 251. User selection of the logo button 401 enables and/or activates the processing of one or more overlay graphics items as described herein with respect to blocks 253 to 265. In FIG. 3C, the user has selected the image button 312 and thus has enabled and/or activated the processing of one or more Source Images and corresponding Transformed Images as described herein with respect to blocks 211 to 237. As part of block 211, the user can drag and drop a Source Image file onto a region of the display window 301 as specified by the user interface controls as shown. Alternatively, the user can click on the "select file" button 313 of the display window 301 of FIG. 3C to browse the file system of the client computing device 103 and select a Source Image file as shown in FIG. 3D. Where the image resizer application component 111 is executing on the client computing device 103, the main memory 153 and/or mass storage of the client computing device 103 can be used to store data representing the Source Image specified by the user. Where the image resizer application component 111 is executing on the server 107, the main memory 173 and/or mass storage of the server 107 and/or the database 113 can be used to store data representing the Source Image uploaded to the server 107.

In block 213, the image resizer application component 111 determines if a Source Image has been specified and/or uploaded. If not, the operations of image resizer application component 111 repeats block 213 and thus waits for the Source Image to be specified and/or uploaded and the operations continue to block 215.

Figure 3E:
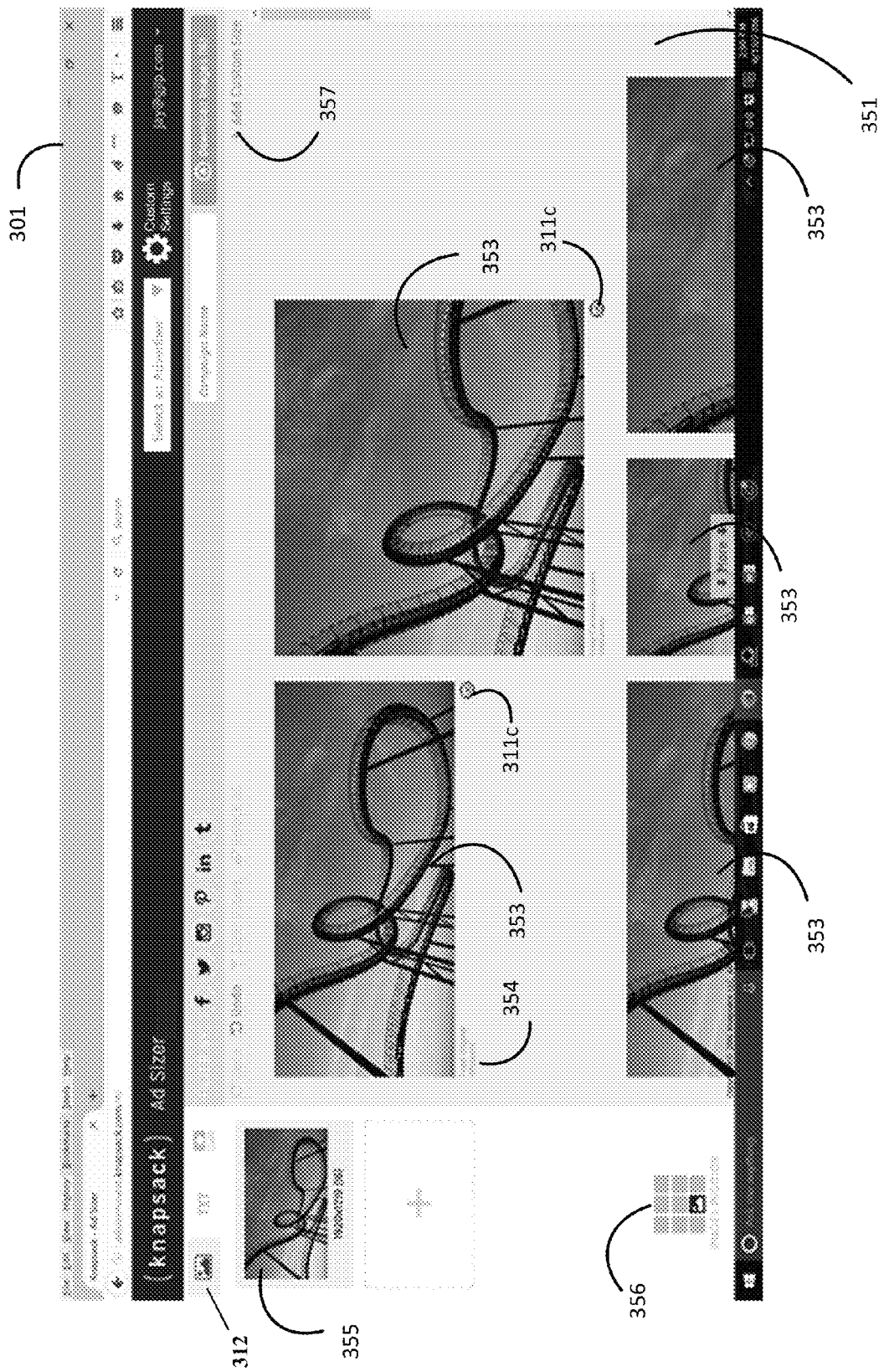
FIG. 3E is a view of an exemplary graphical user interface that can be implemented by cooperation of the client computer device and the image resizer application component of the server of FIG. 1B as part of blocks 215 and 227 of the image resizing application program of FIGS. 2A to 2H according to an embodiment of the present disclosure.

In block 215, the application executing on the client computing device and the image resizer application component cooperate to display the Source Image and/or a thumbnail of the Source Image on the display device(s) 157 of the client computing device 103. For example, FIG. 3E shows a thumbnail of the Source Image 355 displayed in the left panel of the display window 301 on the display device(s) 157 of the client computing device 103.

In block 217, the image resizer application component 111 automatically sets a loop count variable I to loop through the set of the plurality of image sizes stored in block 201 or a subset thereof. For example, in the event that a user as selected a particular advertiser in block 209, the loop count variable I can be set to loop through a subset of the image sizes stored in block 201 where the subset of the image sizes conforms to sizes supported by the online publishers (or channels) that are used by a particular advertiser as represented by the advertiser-specific settings stored in block 209.

In block 219, the image resizer application component 111 automatically generates data representing a Transformed Image based on the Source Image specified and/or uploaded by the user such that the size of the Transformed Image matches a respective image size of the set or subset (which corresponds to the current value of loop count variable I). In one embodiment, the data representing the Transformed Image for the respective image size can include the following:

i) a scale factor SF that is applied to the pixel data of the Source Image to produce an intermediate image for the respective image size, the scale factor can represent how many times larger or smaller the intermediate image is relative to the Source Image; for example, a scale factor less than one can represent can represent how many times smaller the intermediate image is relative to the Source Image, and a scale factor less than one can represent can represent how many times larger the intermediate image is relative to the Source Image; the scale factor can be assigned a default value for block 219 and possibly edited by the user in block 256 as described below.

ii) the pixel data for the intermediate image produced by scaling the Source Image by the scale factor SF for the respective image size; and iii) pixel coordinates that specify a range of pixels in the intermediate image for the respective image size; the pixel coordinates of iii) can be assigned a default value for block 219 and possibly edited by the user in block 256 as described below; and iv) pixel data for the range of pixels in the intermediate image of ii) as specified by the pixel coordinates of iii). The pixel data of iv) represents the Transformed Image whose size matches the respective image size of the set or subset (which corresponds to the current value of loop count variable I).

Note that both the scale factor SF and the pixel coordinates can be used to effectively enlarge or reduce the physical size of the Source Image that is used to produce the Transformed Image for the respective image size.

In block 221, the image resizer application component 111 stores the data representing the Transformed Image produced in block 219. Where the image resizer application component 111 is executing on the client computing device 103, the main memory 153 and/or mass storage of the client computing device 103 can be used to store the data representing the Transformed Image. Where the image resizer application component 111 is executing on the server 107, the main memory 173 and/or mass storage of the server 107 and/or the database 113 can be used to store the data representing the Transformed Image.

In block 223, the image resizer application component 111 determines if the loop is complete (i.e., the loop count variable I has stepped through all image sizes of the set or subset). If not, the operations continue to block 225 where the loop count variable I is incremented and the operations return to block 219 to repeat the operations of blocks 219 to 223 for the next iteration of the loop. When the loop is complete, the operations continue to block 2279.

In block 227, the application executing on the client computing device 103 and the image resizer application component 111 cooperate to update a particular region or area (referred to as the "TI area") of the display window displayed on the display device(s) 157 of the client computing device 103 to simultaneously display the plurality of Transformed Images (and/or thumbnails of the plurality of Transformed Images) as produced in block 219 over the multiple iterations of the loop of blocks 217 to 223 for all the image sizes of the set or subset. The TI area of the display window can also display one or more labels (e.g., text and/or publisher logos) that are associated with the respective image size (which corresponds to the current value of loop count variable I) in a position adjacent to or near the Transformed Image or the thumbnail of the Transformed Image. For example, where the respective image size (which corresponds to the current value of loop count variable I) conforms to an image size supported by Facebook and thus is associated with the well-known Facebook logo 311*a* (FIG. 3C), the Facebook logo 311*a* can be displayed in a position adjacent to or near the Transformed Image or the thumbnail of the Transformed Image. In another example, where the respective image size (which corresponds to the current value of loop count variable I) conforms to an image size supported by Twitter and thus is associated with the well-known Twitter logo 311*f* (FIG. 3C), the Twitter logo 311*f* can be displayed in a position adjacent to or near the Transformed Image or the thumbnail of the Transformed Image. Such publisher logos can convey to the user useful information regarding applicability of the corresponding Transformed Image. In one embodiment, the simultaneous display of the plurality of Transformed Images can be carried out by rendering the pixel data of iv) that represents each Transformed Image for the respective image sizes of the set for display in non-overlapping portions of the TI area of the display window.

Note that the operations of blocks 211 to 227 allows the user to specify and/or uploaded a Source Image such that image resizer application component 111 automatically generates, stores and simultaneously displays a plurality of Transformed Images whose image sizes are dictated by the image resizing application. Also note that the operations of blocks 211 to 227 can be repeated more than one time to allow the user to specify and/or uploaded multiple Source Images such that image resizer application component 111 automatically generates, stores and displays Transformed Images based on the multiple Source Images whose image sizes are dictated by the image resizing application.

FIG. 3E shows an exemplary display window 301 with a TI area 351 having a gray background. The TI area 351 is updated to simultaneously display a plurality of Transformed Image thumbnails 353 (five shown) produced from a Source Image over a number of iterations of blocks 217 to 221. The Source Image thumbnail 355 is displayed in the display window 301 near the top-left corner of the TI area 351. The Instagram logo 311*c* is displayed in the TI area 351 near the bottom right corner of two Transformed Image thumbnails 353 as shown. Text labels 354 are displayed in the TI area 351 near the respective bottom left corners of the Transformed Image thumbnails 353 as shown.

Figure 3F:
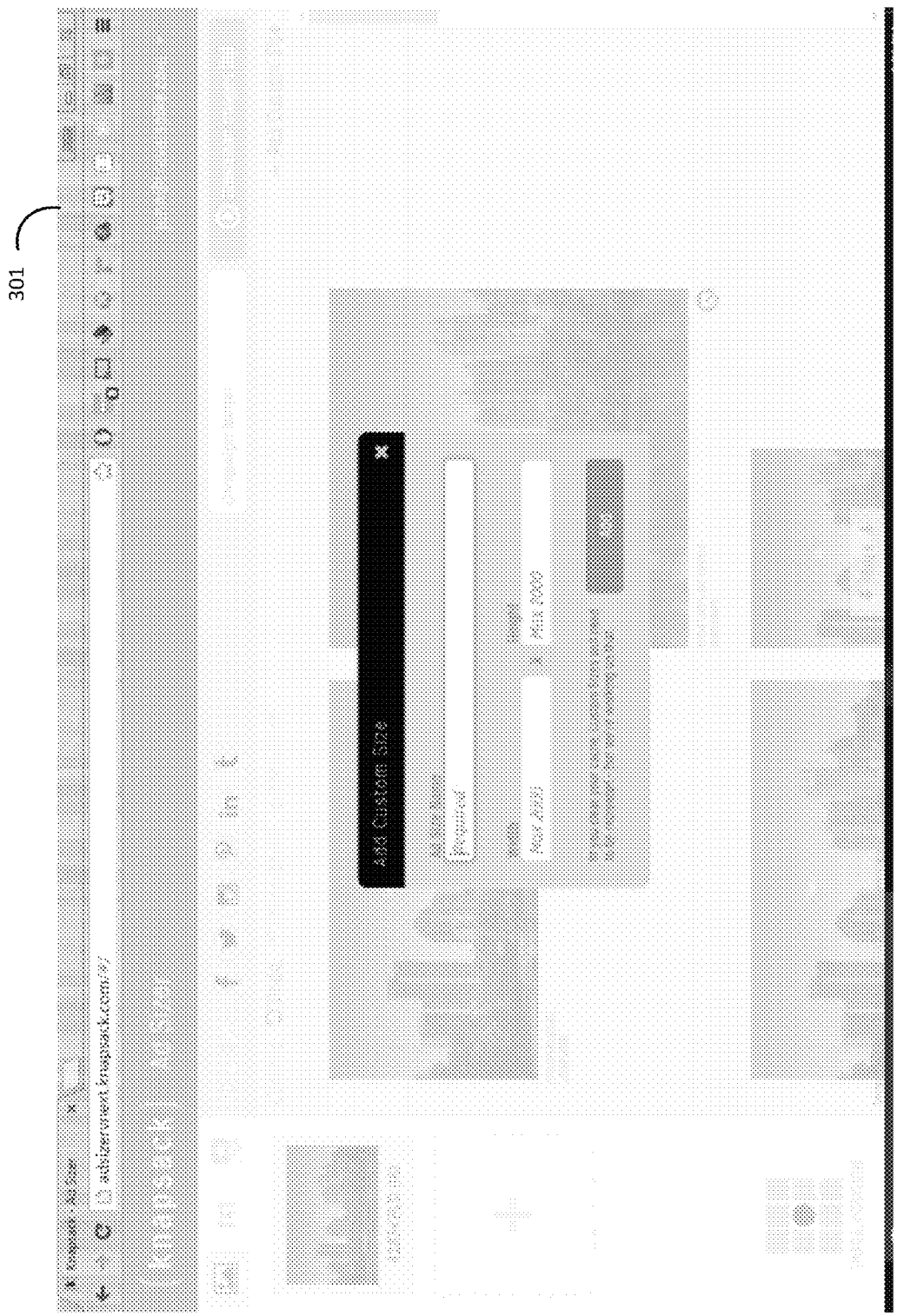
FIG. 3F is a view of an exemplary graphical user interface that can be implemented by cooperation of the client computer device and the image resizer application component of the server of FIG. 1B as part of blocks 229 and 231 of the image resizing application program of FIGS. 2A to 2H according to an embodiment of the present disclosure.

In block 229, the application executing on the client computing device 103 and the image resizer application component 111 cooperate to optionally present and display user interface controls on the display device(s) 157 of the client computing device 103 that allows the user to modify or add to the set of the plurality of image sizes and associated labels stored in the database 113. In response thereto, the user optionally interacts with such user interface controls by operation of the input device(s) 155 of the client computing device 103 to modify or add to the set of the plurality of image sizes and associated labels. An example of such user interface controls is shown in FIGS. 3E and 3F where the user clicks on the "Add Custom Size" button 357 of the display window 301 of FIG. 3E to invoke the display of an "Add Custom Size" input screen in the display window 301 as shown in FIG. 3F. The user enters a text label for a user-specified image size in the "Ad Size Name" field of the "Add Custom Size" input screen and enters a pair of pixel values for the user-specified image size in the "Width" and "Height" fields of the "Add Custom Size" input screen. After entering such information, the user saves the user-specified image size and associated text label by clicking on the "Add" button of the "Add Custom Size" input screen of FIG. 3F. Where the image resizer application component 111 is executing on the client computing device 103, the main memory 153 and/or mass storage of the client computing device 103 can be used to store data representing the resultant set of the plurality of image sizes and associated labels produced in block 229. Where the image resizer application component 111 is executing on the server 107, the main memory 173 and/or mass storage of the server 107 and/or the database 113 can be used to store data representing the resultant set of the plurality of image sizes and associated labels produced in block 229.

In block 231, the image resizer application component 111 generates data representing one or more Transformed Images based the Source Image, where the size of the Transformed Image(s) matches the image size added to or modified by block 229. Furthermore, the image resizer application component stores the data representing the Transformed Image(s), and the application executing on the client computing device and the image resizer application component cooperate to update the TI area of the display window to simultaneously display a plurality of Transformed Images (or thumbnails of the plurality of Transformed Images). The TI area can also display one or more labels that are associated with the respective image size in a position adjacent to or near the corresponding Transformed Image (or the corresponding thumbnail of the Transformed Image). The plurality of Transformed Images (or thumbnails of such Transformed Images) simultaneously displayed in the TI area of the display window in block 231 can be represented by the data stored in block 221 (if the corresponding size was not modified in block 229) or by the data stored in block 231 (if the corresponding size was added or modified in block 229). These operations are similar to those described above for blocks 219 to 227.

Note that the operations of blocks 229 and 231 can be repeated more than one time to allow the user to add multiple image sizes and associated labels to the set of image sizes and associated labels used by the image resizing application program.

In block 233, the application executing on the client computing device 103 and the image resizer application component 111 cooperate to optionally present and display user interface controls on the display device(s) 157 of the client computing device 103 that allows the user to selectively adjust which part of the Source Image is used to derive the plurality of Transformed Images that are displayed in the TI area of the display window. The user optionally interacts with such user interface controls to selectively adjust which part of the Source Image is used to derive the plurality of Transformed Images simultaneously displayed in the TI area of the display window in block 235.

In block 235, the image resizer application component 111 generates data representing a plurality of Transformed Images based the Source Image, where the part of the Source Image that is used to derive the plurality of Transformed Images is based on the user input of block 233. Furthermore, the image resizer application component 111 stores the data representing the plurality of Transformed Images, and the application executing on the client computing device 103 and the image resizer application component 111 cooperate to update the TI area of the display window to simultaneously display the plurality of Transformed Images (or thumbnails of the plurality of Transformed Images). The TI area can also display one or more labels that are associated with the respective image size in a position adjacent to or near the corresponding Transformed Image (or the corresponding thumbnail of the Transformed Image).

Figure 3G:
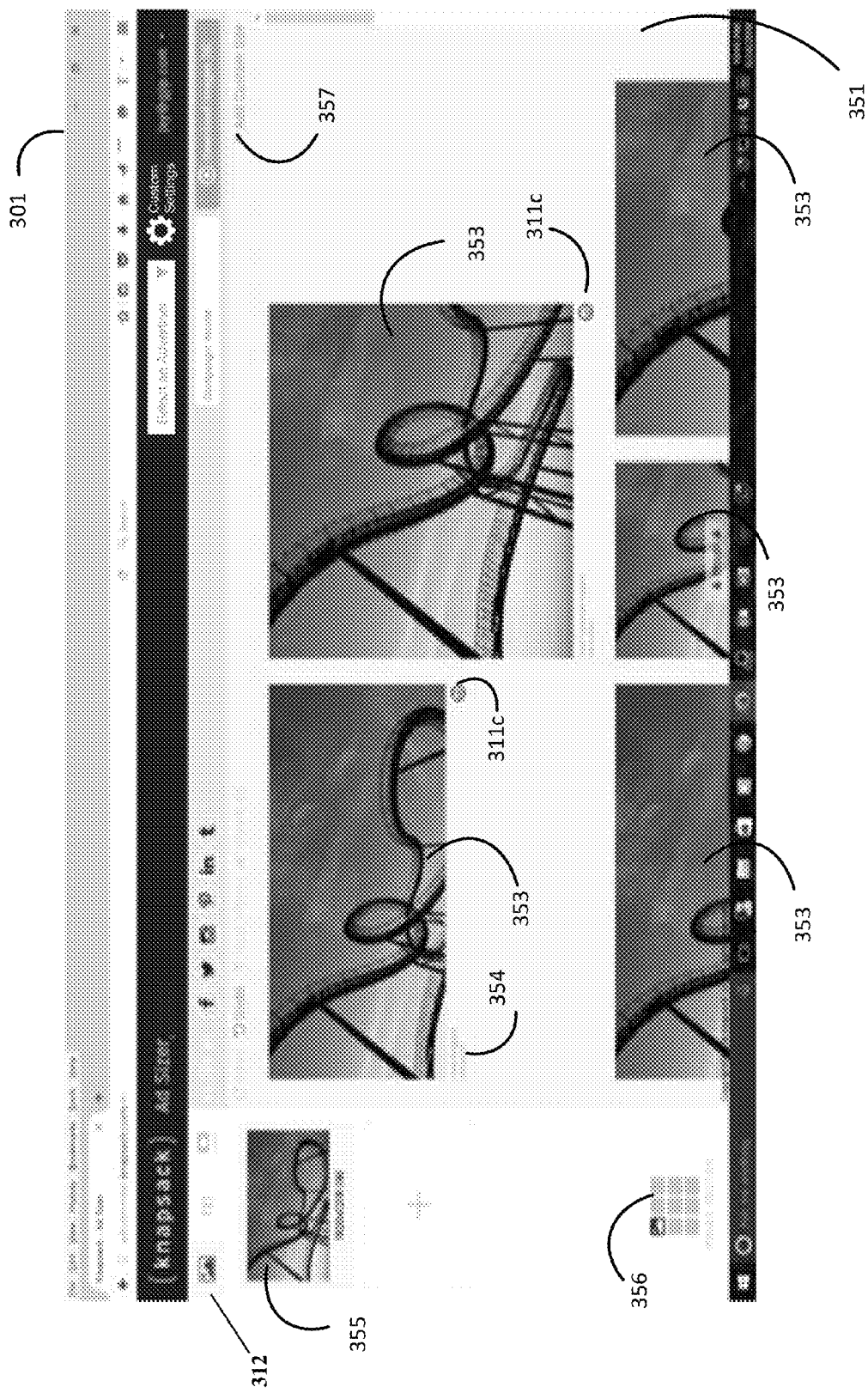
FIG. 3G is a view of an exemplary graphical user interface that can be implemented by cooperation of the client computer device and the image resizer application component of the server of FIG. 1B as part of blocks 233 and 235 of the image resizing application program of FIGS. 2A to 2H according to an embodiment of the present disclosure.
Figure 3H:
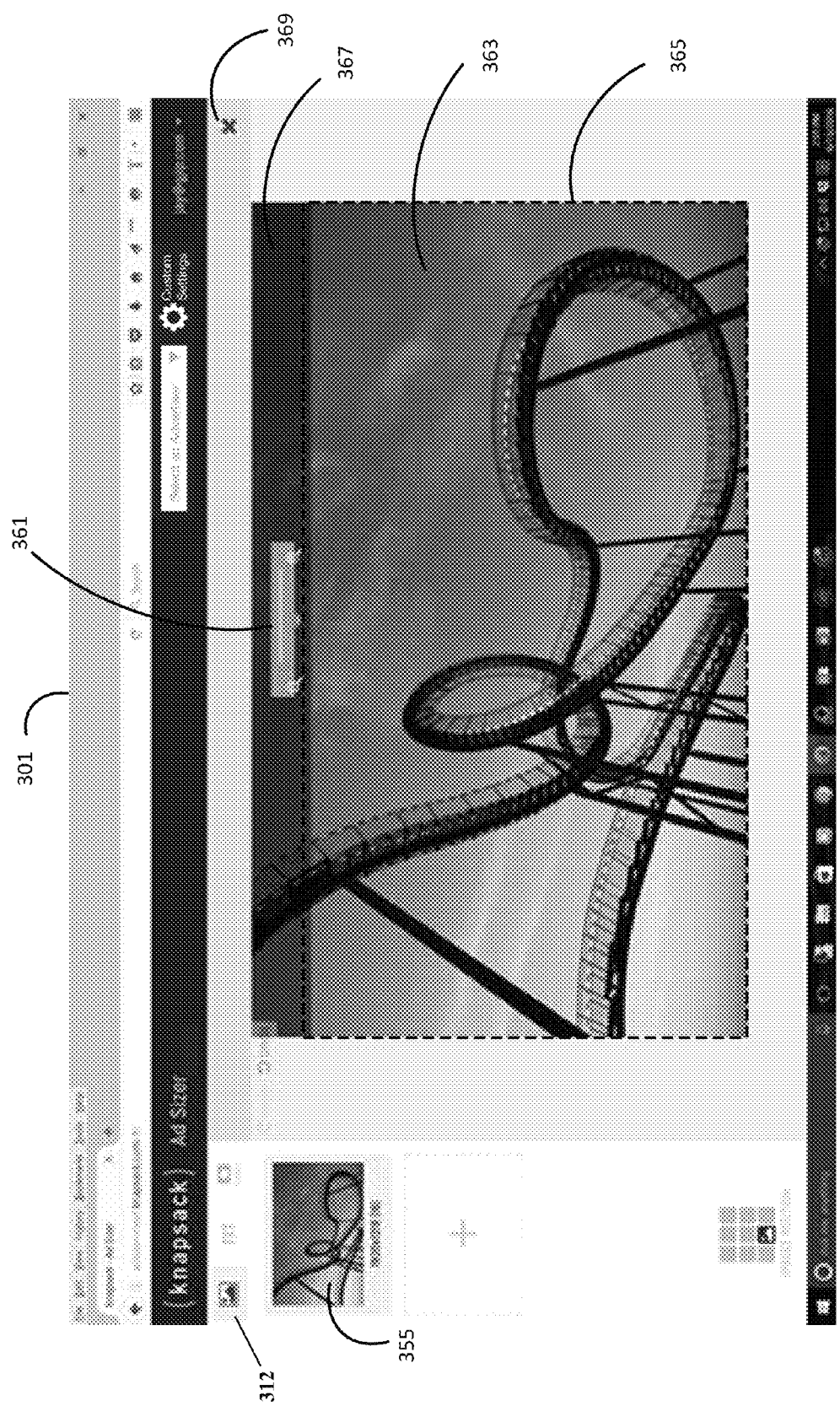
FIGS. 3H, 3I, 3J, 3K and 3L are views of an exemplary graphical user interface that can be implemented by cooperation of the client computer device and the image resizer application component of the server of FIG. 1B as part of block 237 of the image resizing application program of FIGS. 2A to 2H according to an embodiment of the present disclosure.

An example of the user interface of blocks 233 and 235 is shown in FIGS. 3E and 3G where grid 356 is presented and displayed in the left panel of the display window 301 in conjunction with the user selection of the image button 357. The grid 356 defines nine (9) different predefined image positions that dictate the default pixel coordinates that specify a range of pixels in the intermediate images from which the Transformed Images are produced for the respective image sizes. For example, the top-left grid cell corresponds to default pixel coordinates that cover the top-left portion of the intermediate images from which the Transformed Images are produced for the respective image sizes. In another example, the bottom-right grid cell corresponds to default pixel coordinates that cover the bottom-right portion of the intermediate images from which the Transformed Images are produced for the respective image sizes. The user can click on any one of these nine pre-defined image positions of the grid 356 by operation of the input device(s) 155 of the client computing device 103 to select the corresponding default pixel coordinates that specify a range of pixels in the intermediate images. The Transformed Images for the respective image sizes are updated by copying the range of pixels in the intermediate images as specified by such pixel coordinates, and representations of such updated Transformed Images are displayed simultaneously in the TI area of the display window 301. Note that FIG. 3E shows the Transformed Images for the respective image sizes where such Transformed Images are derived from the pixel coordinates corresponding to the bottom-center cell of grid 356. In this case, the bottom-center portion of the Source Image is used to produce the Transformed Images. In another example, FIG. 3G shows the Transformed Images for the respective image sizes where such Transformed Images are derived from the pixel coordinates corresponding to the top-left cell of grid 356. In this case, the top-center portion of the Source Image is used to produce the Transformed Images.

In block 237, the application executing on the client computing device 103 and the image resizer application component 111 cooperate to optionally present and display user interface controls on the display device(s) 157 of the client computing device 103 that allows a user to edit a particular Transformed Image displayed in the TI area of the display window. In response thereto, the user optionally interacts with such user interface controls by operation of the input device(s) 155 of the client computing device 103 to edit a particular Transformed Image displayed in the TI area of the display window. The editing of the particular Transformed Image can possibly involve changing the part of the Source Image that is used to derive the particular Transformed Image. The editing of the particular Transformed Image can also possibly involve a wide variety of image editing functions, such as changing the format of the Transformed Image (e.g., from PNG to JPEG), modifying the color of the Transformed Image, adding a border or frame to the Transformed Image, applying a filter or other mathematical expression to the Transformed Image an image or image channels, and applying special effects to the Transformed Image (such as blurring, sharpening, thresholding, or tinting all or part of the Transformed Image). Where the image resizer application component 111 is executing on the client computing device 103, the main memory 153 and/or mass storage of the client computing device 103 can be used to store data representing the edited Transformed Image produced in block 233. Where the image resizer application component 111 is executing on the server 107, the main memory 173 and/or mass storage of the server 107 and/or the database 113 can be used to store data representing the edited Transformed Image produced in block 233.

Figure 3I:
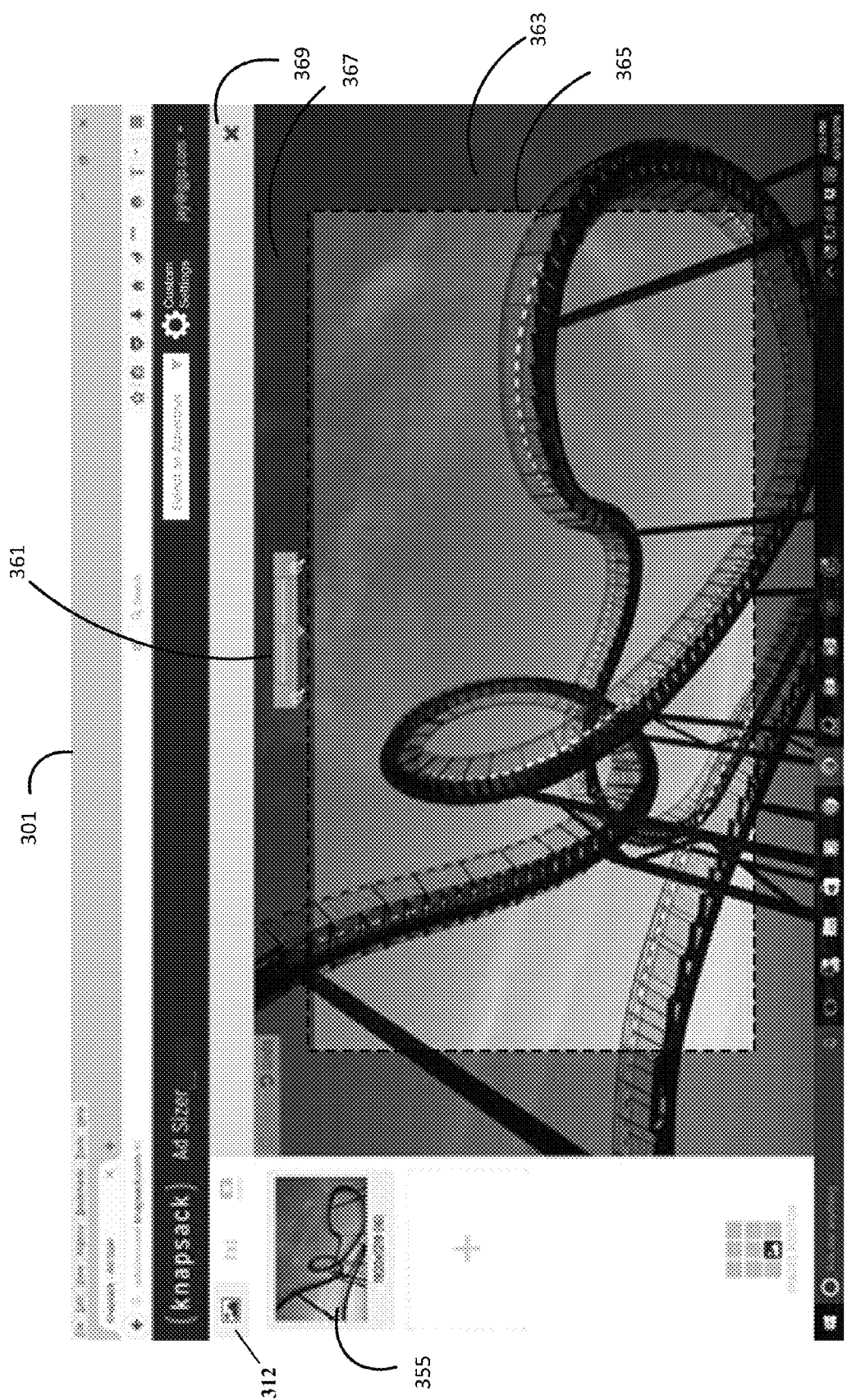
Figure 3J:
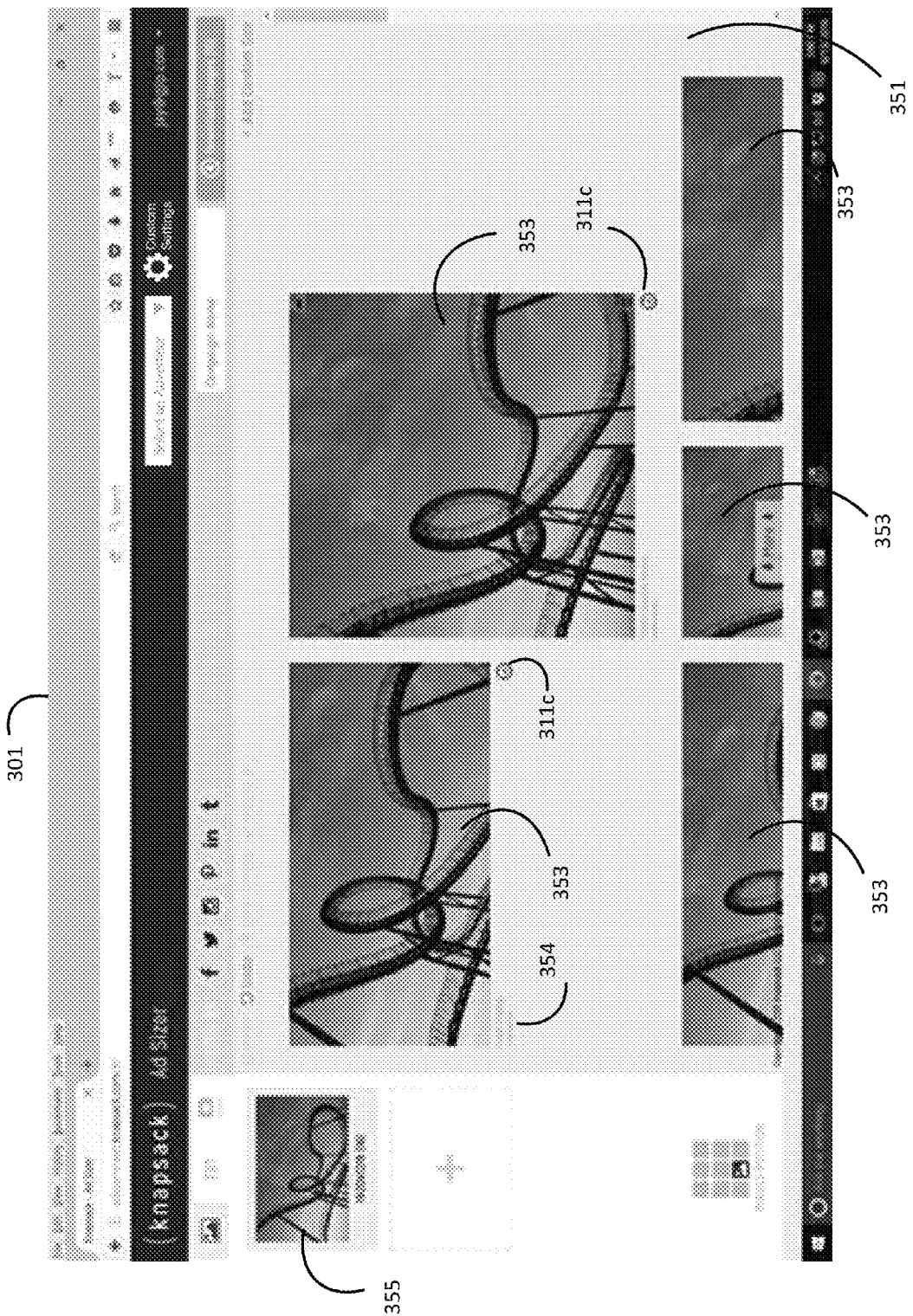
Figure 3K:
Figure 3L:
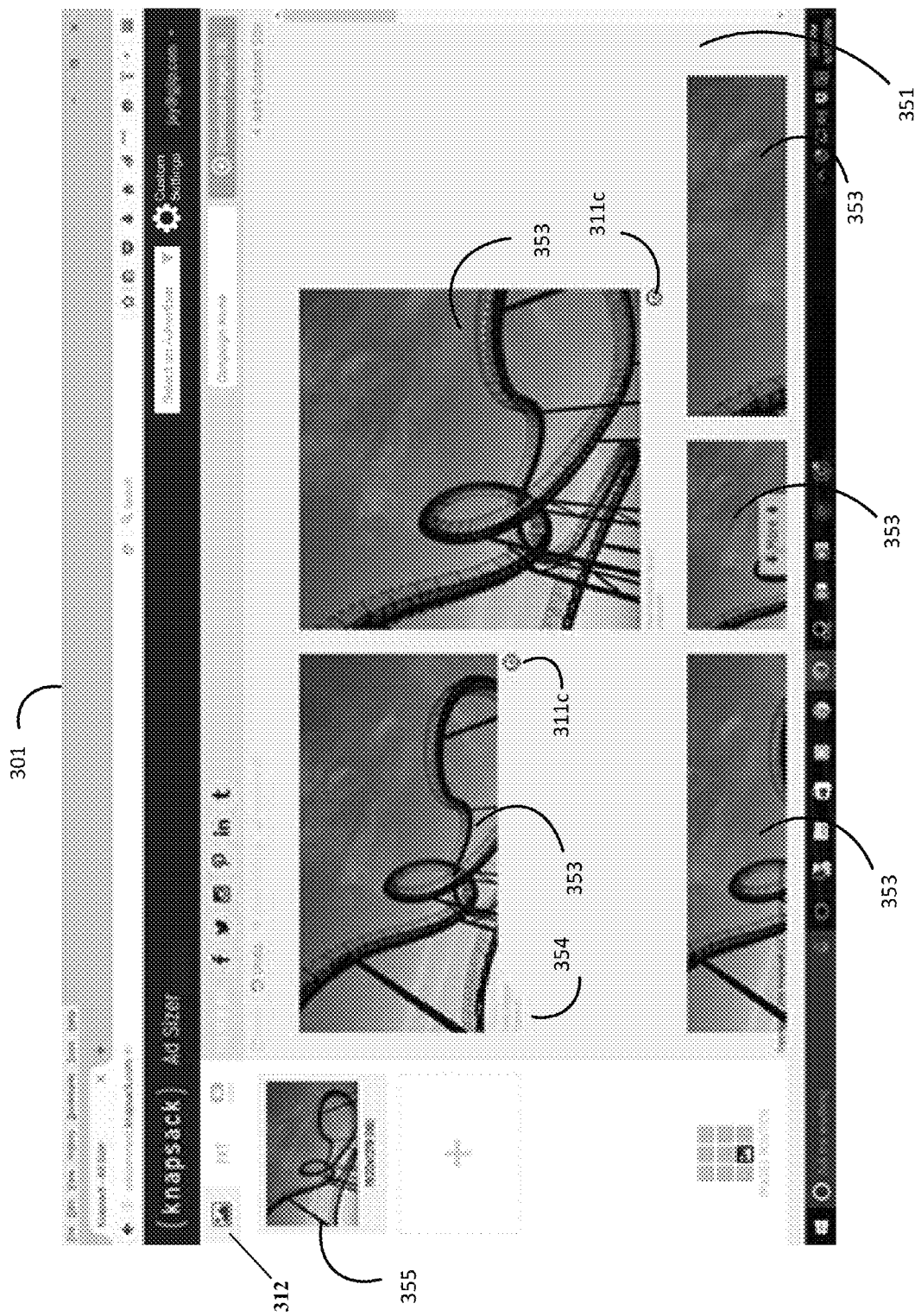

An example of the user interface of block 237 is shown in FIGS. 3H, 3I, 3J, 3K, and 3L where the user has clicked on a particular Transformed Image (specifically, the upper left Transformed Image of FIG. 3G) displayed in the TI area of the display window 301. Specifically, the display window 301 includes a slider bar 361 displayed in conjunction with a representation of the intermediate image 363. The intermediate image 363 is produced by scaling the Source Image 355 by the scale factor SF for the image size that corresponds to the particular Transformed Image. An overlay mask is overlaid on the representation of the intermediate image 363. The size of the overlay mask in pixels matches the size of the intermediate image 363. A part of the overlay mask is defined by pixel coordinates PC that specify a range of pixels in the intermediate image for the image size that corresponds to the particular Transformed Image. This overlay mask part is made completely transparent and labeled by dotted line 365 for purposes of description. The other parts of the overlay mask (labeled 367) are assigned to a dark color (such as blue) with less transparency. In this configuration, the contrast provided by the transparent part 365 of the overlay mask and the less-transparent other part 367 of the overlay mask visually identifies that part of the intermediate image that will be used to produce the particular Transformed Image. The user can manipulate the slider bar 361 to adjust the scale factor SF. For example, moving the slider bar 361 to the right increases the scale factor SF, while moving the slider bar to the left decreases the scale factor SF. As the scale factor SF is changed by manipulation of the slider bar 361, the intermediate image 363 is updated by scaling the Source Image 355 with the updated scale factor SF, and the display window 301 is updated to display the representation of the updated intermediate image. Furthermore, the user can click on the transparent part 365 of overlay mask and move it to adjust which part of the intermediate region it covers. The size of the transparent part 365 of the overlay mask remains the same as it moves. The pixel coordinates PC that specify the range of pixels in the intermediate image 363 are updated to correspond to the movement of the transparent part 365 of the overlay mask. Note that the pixel coordinates PC are used to copy the corresponding pixel data values of the intermediate image to produce the particular Transformed Image. After adjusting the scale factor SF by moving the slider bar 361 and/or moving the transparent part 365 of overlay mask, the user can save the changes by clicking on the X button 369 as shown. After saving the changes, the pixel coordinates PC are used to copy the corresponding pixel data values of the intermediate image 363 (which is produced by scaling the Source Image 355 by the scale factor SF) to update the Transformed Image, and the TI area of the display window 301 is rendered and displayed to include a representation of the updated Transformed Image along with representations of one or more other non-edited Transformed Images. FIG. 3I shows an example where the user has manipulated the slider bar 361 to increase the scale factor SF, the intermediate image 363 is updated by scaling the Source Image 355 with the increased scale factor SF, and the display window 301 is updated to display the representation of the updated intermediate image. FIG. 3J shows the TI area of the display window 301 after saving the changes of FIG. 3I, which displays a representation of the updated Transformed Image (in this case, an update to the upper left Transformed Image). FIG. 3K shows an example where the user has clicked on and moved the transparent part 365 of overlay mask, and the pixel coordinates PC that specify the range of pixels in the intermediate image 363 have been updated to correspond to the movement of the transparent part 365 of the overlay mask. FIG. 3L shows the TI area of the display window 301 after saving the changes of FIG. 3K, which displays a representation of the updated Transformed Image (in this case, an update to the upper left Transformed Image) where the updated pixel coordinates PC are used to copy the corresponding pixel data values of the intermediate image to produce the particular Transformed Image.

Figure 3M:
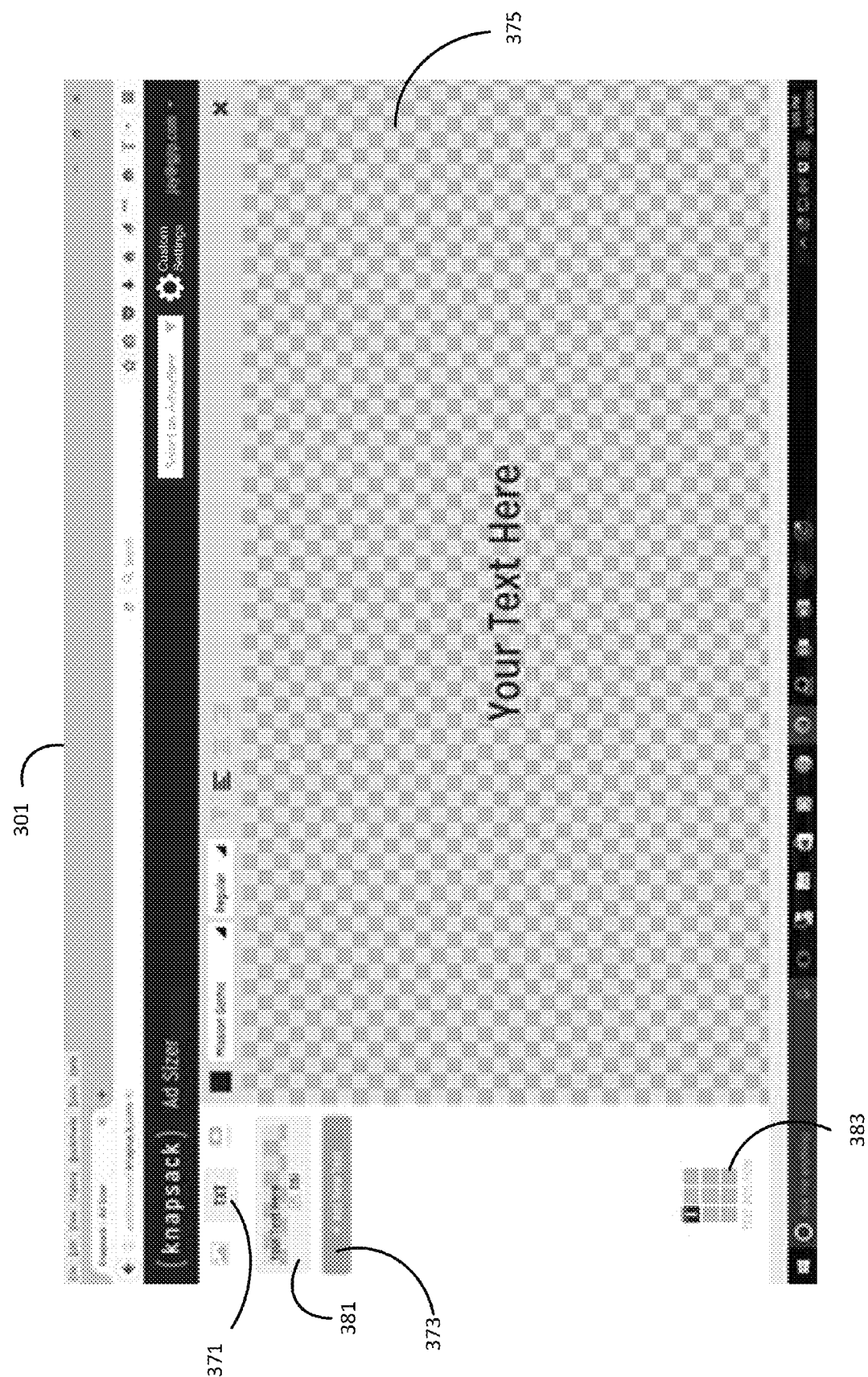
FIGS. 3M and 3N are views of an exemplary graphical user interface that can be implemented by cooperation of the client computer device and the image resizer application component of the server of FIG. 1B as part of block 239 of the image resizing application program of FIGS. 2A to 2H according to an embodiment of the present disclosure.
Figure 3N:
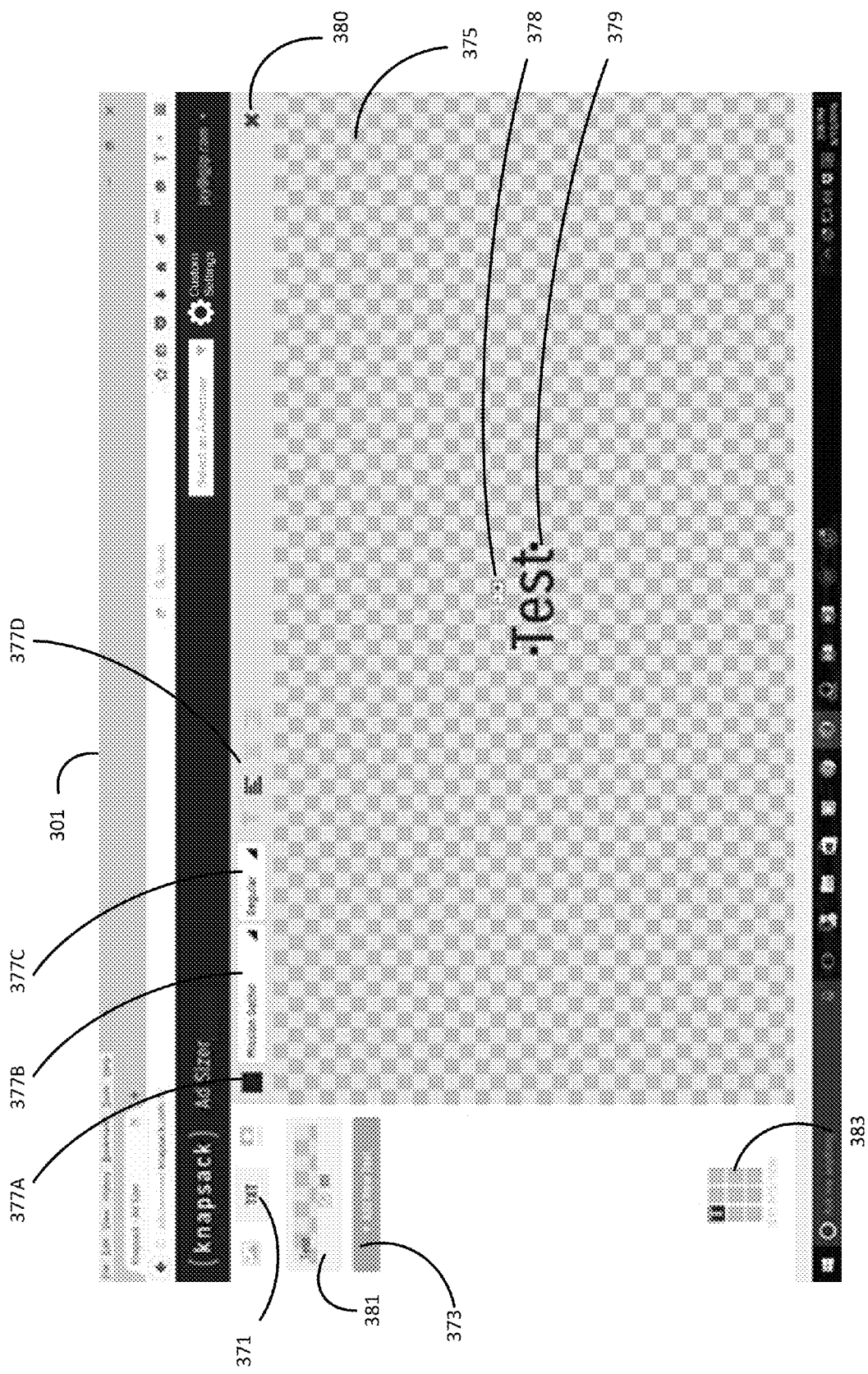
Figure 3O:
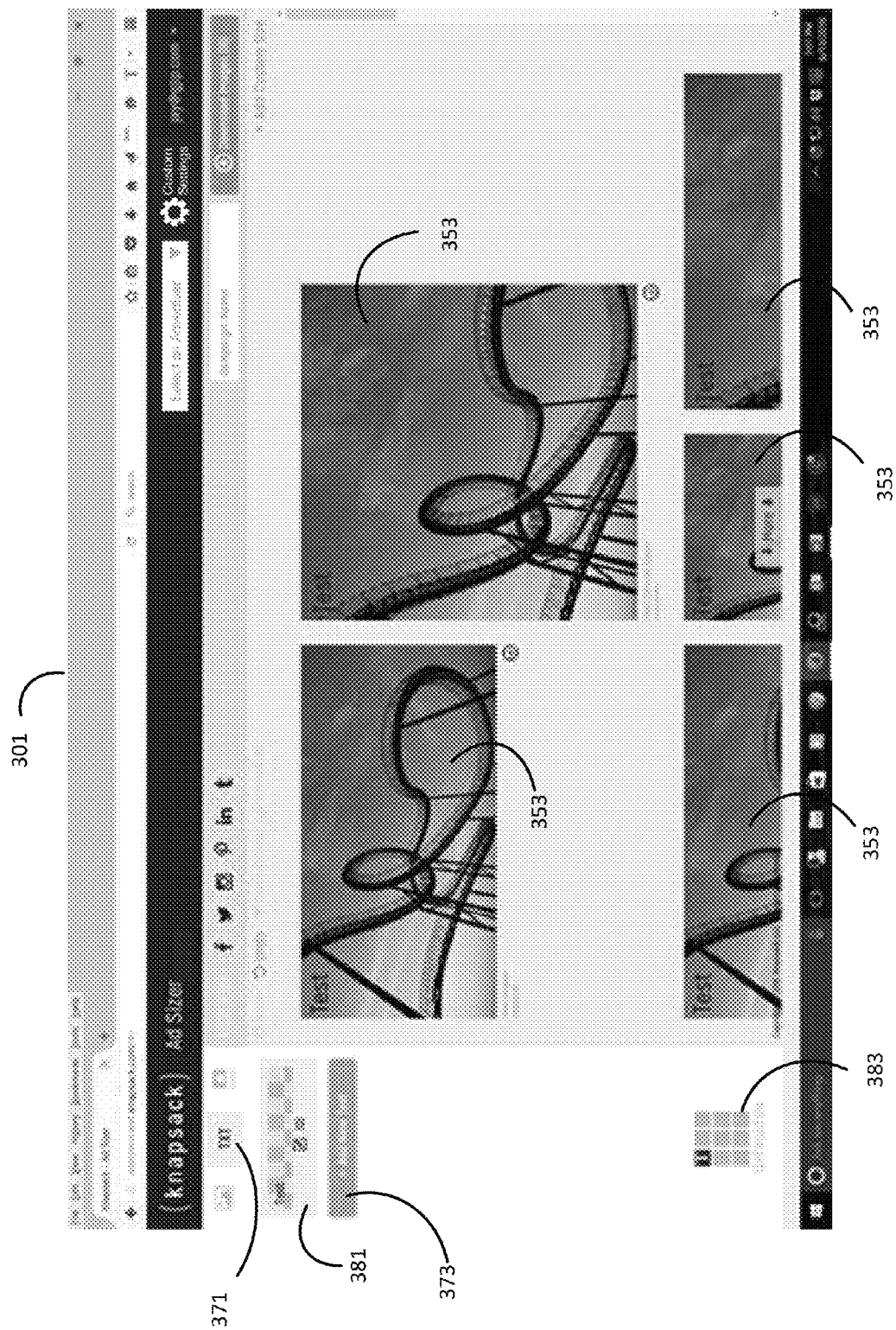
FIGS. 3O and 3P are views of an exemplary graphical user interface that can be implemented by cooperation of the client computer device and the image resizer application component of the server of FIG. 1B as part of block 243 of the image resizing application program of FIGS. 2A to 2H according to an embodiment of the present disclosure.

In block 239, the application executing on the client computing device 103 and the image resizer application component 111 cooperate to optionally present and display user interface controls on the display device(s) 157 of the client computing device 103 that allows a user to specify an overlay text item and associated properties. In response thereto, the user optionally interacts with such user interface controls to specify an overlay text item and associated properties. An example of such user interface controls is shown in FIGS. 3M and 3N where the user first clicks on the "txt" button 371 or the "Add New Text" button 373 of the display window 301, and the display window 301 is updated with reserved space 375 that allows for user to specify a text item. The display window 301 also includes user controls such as pull-down lists, widgets and buttons that allow the user to specify certain properties associated with the text item. For example, the display window can include a widget 377A that allows the user to specify color for the text item, a drop down list 377B that allows the user to specify a font family for the text item, a drop down list 377C that allows the user to specify format options (such as underlining and bold typeface) for the text item, and buttons 377D that allows the user to specify other format options (such as left, center or right justification) for the text item The inputted text item is displayed in the reserved space 375 as shown in FIG. 3N with "+" and "−" buttons adjacent the text item (labeled 378) that are selected by user input to allow the user to increase or decrease the font size of the text item. The text item can wrap within a box 379 as shown in FIG. 3N. The size of the box 379 can be manipulated by user input to allow the user to specify the layout of the text item. After specifying the text item and its associated properties, the user can save the text item by clicking on the X button 380 as shown. The specified text item is then displayed in reserved screen space 381 in the left panel adjacent the TI area of the display window 301 as shown in FIG. 3O.

Figure 2A:
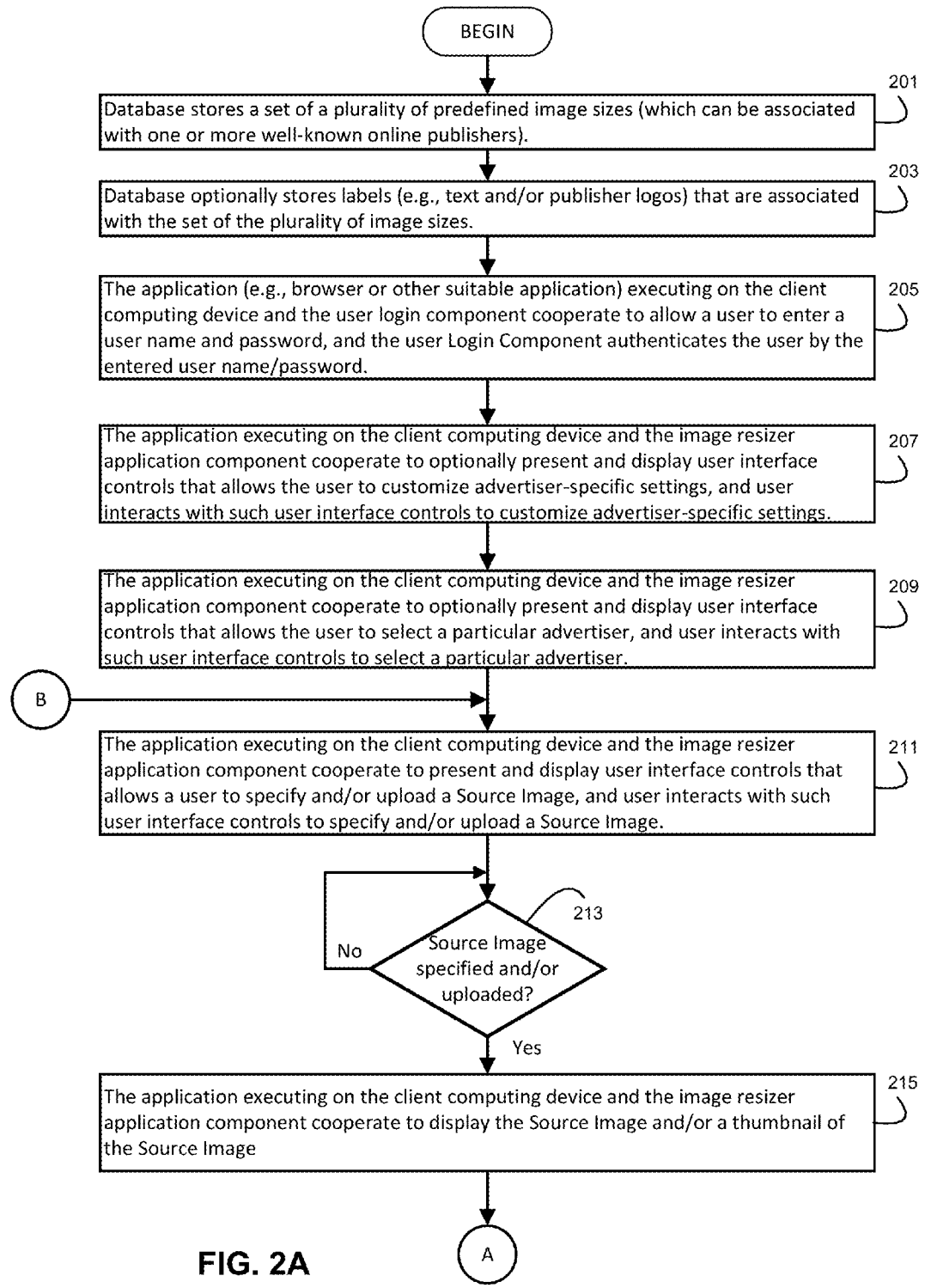
FIGS. 2A to 2H, collectively, is a flowchart illustrating operations of the components of the client computing device and server of FIG. 1B that implement an image resizing application program according to an embodiment of the present disclosure.
Figure 2B:
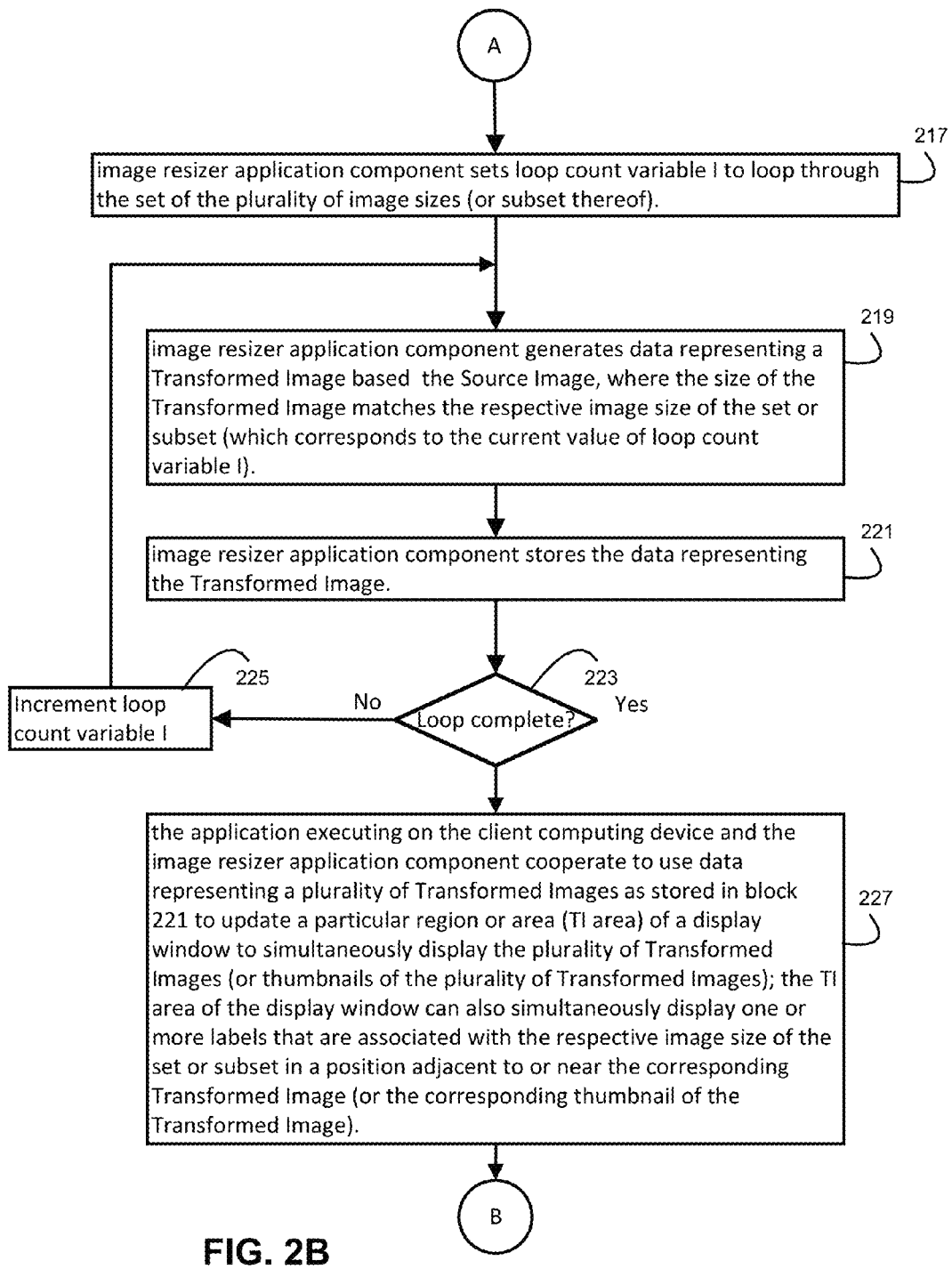
Figure 2C:
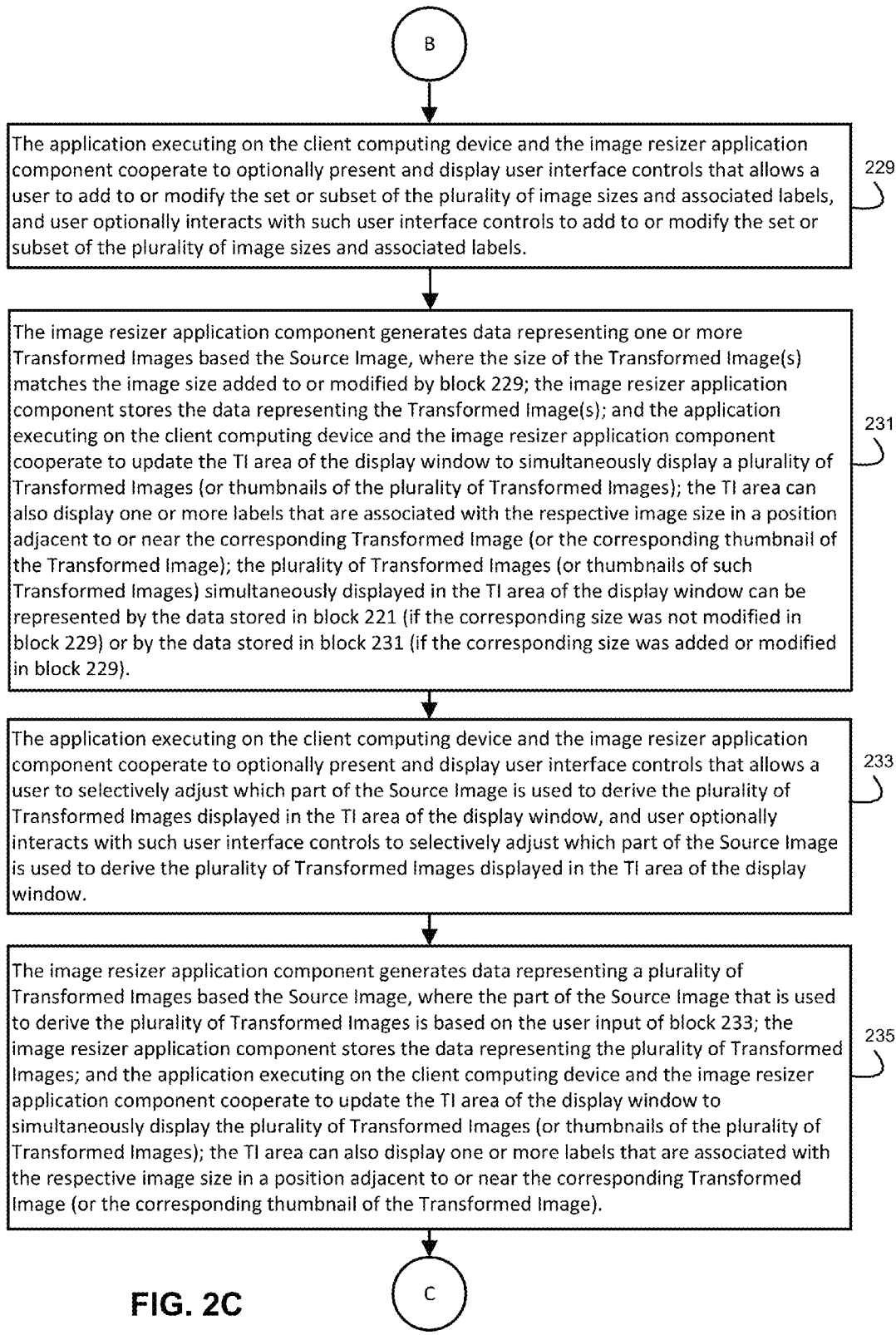
Figure 2D:
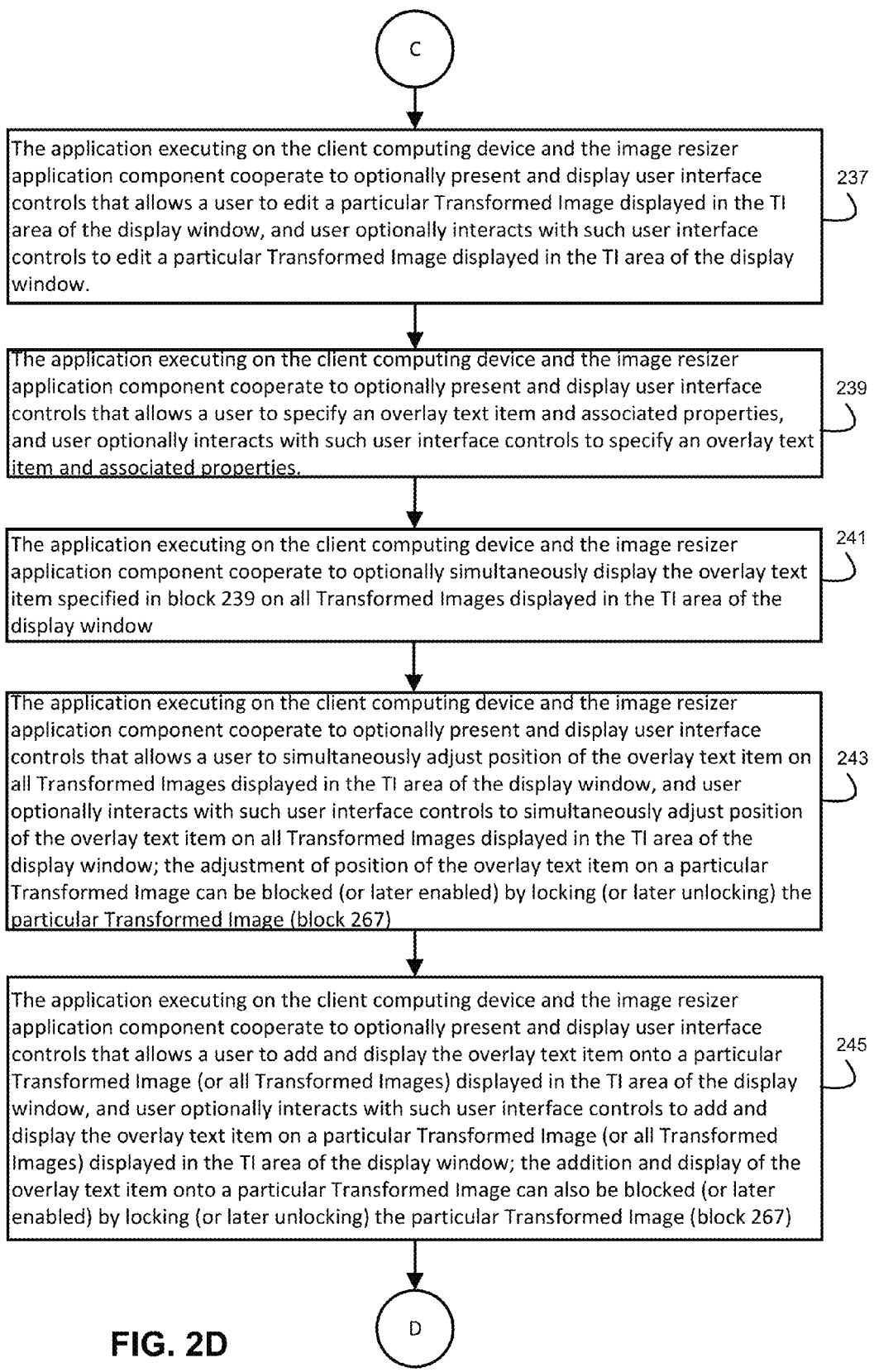
Figure 2E:
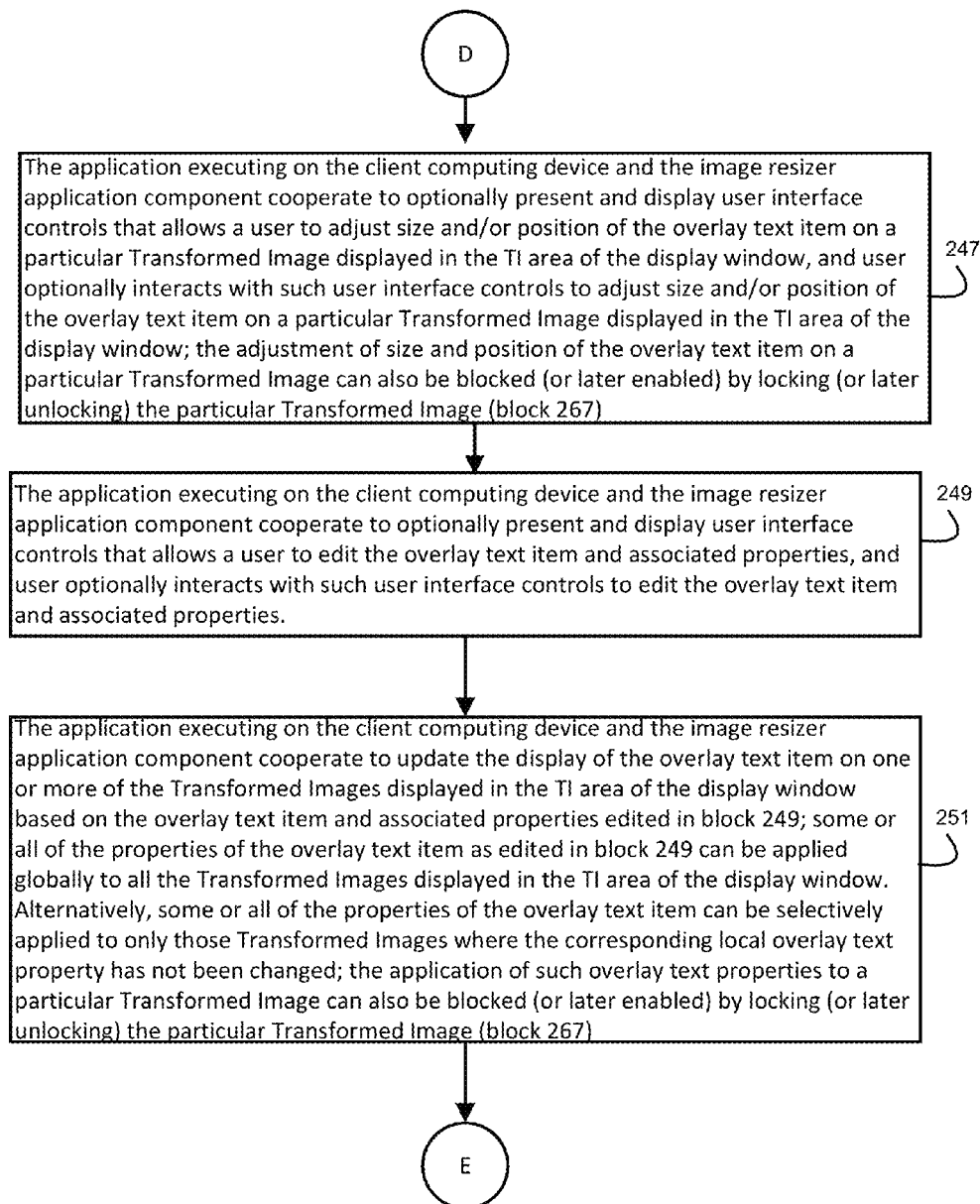
Figure 2F:
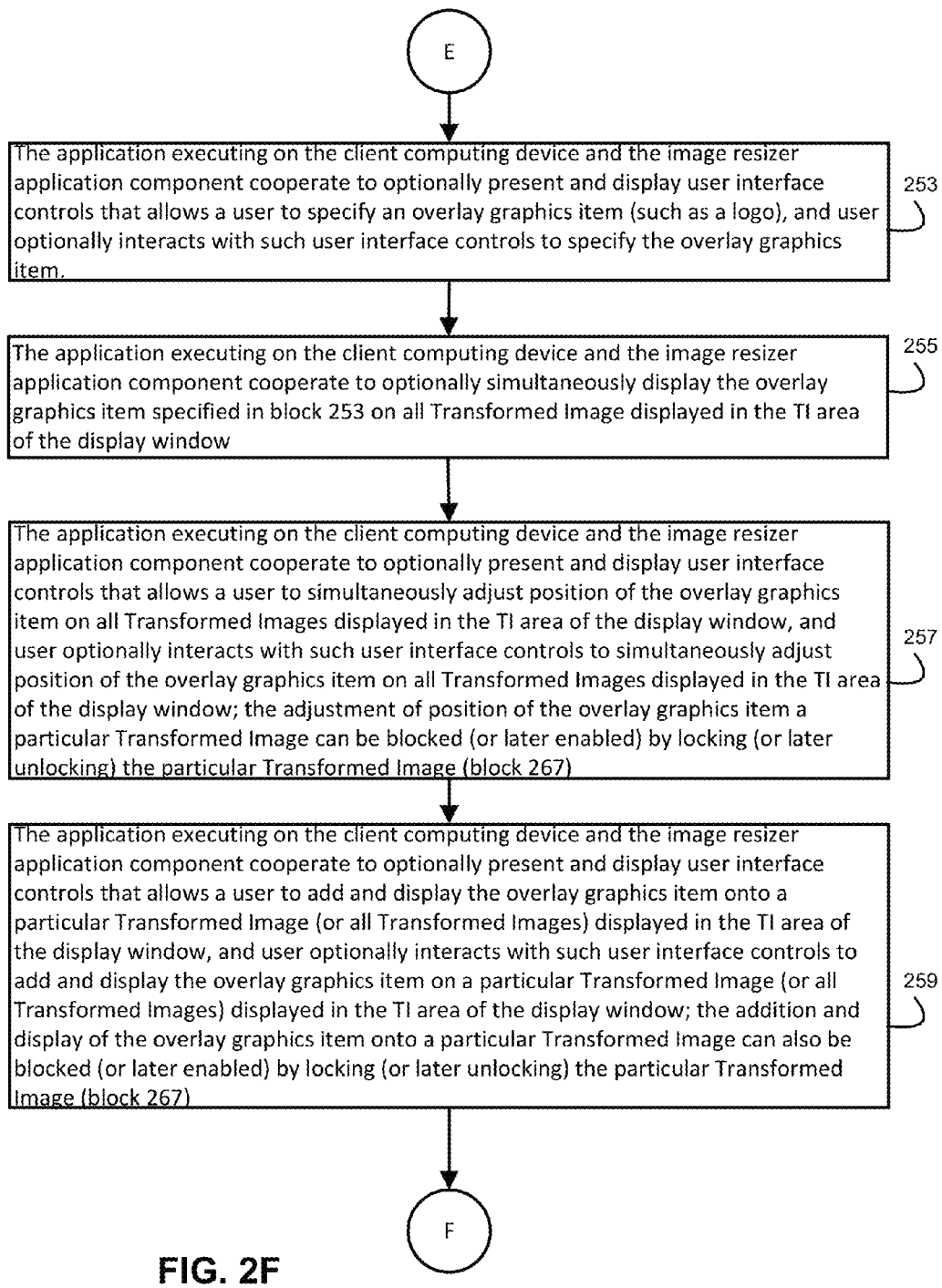
Figure 2G:
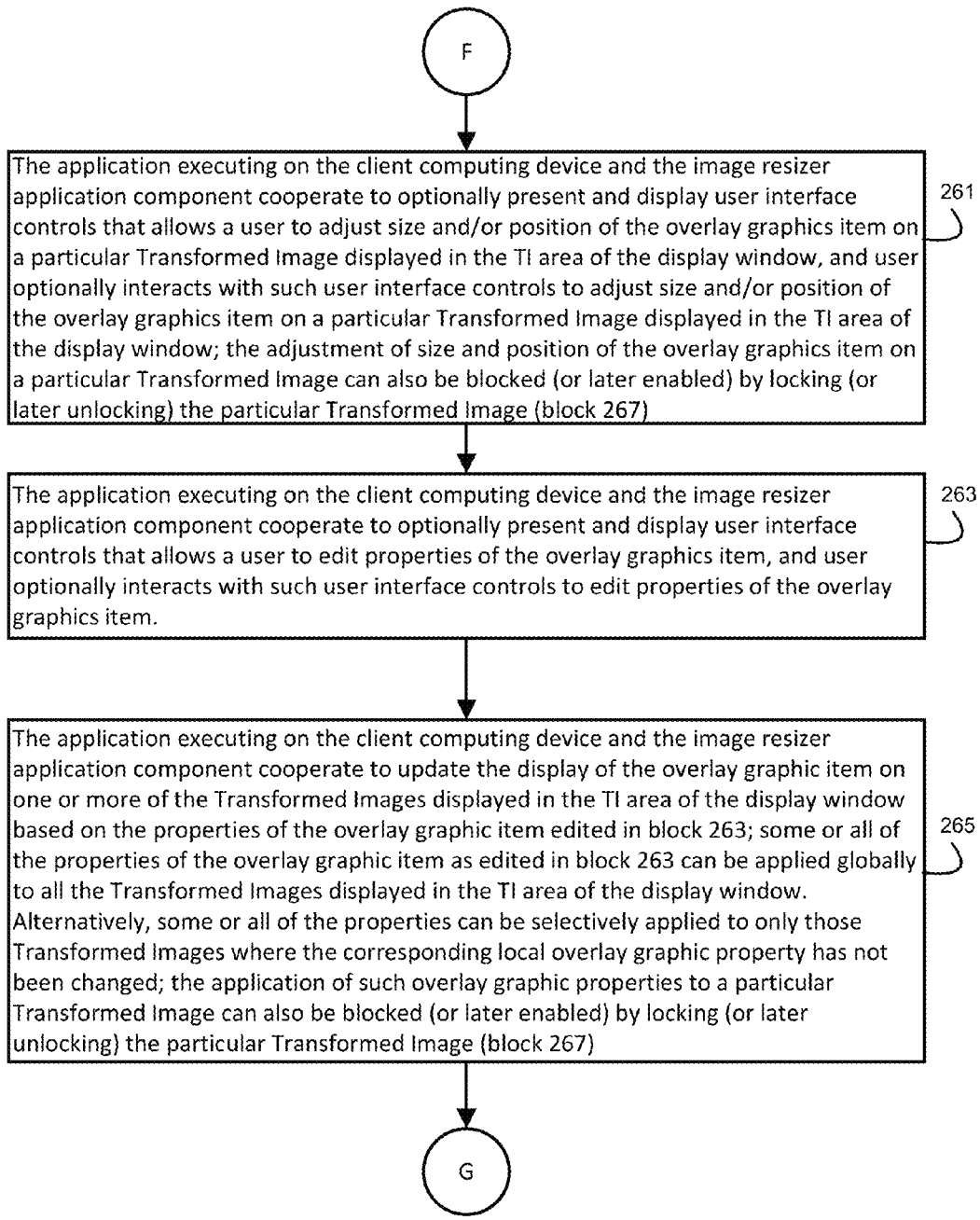
Figure 2H:
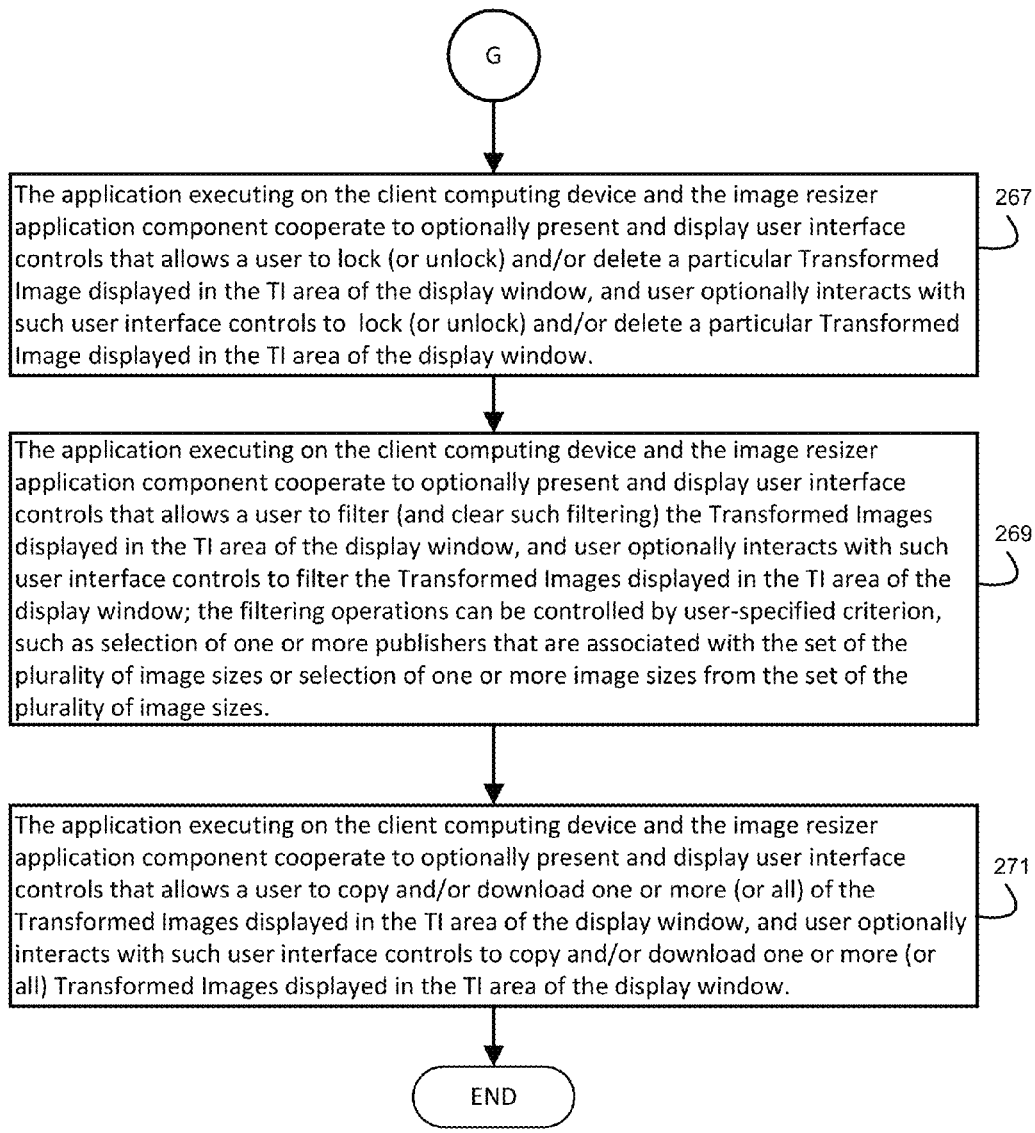
Figure 2I:
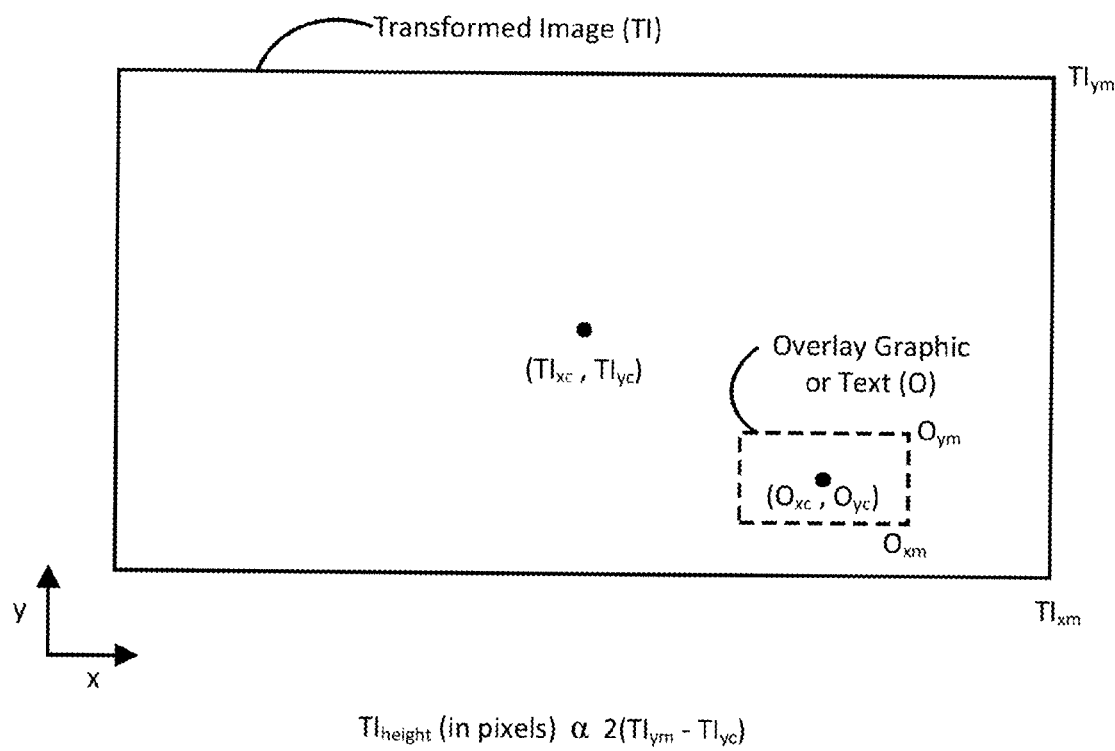
FIG. 2I is a schematic illustration of exemplary data that represents relative position of overlay graphic or text as well as size (in pixels) of the overlay graphic or text where the overlay graphic or text is displayed on a transformed (resized) image as part of the operations of FIGS. 2A to 2H.
Figure 3P:
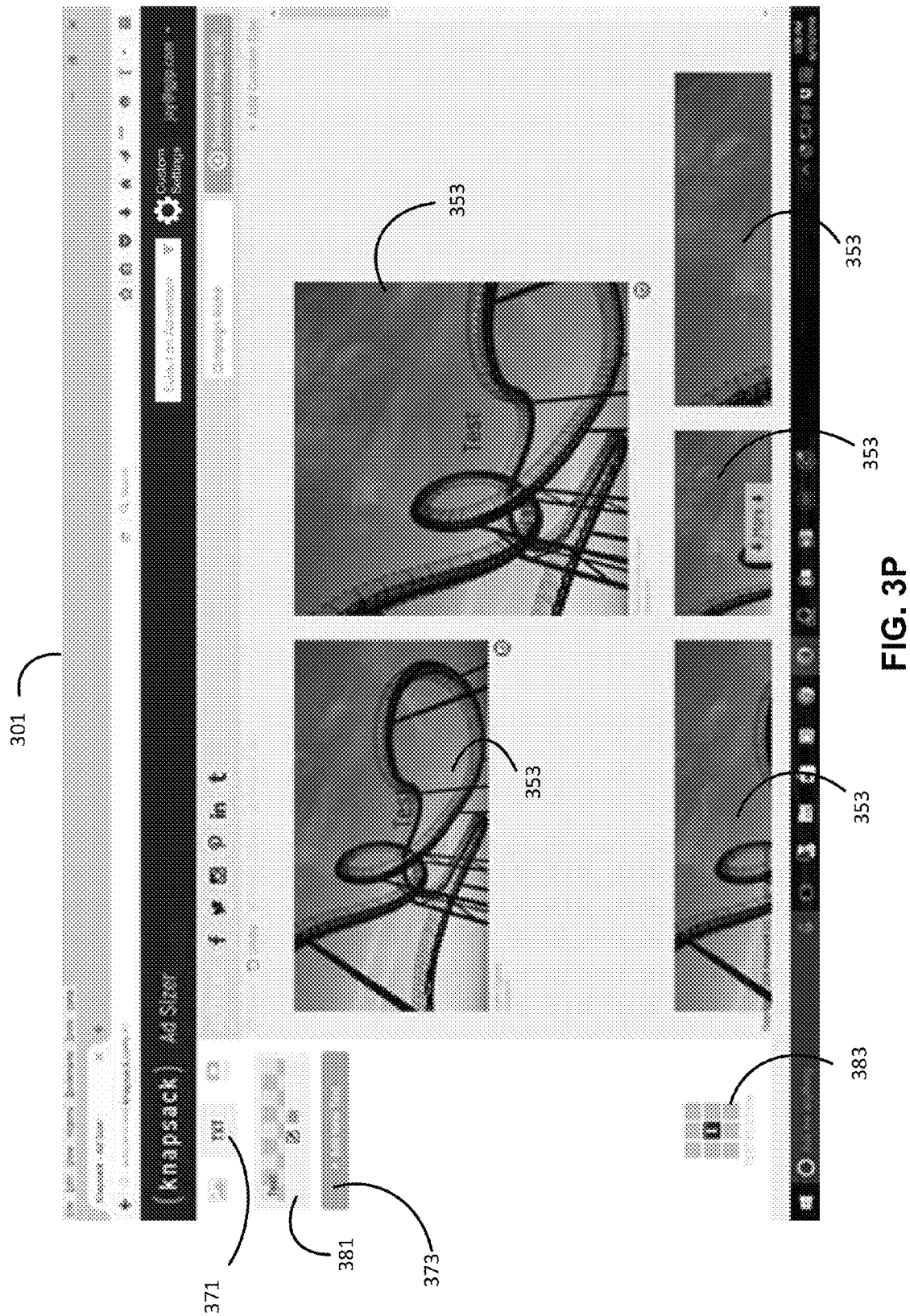

In block 241, the application executing on the client computing device 103 and the image resizer application component 111 cooperate to optionally simultaneously display on the display device(s) 157 of the client computing device 103 the overlay text item specified in block 239 on all Transformed Images displayed in the TI area of the display window. For example, in response to the user saving the text item by clicking on the X button 380 of FIG. 3N, the text item can be overlaid on all of the Transformed Images displayed in the TI area of the display window 301 as shown in FIG. 3P. In this case, the initial overlay position of the text item on each one of the Transformed Images displayed in the TI area 351 of the display window 301 can be dictated by a default position. Where the image resizer application component 111 is executing on the client computing device 103, the main memory 153 and/or mass storage of the client computing device 103 can be used to store data representing the overlay text (including its size) and the relative position of the overlay text as overlaid on a particular Transformed Image as displayed in the TI area 351 of the display window 301. Where the image resizer application component 111 is executing on the server 107, the main memory 173 and/or mass storage of the server 107 and/or the database 113 can be used to store data representing the overlay text (including its size) and the relative position of the overlay text as overlaid on a particular Transformed Image as displayed in the TI area 351 of the display window 301. For example, FIG. 2I shows an example where coordinates $TI_{xc}$, $TI_{yc}$ represent the x and y positions of the center of a particular Transformed Image and the coordinates $TI_{xm}$ and $TI_{ym}$ represent the respective maximum x and y positions of the particular Transformed Image. The size (in pixels) of the particular Transformed Image in the x direction, which is designated by the value of $TI_{height}$, is proportional to $2(TI_{xm}-TI_{xc})$, and the size (in pixels) of the particular Transformed Image in the y direction, which is designated by the value $TI_{width}$, is proportional to $2(TI_{ym}-TI_{yc})$. Similarly, coordinates $O_{xc}$, $O_{yc}$ represent the x and y positions of the center of an overlay text item and the coordinates $O_{xm}$ and $O_{ym}$ represent the respective maximum x and y positions of the overlay text item. The size (in pixels) of the overlay text in the x direction, which is designated by the value $O_{height}$, is proportional to $2(O_{xm}-O_{xc})$, and the size (in pixels) of the overlay text in the y direction, which is designated by the value $O_{width}$, is proportional to $2(O_{ym}-O_{yc})$.

In one embodiment, DIV tags and CSS positional attributes can be used to overlay text on a Transformed Image (background image). For example, illustrative HTML code that overlays text on a Transformed Image can be given as:

```
<div style="position: relative; background: url(path to Transformed Image); width: (width)px; height: (height)px;">
    <div style="position: absolute; bottom: 0; left: 0.5em; width: 400px; font-weight: bold; color: #fff;">
        <p>(text to overlay at the bottom left of the Transformed Image)</p>
    </div>
</div>
```

In this approach, the first DIV tag defines the area where the Transformed Image (background image) appears and it employs relative positioning such that the text that it contains can be properly placed. This is done by the second DIV tag which employs absolute positioning with one or more of the positional attributes: top, right, bottom and left. The <p> tag specifies the text that is to be overlaid on the Transformed Image.

It is also possible to separate the CSS style from the content by assigning CSS classes to the various container elements. For example, illustrative HTML code that overlays text on a Transformed Image can be given as:

```
<style type="text/css">
    .image-container {
        position: relative;
        width: 500px;
        height: 309px;
    }
    .bottomleft {
        position: absolute;
        bottom: 0;
        left: 0.5em;
        width: 400px;
        font-weight: bold;
        color: #fff;
    }
</style>
<div class="image-container">
    <img src=url(path to Transformed Image) />;
    <div class="bottomleft">
        <p>(text to overlay at the bottom left of the Transformed Image)</p>
    </div>
</div>
```

In this approach, the "image-container" class of the first DIV tag defines the area where the Transformed Image (background image) appears and it employs relative positioning such that the text that it contains can be properly placed. The "bottomleft" class of the second DIV tag employs absolute positioning with one or more or of the positional attributes: top, right, bottom and left. The <p> tag specifies the text that is to be overlaid on the Transformed Image. The result is identical to the previous example, but now much easier to maintain as the HTML and CSS can be edited independently. Note that the position of the overlay text can be derived from variables that are defined from default values and possibly updated based upon user input actions as described herein. Note that other suitable mechanisms can be used to overlay one or more text items on a Transformed Image (background image) for display in the TI area of the display window 301. The image resizer application component 111 can generate the HTML code that represents the Transformed Images and corresponding overlay text item(s) and pass (output) such HTML code to the application executing on the client computing device 103 (e.g., web browser) for rendering and displaying the Transformed Images and corresponding overlay text item(s) in the TI area of the display window 301.

In block 243, the application executing on the client computing device 103 and the image resizer application component 111 cooperate to optionally present and display user interface controls on the display device(s) 157 of the client computing device 103 the that allows a user to simultaneously adjust position of the overlay text item on all Transformed Images displayed in the TI area of the display window. In response thereto, the user optionally interacts with such user interface controls to simultaneously adjust position of the overlay text item on all Transformed Images displayed in the TI area of the display window. Note that the adjustment of position of the overlay text item on a particular Transformed Image can be blocked (or later enabled) by locking (or later unlocking) the particular Transformed Image (block 267). An example of such user interface controls is shown in FIGS. 3O and 3P where a grid 383 is displayed in the left panel of the display window 301. The grid 383 specifies nine different predefined overlay positions. The user can click on the overlay text item displayed in the reserved screen space 381 to select the text item and then click on any one of the nine predefined overlay positions of the grid 383 by operation of the input device(s) 155 of the client computing device 103 to select the corresponding predefined overlay position. In response thereto, the overlay position of the text on each one of the Transformed Images displayed in the TI area 351 of the display window 301 is adjusted such that it corresponds to the selected predefined overlay position of the grid 383. FIG. 3O shows the text item "Test" displayed in the upper-left corner on each one of the Transformed Images in correspondence with the upper-left overlay position of the grid 383. FIG. 3P shows the text item "Test" displayed in the middle of each one of the Transformed Images in correspondence with the user selecting the middle overlay position of the grid 383 as shown.

Figure 3Q:
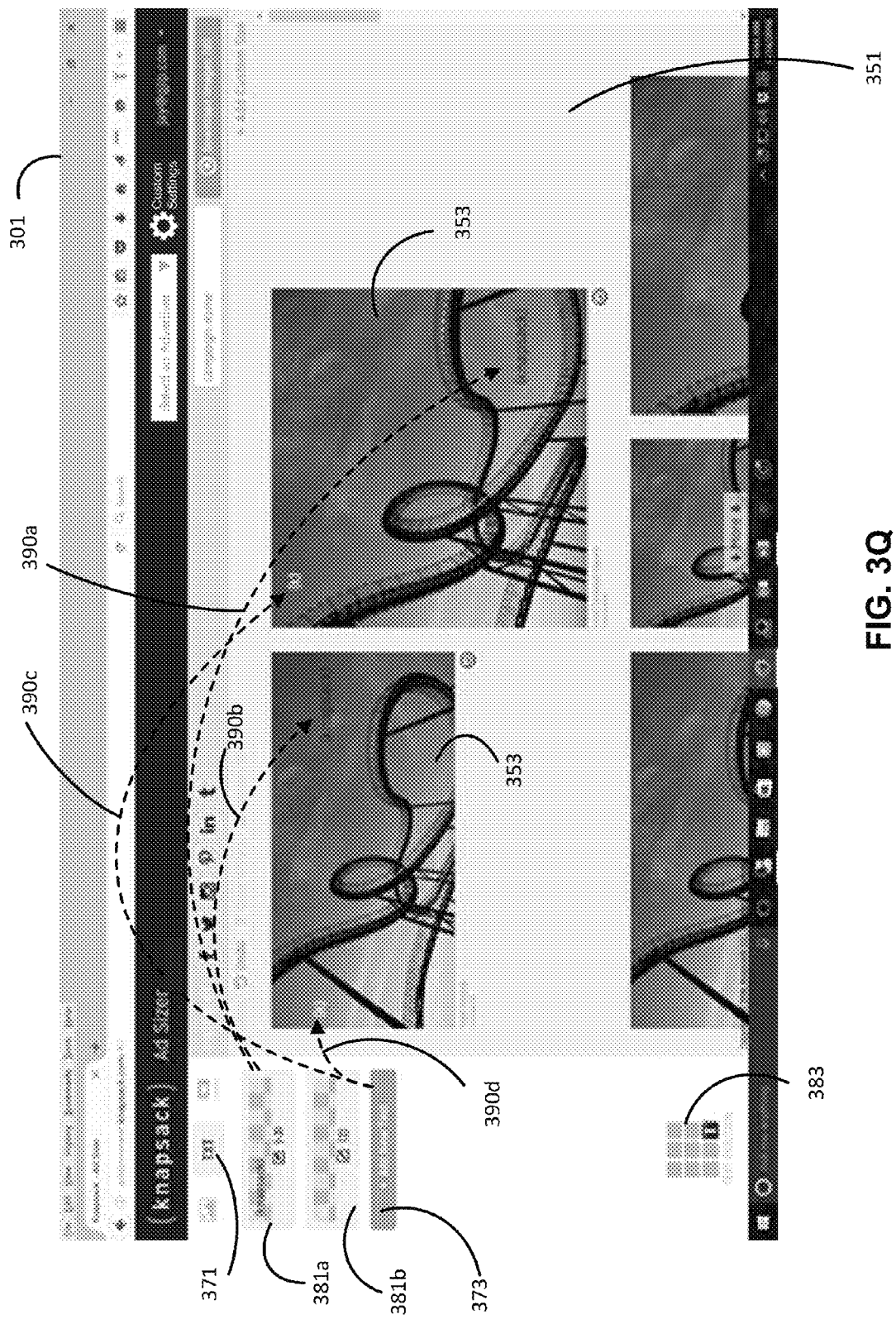
FIG. 3Q is a view of an exemplary graphical user interface that can be implemented by cooperation of the client computer device and the image resizer application component of the server of FIG. 1B as part of block 245 of the image resizing application program of FIGS. 2A to 2H according to an embodiment of the present disclosure.

In block 245, the application executing on the client computing device 103 and the image resizer application component 111 cooperate to optionally present and display user interface controls on the display device(s) 157 of the client computing device 103 that allows a user to overlay text onto a particular Transformed Image (or all Transformed Images) displayed in the TI area of the display window. In response thereto, the user optionally interacts with such user interface controls by operation of the input device(s) 155 of the client computing device 103 to overlay text onto a particular Transformed Image (or all Transformed Images) displayed in the TI area of the display window. An example of such user interface controls is shown in FIG. 3Q where the user as specified two overly text items "(knapsack)" and "(k)" as displayed in the reserved screen spaces 381a and 381b. The user can then drag and drop the text item from its reserved space 381a or 381b onto one or more of the Transformed Images displayed in the TI area 351 of the display window 301 by operation of the input device(s) 155 of the client computing device 103 in order to overlay the text onto the one or more of the Transformed Images. Examples of such drag and drop operations are illustrated schematically by arrows 390*a*, 390*b*, 390*c* and 390*d* in FIG. 3Q. The drop position of the text item onto a particular Transformed Image can dictate the initial overlay position of the text item on the particular Transformed Image. The user can also simultaneously overlay the text item onto all of the Transformed Images displayed in the TI area 351 of the display window 301 by dragging and dropping the text item from its reserved space 381*a* or 381*b* onto an area of the TI area 351 that is not occupied by any Transformed Image.

In block 247, the application executing on the client computing device 103 and the image resizer application component 111 cooperate to optionally present and display user interface controls on the display device(s) 157 of the client computing device 103 that allows a user to adjust the size (in pixels) and/or position of the overlay text on a particular Transformed Image displayed in the TI area of the display window. In response thereto, the user optionally interacts with such user interface controls to adjust the size (in pixels) and/or position of the overlay text on a particular Transformed Image displayed in the TI area of the display window. Note that the adjustment of size and position of the overlay text item on a particular Transformed Image can also be blocked (or later enabled) by locking (or later unlocking) the particular Transformed Image (block 267).

Figure 3R:
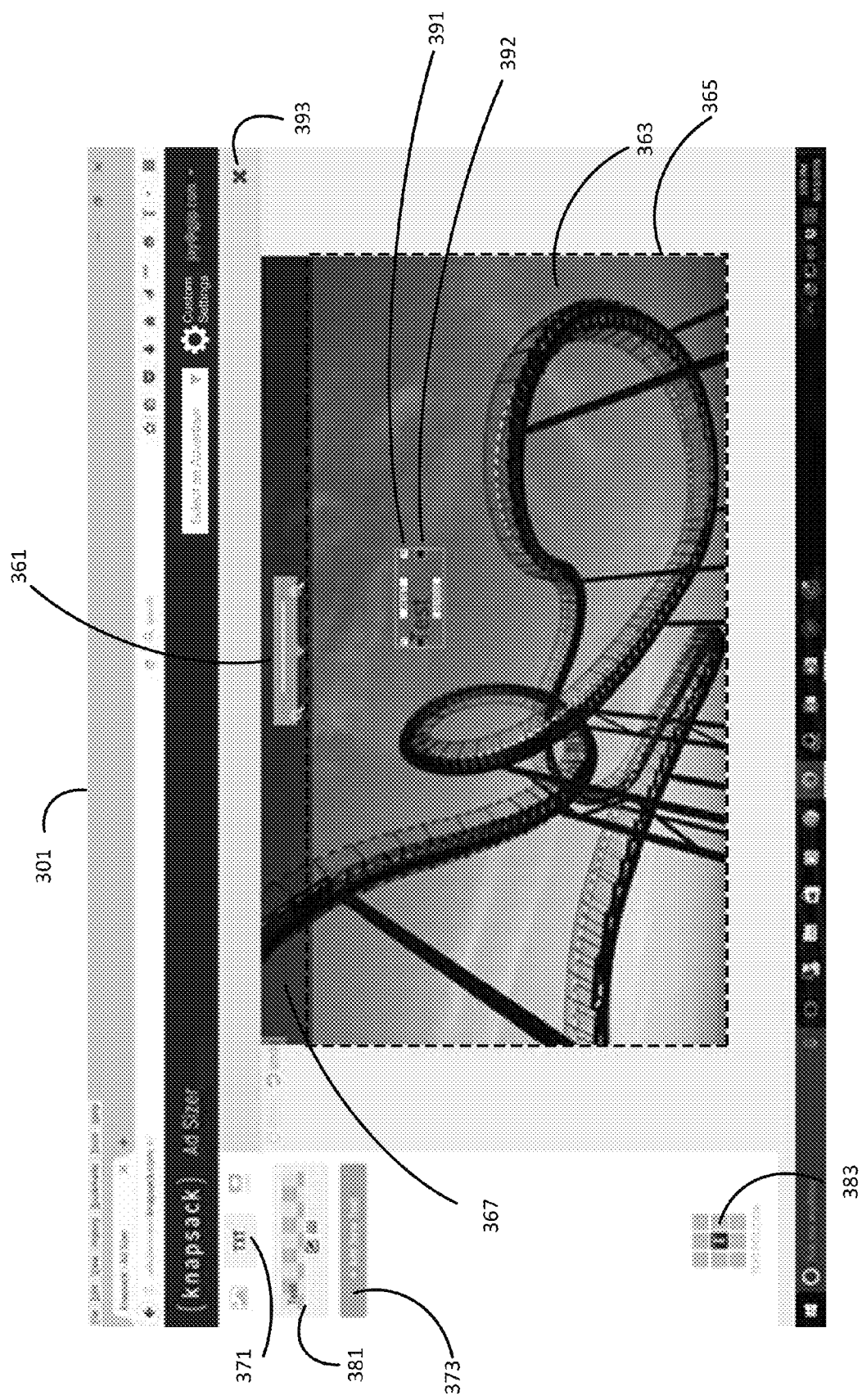
FIGS. 3R and 3S are views of an exemplary graphical user interface that can be implemented by cooperation of the client computer device and the image resizer application component of the server of FIG. 1B as part of block 247 of the image resizing application program of FIGS. 2A to 2H according to an embodiment of the present disclosure.
Figure 3S:
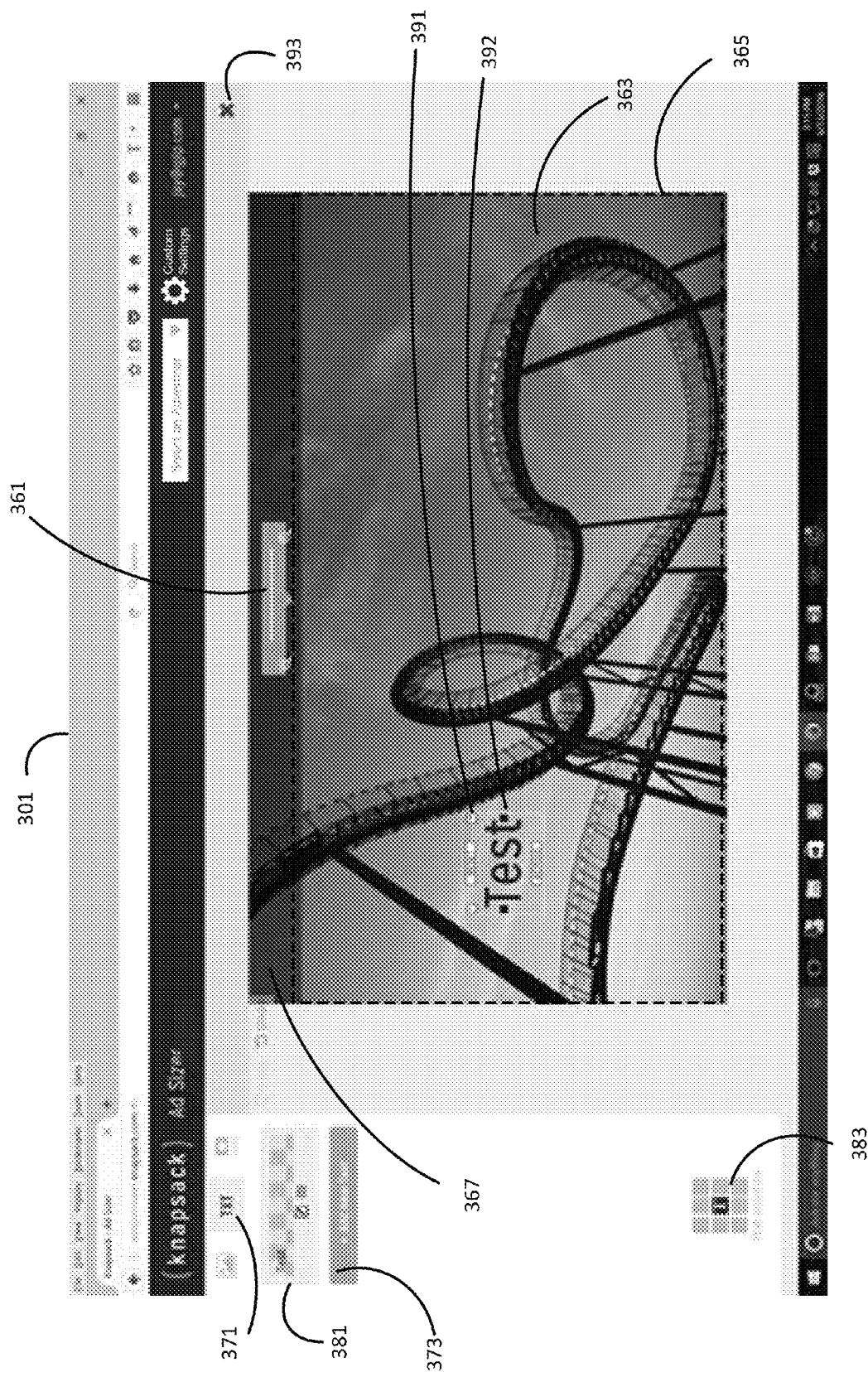

An example of the user interface controls of block 247 is shown in FIGS. 3R and 3S where the user has clicked on a particular Transformed Image (specifically, the upper-left Transformed Image of FIG. 3P) displayed in the TI area of the display window 301. Specifically, the display window 301 includes a slider bar 361 displayed in conjunction with a representation of the intermediate image 363. The intermediate image 363 is produced by scaling the Source Image 355 by the scale factor SF for the image size that corresponds to the particular Transformed Image. An overlay mask is overlaid on the representation of the intermediate image 363. The size of the overlay mask in pixels matches the size of the intermediate image 363. A part of the overlay mask is defined by pixel coordinates PC that specify a range of pixels in the intermediate image for the image size that corresponds to the particular Transformed Image. This overlay mask part is made completely transparent and labeled by dotted line 365 for purposes of description. The other parts of the overlay mask (labeled 367) are assigned to a dark color (such as blue) with less transparency. In this configuration, the contrast provided by the transparent part 365 of the overlay mask and the less-transparent other part 367 of the overlay mask visually identifies that part of the intermediate image that will be used to produce the particular Transformed Image. The user can manipulate the slider bar 361 to adjust the scale factor SF. For example, moving the slider bar 361 to the right increases the scale factor SF, while moving the slider bar to the left decreases the scale factor SF. As the scale factor SF is changed by manipulation of the slider bar 361, the intermediate image 363 is updated by scaling the Source Image 355 with the updated scale factor SF, and the display window 301 is updated to display the representation of the updated intermediate image. Furthermore, the user can click on the transparent part 365 of overlay mask and move it to adjust which part of the intermediate region it covers. The size of the transparent part 365 of the overlay mask remains the same as it moves. The pixel coordinates PC that specify the range of pixels in the intermediate image 363 are updated to correspond to the movement of the transparent part 365 of the overlay mask.

Figure 3T:
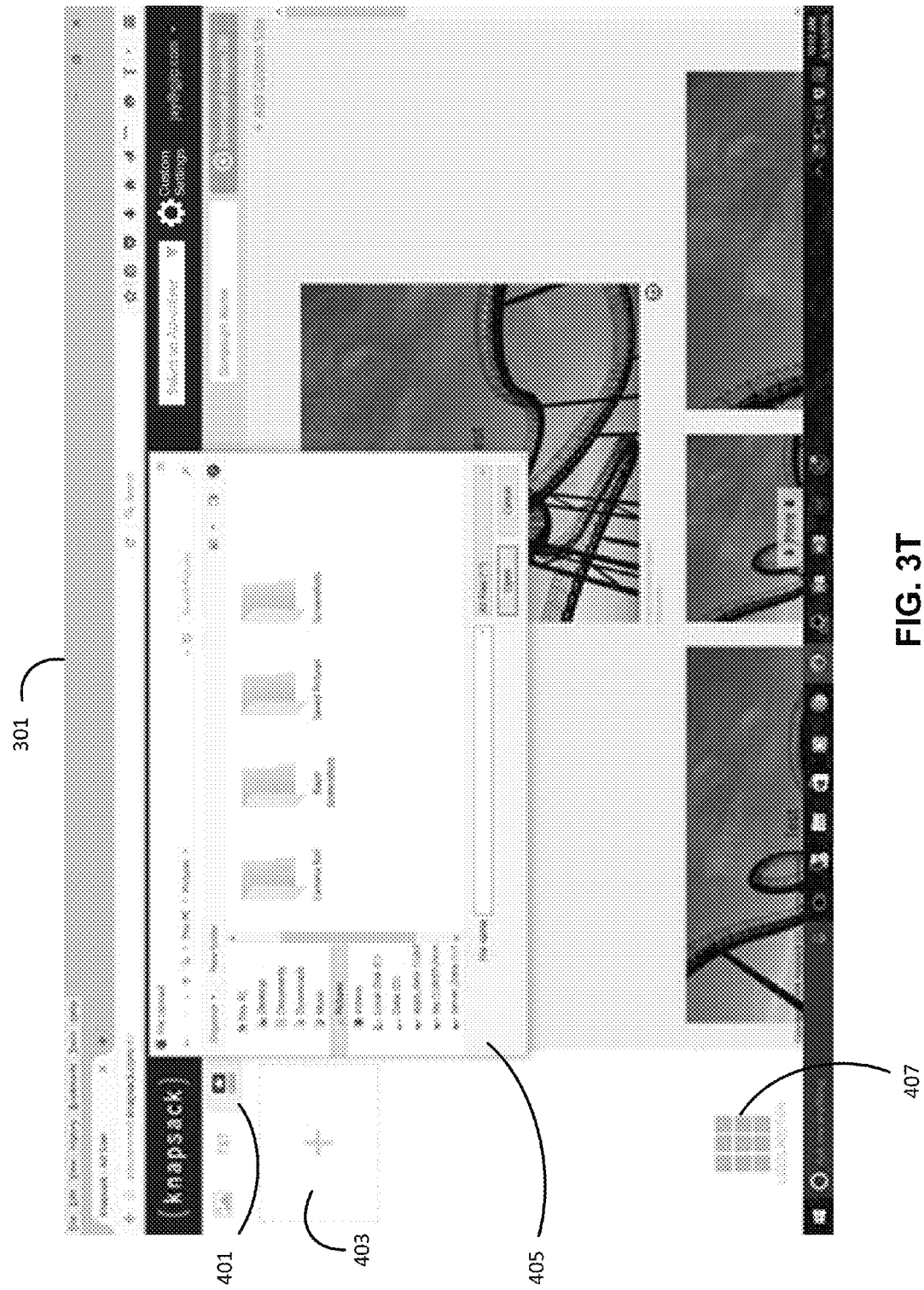
FIG. 3T is a view of an exemplary graphical user interface that can be implemented by cooperation of the client computer device and the image resizer application component of the server of FIG. 1B as part of block 253 of the image resizing application program of FIGS. 2A to 2H according to an embodiment of the present disclosure.
Figure 3U:
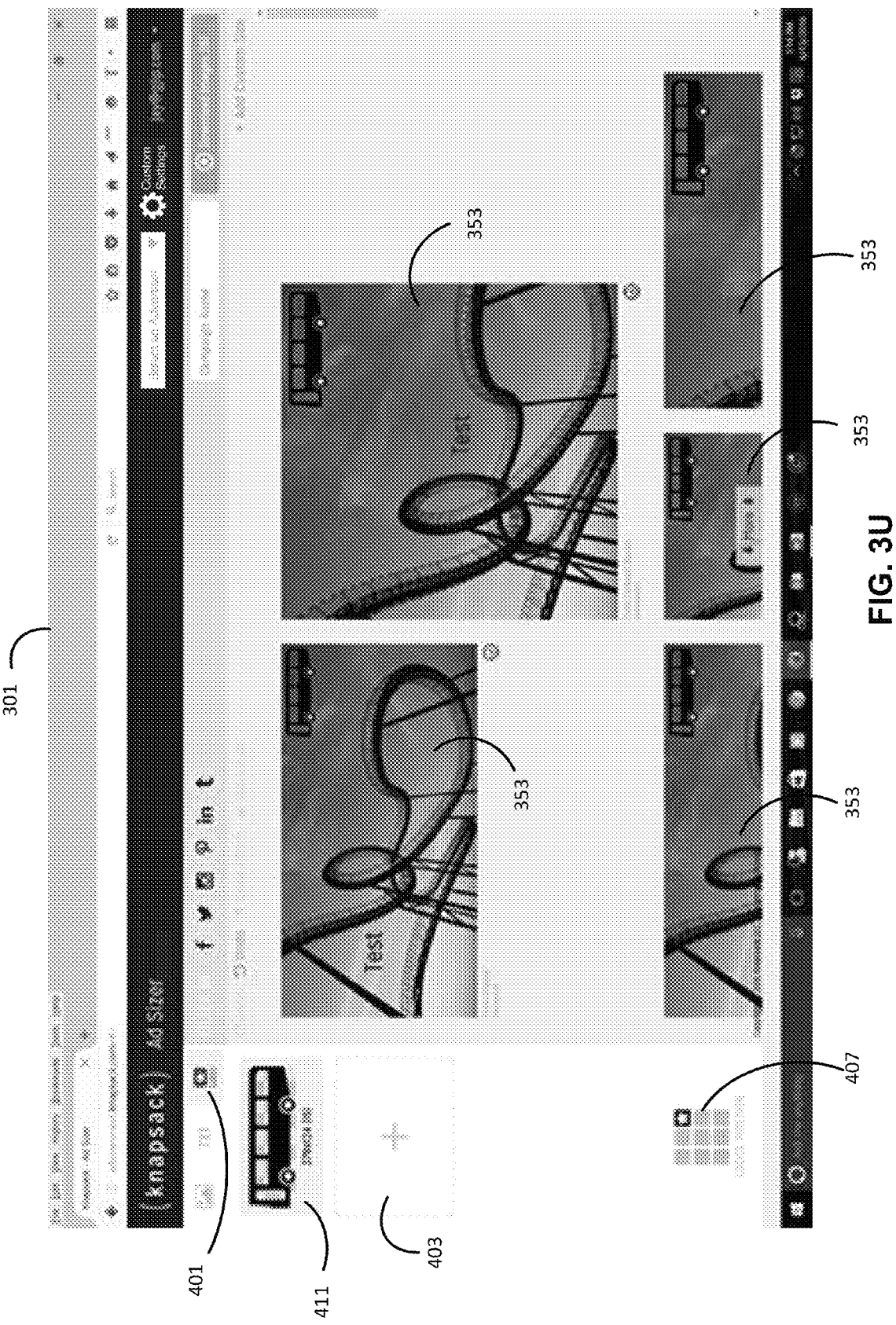
FIGS. 3U and 3V are views of an exemplary graphical user interface that can be implemented by cooperation of the client computer device and the image resizer application component of the server of FIG. 1B as part of blocks 255 and 257 of the image resizing application program of FIGS. 2A to 2H according to an embodiment of the present disclosure.

Note that the pixel coordinates PC are used to copy the corresponding pixel data values of the intermediate image to produce the particular Transformed Image. The text item is displayed overlaid on the intermediate image 363 with "+" and "−" buttons adjacent the text item (labeled 391). The "+" and "−" buttons can be selected by the user input to allow the user to increase or decrease the font size of the text item. The text item can wrap within a box 392 as shown in FIG. 3R. The size of the box 392 can be manipulated by user input to allow the user to specify the layout of the text item. Furthermore, the user can click on the text item and move it to another position overlaying the intermediate image 363 as desired by the user. After adjusting the position of the text item (or its font size or layout and/or scale factor SF by moving the slider bar 361 and/or moving the transparent part 365 of overlay mask, the user can save the changes by clicking on the X button 393 as shown. After saving the changes, the pixel coordinates PC are used to copy the corresponding pixel data values of the intermediate image 363 (which is produced by scaling the Source Image 355 by the scale factor SF) to update the Transformed Image, and the TI area of the display window 301 is rendered and displayed to include a representation of the updated Transformed Image with the overlay text item at the specified position along with representations of one or more other non-edited Transformed Images. FIGS. 3S and 3U shows an example where the user has adjusted the position of the text item "Test" from the middle to the middle-left part of a particular Transformed Image (specifically, the upper-left Transformed Image of FIG. 3P).

In performing the text overlay operations of block 247, the image resizer application component 111 can adjust the data that represents the position of the overlay text item relative to the position of a particular Transformed Image in response to the user input operations that moves or nudges the overlay text item. For example, the coordinate $O_{xc}$ that represents the x position of the center of overlay text item and the coordinate $O_{xm}$ that represents the respective maximum x position of the overlay text item can be updated (increased or decreased) in response to the user input operations that moves or nudges the overlay text item in the x direction. Similarly, the coordinate $O_{xy}$ that represents the y position of the center of overlay text item and the coordinate $O_{ym}$ that represents the respective maximum y position of the overlay text item can be updated (increased or decreased) in response to the user input operations that moves or nudges the overlay text item in the y direction. And the coordinates $O_{xc}$ and $O_{yc}$ that represent the x and y positions of the center of overlay text item and the coordinates $O_{xm}$ and $O_{ym}$ that represent the respective maximum x and y positions of the overlay text item can be updated (increased or decreased) in response to the user input operations that moves or nudges the overlay text diagonally in both the x and y directions.

In block 249, the application executing on the client computing device 103 and the image resizer application component 111 cooperate to optionally present and display user interface controls on the display device(s) 157 of the client computing device 103 that allows a user to edit an overlay text item and associated properties. In response thereto, the user can optionally interact with such user interface controls to edit the overlay text item and associated properties.

In block 251, the application executing on the client computing device 103 and the image resizer application component 111 can cooperate to update the display of the overlay text item on one or more of the Transformed Images displayed in the TI area of the display window based on the overlay text item and associated properties edited in block 249. Note that some or all of the properties of the overlay text item as edited in block 249 can be applied globally to all the Transformed Images displayed in the TI area of the display window. Alternatively, some or all of the properties of the overlay text item can be selectively applied to only those Transformed Images where the corresponding local overlay text property has not been changed. Moreover, the application of such overlay text properties to a particular Transformed Image can also be blocked (or later enabled) by locking (or later unlocking) the particular Transformed Image (block 267).

Figure 3V:
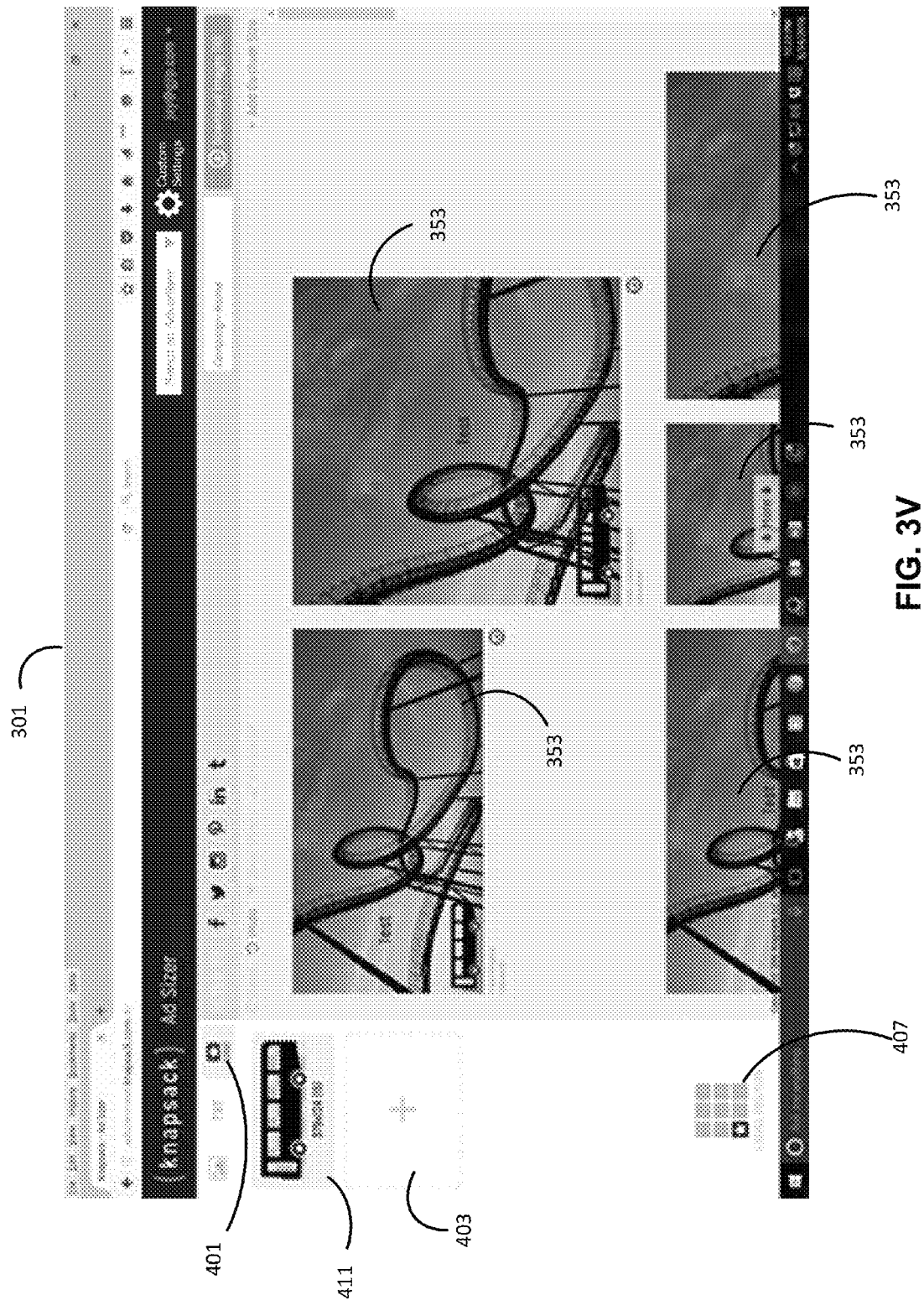
Figure 3W:
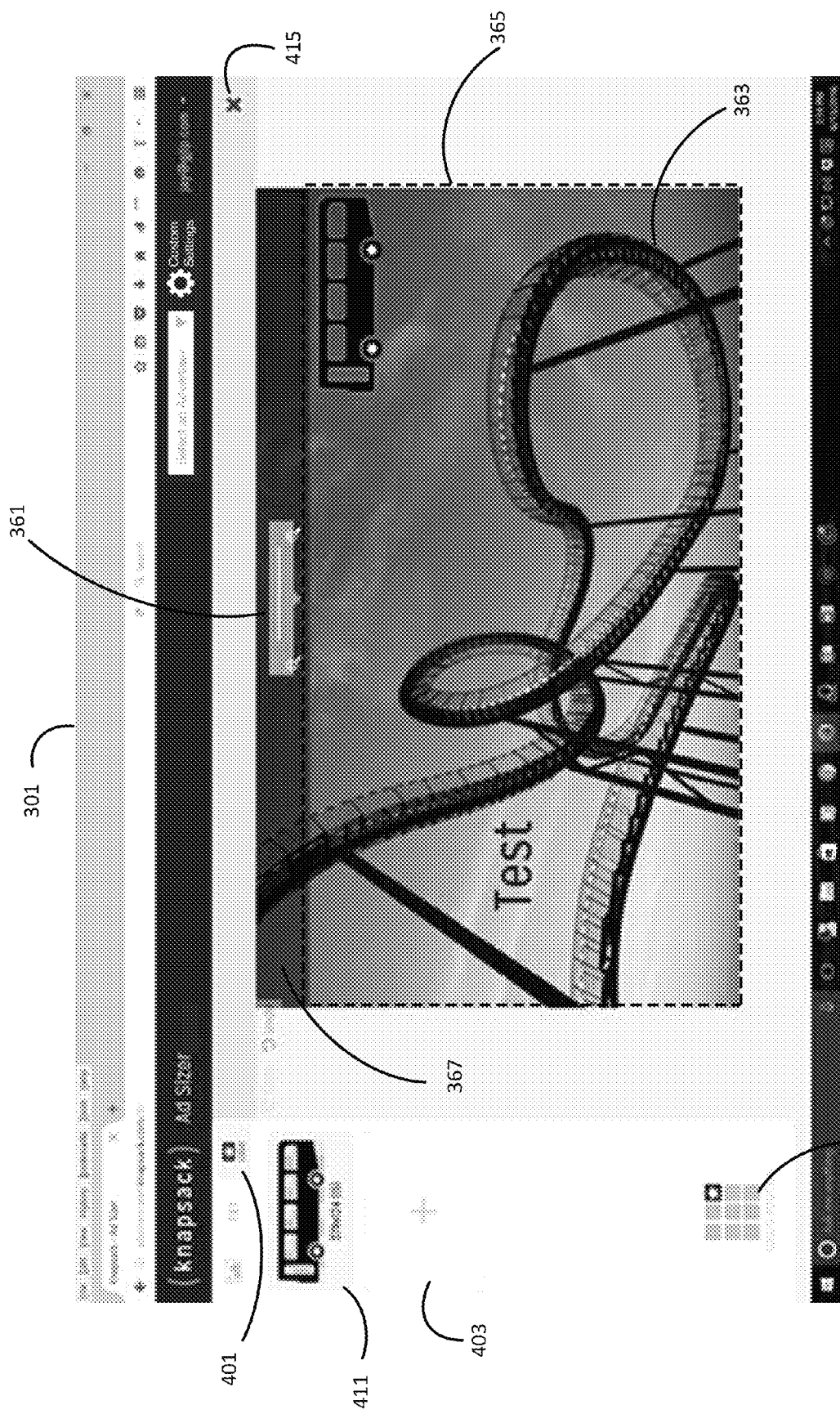
FIGS. 3W, 3X, 3Y and 3Z are views of an exemplary graphical user interface that can be implemented by cooperation of the client computer device and the image resizer application component of the server of FIG. 1B as part of block 261 of the image resizing application program of FIGS. 2A to 2H according to an embodiment of the present disclosure.
Figure 3X:
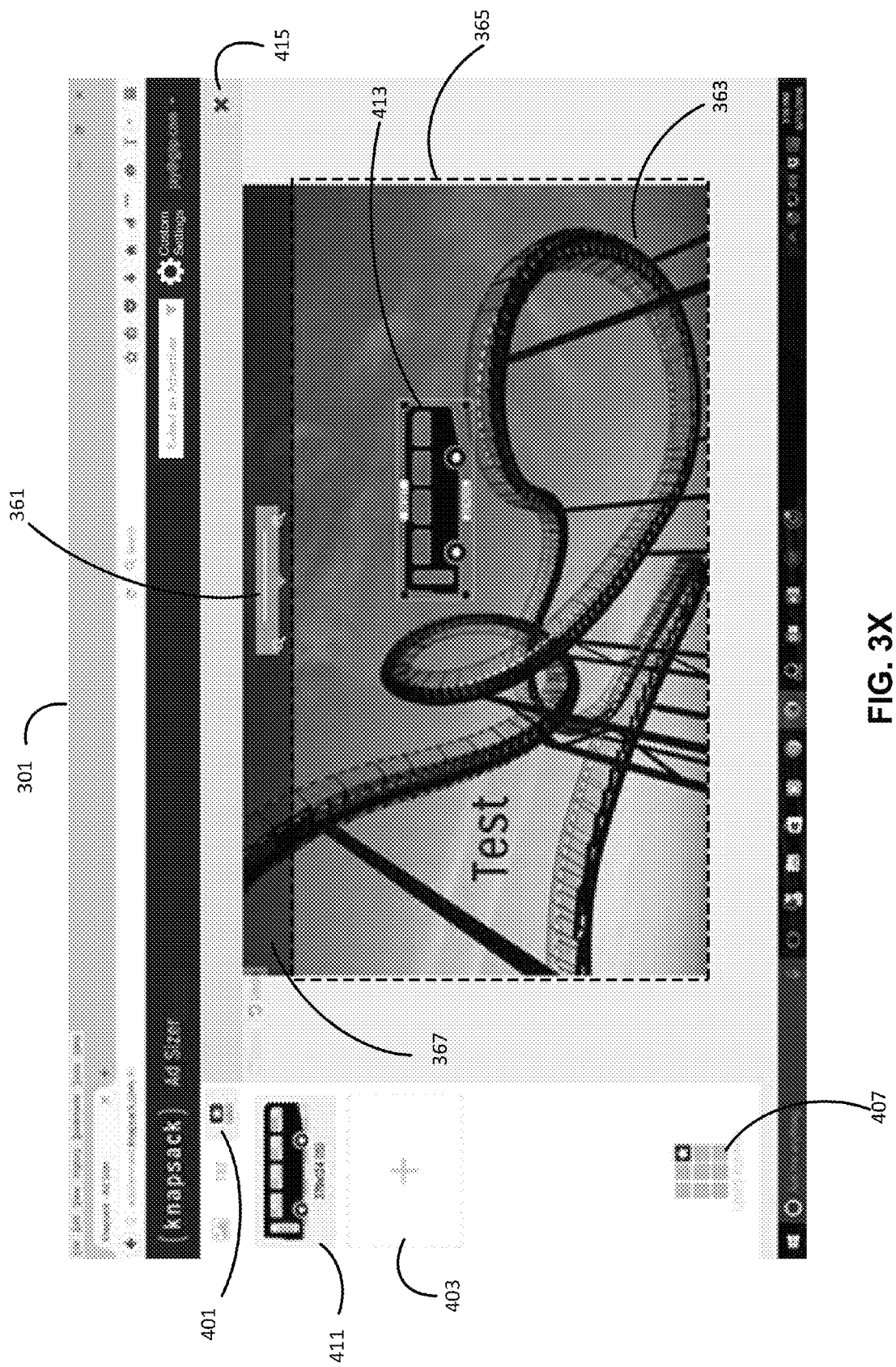
Figure 3Y:
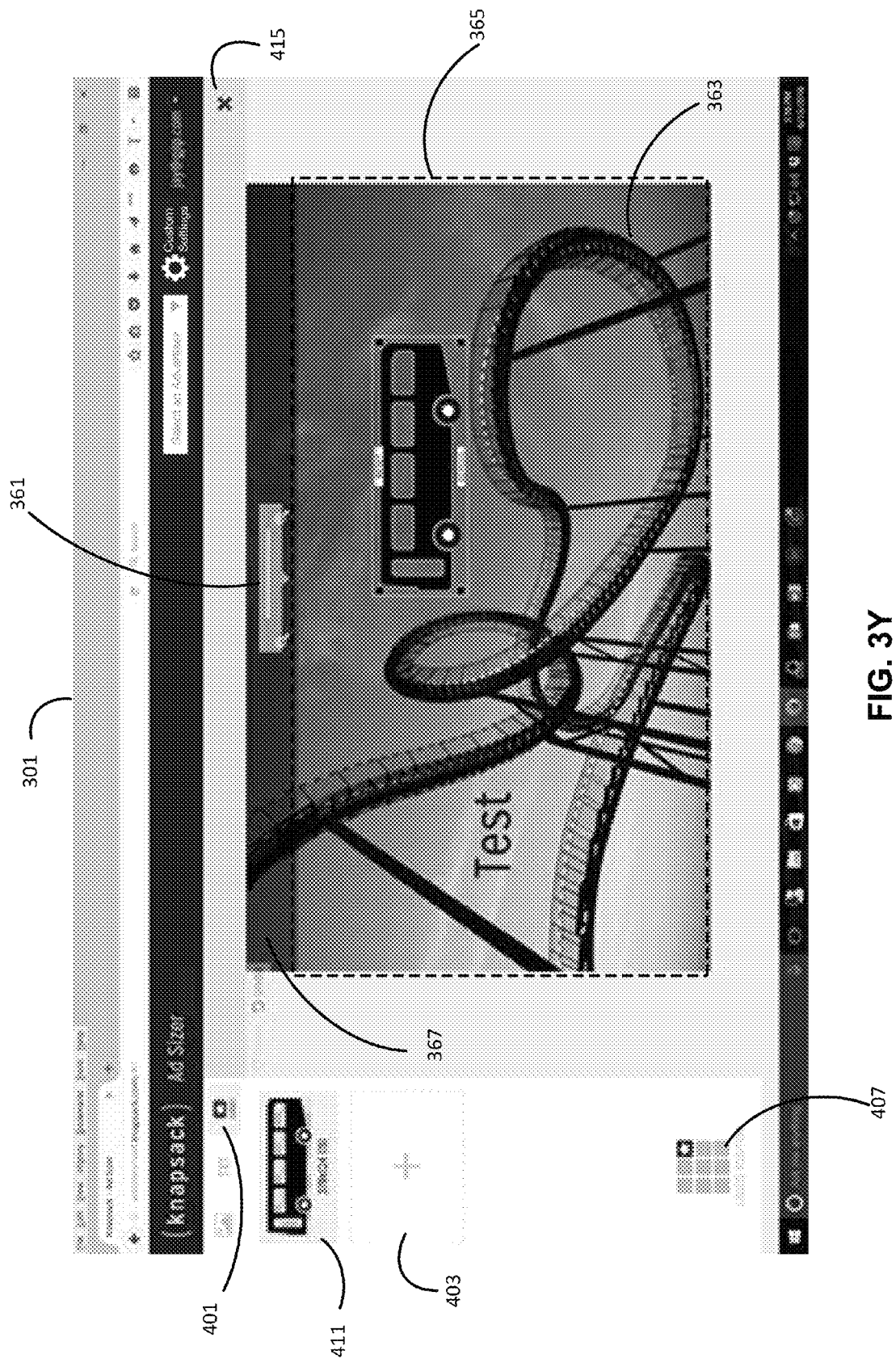
Figure 3Z:
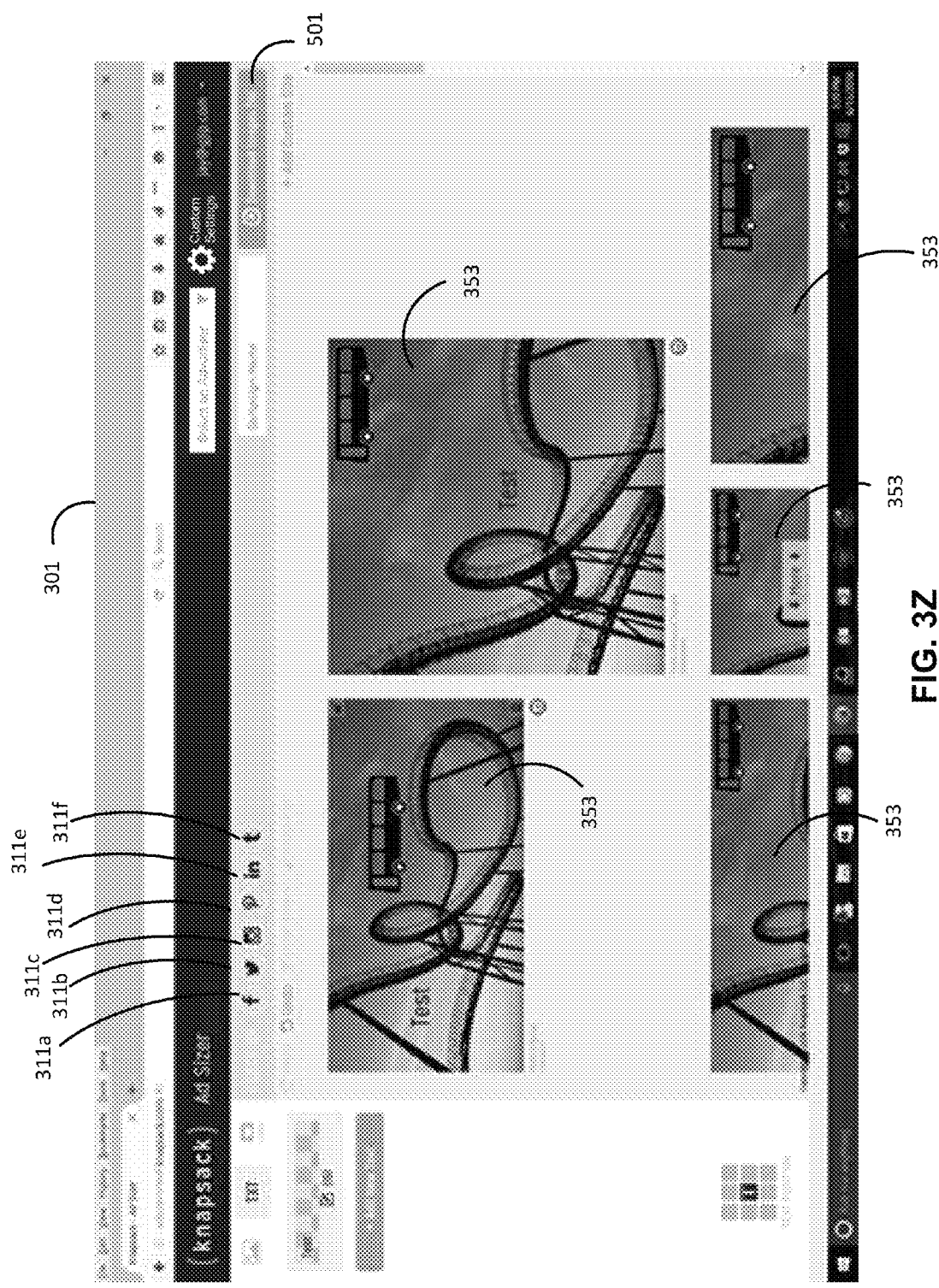
Figure 3Z:
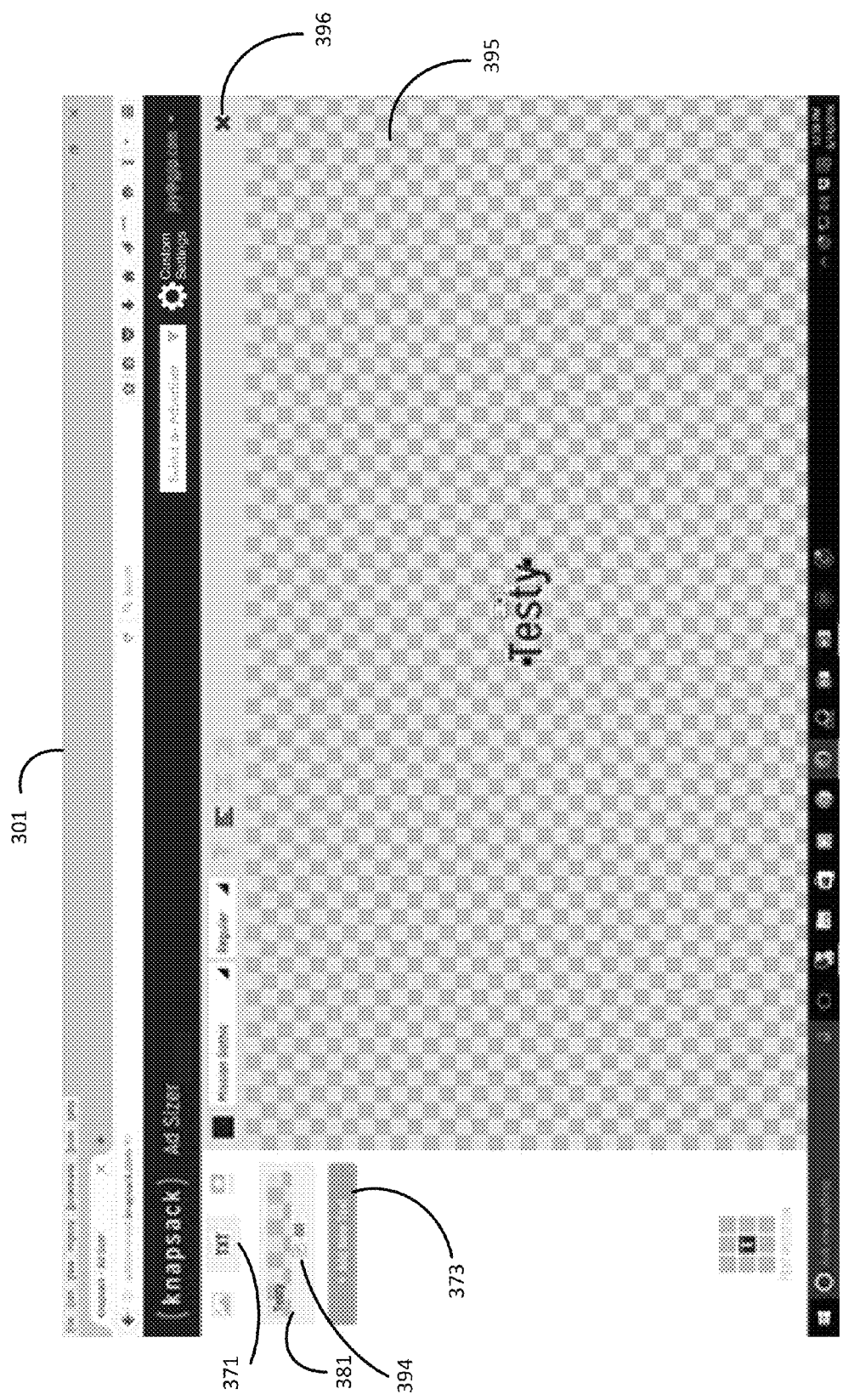
Figure 3Z:
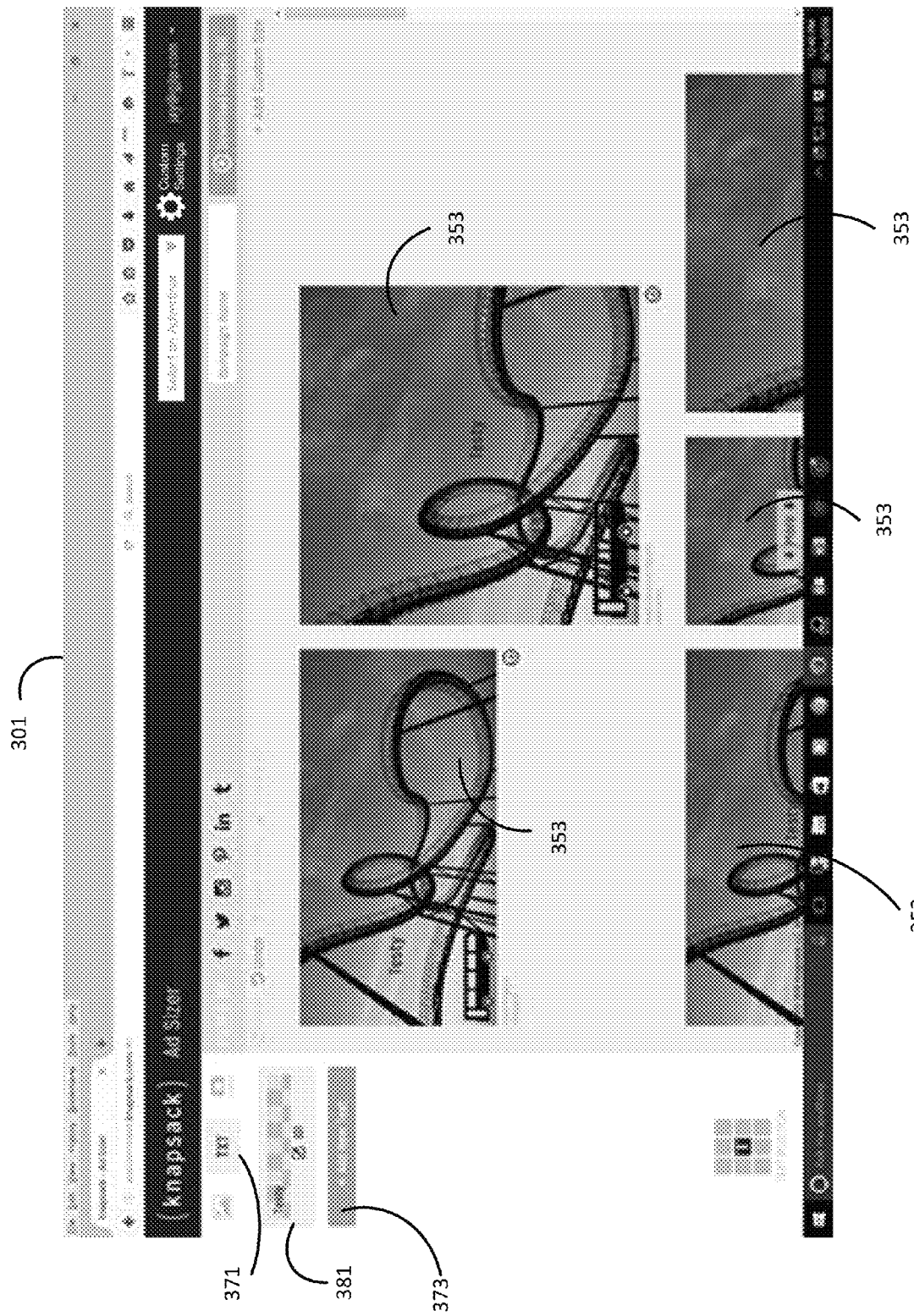
Figure 3Z:
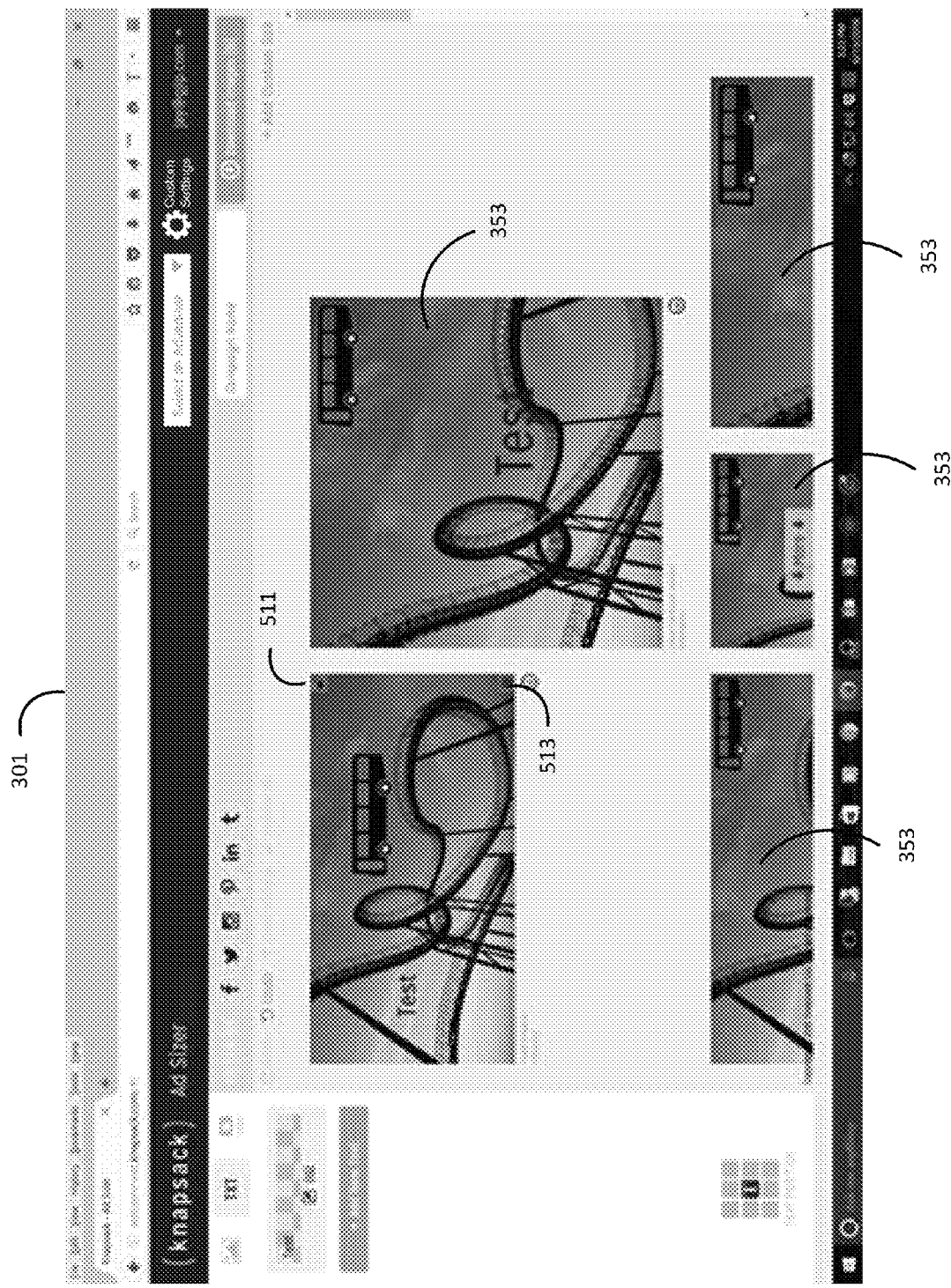

An example of the user interface controls of block 249 is shown in FIG. 3ZA where the user first clicks on the "txt" button 371. The user then clicks on an edit button 394 that is displayed adjacent the representation of a particular overlay text item displayed in the reserved space 381 of the left panel of the display window 301, and the display window 301 is updated with reserved space 395 that allows for user to edit the particular overlay text item. Similar to the interface of FIGS. 3M and N as described above, the display window 301 also includes user controls such as pull-down lists, widgets and buttons that allow the user to specify certain properties associated with the text item. For example, the display window can include a widget that allows the user to specify color for the text item, a drop down list that allows the user to specify a font family for the text item, a drop down list that allows the user to specify format options (such as underlining and bold typeface) for the text item, and buttons that allows the user to specify other format options (such as left, center or right justification) for the text item The inputted text item is displayed in the reserved space 395 as shown in FIG. 3ZA with "+" and "−" buttons adjacent the text item (that are selected by user input to allow the user to increase or decrease the font size of the text item. The text item can wrap within a box as shown in FIG. 3ZA. The size of the box can be manipulated by user input to allow the user to specify the layout of the text item. After editing the text item and its associated properties, the user can save the text item by clicking on the X button 396 as shown. In block 251, the updated text item is then displayed in reserved screen space 381 in the left panel adjacent the TI area of the display window 301 and the updated text item is displayed on one or more of the Transformed Images displayed in the TI area of the display window 301 as shown in FIG. 3ZB. Note that some or all of the properties of the edited overlay text item can be applied globally to all the Transformed Images displayed in the TI area of the display window 301. Alternatively, some or all of the properties of the edited overlay text item can be selectively applied to only those Transformed Images where the corresponding local overlay text property has not been changed. Moreover, the application of such overlay text properties to a particular Transformed Image can also be blocked (or later enabled) by locking (or later unlocking) the particular Transformed Image (block 267).

In the case that the user has selected a particular advertiser in block 209, the advertiser-specific settings of block 207 for that particular advertiser can specify format or style settings pertaining to text overlays. Such advertiser-specific settings can be used to control the text overlay operations of blocks 239 to 251 for Transformed Images ("Ad images") for use by the particular advertiser. For example, the advertiser-specific settings of block 207 that pertain to the format or style settings for text overlays for the particular advertiser selected in block 209 can be used as default format or style settings (e.g., primary font, font size, font style, color) for the text overlay operations of blocks 239 to 251. The image resizer application component 111 can be configured such that user cannot change such default format or style settings. In other words, the default format or style settings can be immutable by the user. Alternatively, the image resizer application component 111 can be configured such that user can possibly change such default format or style settings. In this case, the image resizer application component 111 can monitor changes to the format or style settings used for the text overlay operations of blocks 239 to 251 and raise an error message or warning in the case that such format or style settings of the text overlay operations do not conform to the advertiser-specific settings for the particular advertiser selected in block 209. The advertiser-specific settings of block 207 for the particular advertiser can also be used for other suitable controls of the text overlay operations of blocks 239 to 251 for Transformed Images ("Ad images") for use by the particular advertiser.

In block 253, the application executing on the client computing device 103 and the image resizer application component 111 cooperate to optionally present and display user interface controls that allows a user to specify an overlay graphics item (such as a logo). In response thereto, the user optionally interacts with such user interface controls to specify the overlay graphics item. An example of such user interface controls is shown in FIG. 3T where the user first clicks on the "logo" button 401 of the display window 301 and then clicks on reserved screen space 403 located in the left panel of the display window 301. The perimeter of the reserved screen space 403 can be defined by a dotted line with a central "+" icon as shown. After clicking on the screen space 403, the user specifies and/or uploads an overlay graphic item by a file import menu 405. Alternatively, user can specify the overly graphic item by dragging and dropping the overlay graphic item onto the screen space 403. The overlay graphic item or a thumbnail of the overlay graphic item is then displayed in the in the left panel of the display window 301. FIG. 3T shows an overlay graphics item 411 that has been specified by the user via the interface controls of FIG. 3T.

In block 255, the application executing on the client computing device 103 and the image resizer application component 111 cooperate to optionally simultaneously display on the display device(s) 157 of the client computing device 103 the overlay graphic item specified in block 255 on all Transformed Images displayed in the TI area of the display window. For example, in response to the user specifying the graphic item, the graphic item can be overlaid on all of the Transformed Images 353 displayed in the TI area of the display window 301 as shown in FIG. 3T. In this case, the initial overlay position of the graphic item on each one of the Transformed Images 353 displayed in the TI area 351 of the display window 301 can be dictated by a default position. Where the image resizer application component 111 is executing on the client computing device 103, the main memory 153 and/or mass storage of the client computing device 103 can be used to store data representing the overlay graphic item and the relative position of the overlay graphic item as overlaid on a particular Transformed Image as displayed in the TI area 351 of the display window 301. Where the image resizer application component 111 is executing on the server 107, the main memory 173 and/or mass storage of the server 107 and/or the database 113 can be used to store data representing the overlay graphic item and the relative position of the overlay graphic item as overlaid on a particular Transformed Image as displayed in the TI area 351 of the display window 301. For example, FIG. 2I shows an example where coordinates $TI_{xc}$, $TI_{yc}$ represent the x and y positions of the center of a particular Transformed Image and the coordinates $TI_{xm}$ and $TI_{ym}$ represent the respective maximum x and y positions of the particular Transformed Image. The size (in pixels) of the particular Transformed Image in the x direction, which is designated by the value of $TI_{height}$, is proportional to $2(TI_{xm}-TI_{xc})$, and the size (in pixels) of the particular Transformed Image in the y direction, which is designated by the value $TI_{width}$, is proportional to $2(TI_{ym}-TI_{yc})$. Similarly, coordinates $O_{xc}$, $O_{yc}$ represent the x and y positions of the center of an overlay graphic item and the coordinates $O_{xm}$ and $O_{ym}$ represent the respective maximum x and y positions of the overlay graphic item. The size (in pixels) of the overlay graphic item in the x direction, which is designated by the value $O_{height}$, is proportional to $2(O_{xm}-O_{xc})$, and the size (in pixels) of the overlay graphic item in the y direction, which is designated by the value $O_{width}$, is proportional to $2(O_{ym}-O_{yc})$.

In one embodiment, DIV tags and CSS positional attributes can be used to overlay a graphic item on a Transformed Image (background image). For example, illustrative HTML code that overlays a graphic item on a Transformed Image can be given as:

```
<div style="position: relative; background: url(path to Transformed Image); width: (width)px; height: (height)px;">
    <div style="position: absolute; bottom: 0; left: 0.5em; width: 50px; height: 50px;">
        <img src=url(path to graphic item to overlay at the bottom
            left of the Transformed Image)/>,
    </div>
</div>
```

In this approach, the first DIV tag defines the area where the Transformed Image (background image) appears and it employs relative positioning such that the graphic item that it contains can be properly placed. This is done by the second DIV tag which employs absolute positioning with one or more of the positional attributes: top, right, bottom and left. The <img src> tag specifies the graphic item that is to be overlaid on the Transformed Image.

It is also possible to separate the CSS style from the content by assigning CSS classes to the various container elements. For example, illustrative HTML code that overlays the graphic item on a Transformed Image can be given as:

```
<style type="text/css">
    .image-container {
    position: relative;
    width: 500px;
    height: 309px;
    }
    .bottomleft {
    position: absolute;
    bottom: 0;
    left: 0.5em;
    width: 50px;
    height: 50px;
    }
</style>
<div class="image-container">
    <img src=url(path to Transformed Image) />;
    <div class="bottomleft">
        <img src=url(path to graphic item to overlay at the bottom
            left of the Transformed Image) />;
    </div>
</div>
```

In this approach, the "image-container" class of the first DIV tag defines the area where the Transformed Image (background image) appears and it employs relative positioning such that the text that it contains can be properly placed. The first <img src> tag specifies the Transformed Image (background image). The "bottomleft" class of the second DIV tag employs absolute positioning with one or more or of the positional attributes: top, right, bottom and left. The second <img src> tag specifies the graphic item to overlay on the Transformed Image. The result is identical to the previous example, but now much easier to maintain as the HTML and CSS can be edited independently. Note that the position of the overlay graphic item can be derived from variables that are defined from default values and possibly updated based upon user input actions as described herein. Note that other suitable mechanisms can be used to overlay one or more graphic items on a Transformed Image (background image) for display in the TI area of the display window 301. The image resizer application component 111 can generate the HTML code that represents the Transformed Images and corresponding overlay graphic item(s) and pass (output) such HTML code to the application executing on the client computing device 103 (e.g., web browser) for rendering and displaying the Transformed Images and corresponding overlay text item(s) in the TI area of the display window 301.

In block 257, the application executing on the client computing device 103 and the image resizer application component 111 cooperate to optionally present and display user interface controls on the display device(s) 157 of the client computing device 103 the that allows a user to simultaneously adjust position of the overlay graphic item on all Transformed Images displayed in the TI area of the display window 301. In response thereto, the user optionally interacts with such user interface controls to simultaneously adjust position of the overlay graphic item on all Transformed Images displayed in the TI area of the display window. Note that the adjustment of position of the overlay graphic item on a particular Transformed Image can be blocked (or later enabled) by locking (or later unlocking) the particular Transformed Image (block 267). An example of such user interface controls is shown in FIGS. 3U and 3V where a grid 407 is displayed in the left panel of the display window 301. The grid 407 specifies nine different predefined overlay positions. The user can click on the overlay graphic item displayed in the left panel of the display window to select the overlay graphic item and then click on any one of the nine predefined overlay positions of the grid 407 by operation of the input device(s) 155 of the client computing device 103 to select the corresponding predefined overlay position. In response thereto, the overlay position of the graphic item on each one of the Transformed Images displayed in the TI area 351 of the display window 301 is adjusted such that it corresponds to the selected predefined overlay position of the grid 407. FIG. 3U shows the "Bus" overlay graphic item displayed in the upper-right corner on each one of the Transformed Images in correspondence with the upper-right overlay position of the grid 407. FIG. 3V shows the "Bus" overlay graphic item displayed in the lower-left portion of each one of the Transformed Images in correspondence with the user selecting the lower-left overlay position of the grid 407 as shown.

In block 259, the application executing on the client computing device 103 and the image resizer application component 111 cooperate to optionally present and display user interface controls on the display device(s) 157 of the client computing device 103 that allows a user to overlay a graphics item onto a particular Transformed Image (or all Transformed Images) displayed in the TI area of the display window. In response thereto, the user optionally interacts with such user interface controls by operation of the input device(s) 155 of the client computing device 103 to overlay a graphics item onto a particular Transformed Image (or all Transformed Images) displayed in the TI area of the display window. In one example, the user interface controls of block 259 can be similar to those described above with respect to FIG. 3Q for the overlay of a text item. Specifically, the user can drag and drop the graphics item from the left panel onto one or more of the Transformed Images displayed in the TI area 351 of the display window 301 by operation of the input device(s) 155 of the client computing device 103 in order to overlay the graphics item onto the one or more of the Transformed Images. The drop position of the graphics item onto a particular Transformed Image can dictate the initial overlay position of the graphics item on the particular Transformed Image. The user can also simultaneously overlay the graphics item onto all of the Transformed Images displayed in the TI area 351 of the display window 301 by dragging and dropping the graphics item from the left panel onto an area of the TI area 351 that is not occupied by any Transformed Image.

In block 261, the application executing on the client computing device 103 and the image resizer application component 111 cooperate to optionally present and display user interface controls on the display device(s) 157 of the client computing device 103 that allows a user to adjust the size (in pixels) and/or position of the overlay graphics on a particular Transformed Image displayed in the TI area of the display window. In response thereto, the user optionally interacts with such user interface controls to adjust the size (in pixels) and/or position of the overlay graphics on a particular Transformed Image displayed in the TI area of the display window. Note that the adjustment of size and position of the overlay text item on a particular Transformed Image can also be blocked (or later enabled) by locking (or later unlocking) the particular Transformed Image (block 267).

An example of the user interface controls of block 261 is shown in FIGS. 3W, 3X and 3Y where the user has clicked on a particular Transformed Image (specifically, the upper-left Transformed Image of FIG. 3U) displayed in the TI area of the display window 301. Specifically, the display window 301 includes a slider bar 361 displayed in conjunction with a representation of the intermediate image 363. The intermediate image 363 is produced by scaling the Source Image 355 by the scale factor SF for the image size that corresponds to the particular Transformed Image. An overlay mask is overlaid on the representation of the intermediate image 363. The size of the overlay mask in pixels matches the size of the intermediate image 363. A part of the overlay mask is defined by pixel coordinates PC that specify a range of pixels in the intermediate image for the image size that corresponds to the particular Transformed Image. This overlay mask part is made completely transparent and labeled by dotted line 365 for purposes of description. The other parts of the overlay mask (labeled 367) are assigned to a dark color (such as blue) with less transparency. In this configuration, the contrast provided by the transparent part 365 of the overlay mask and the less-transparent other part 367 of the overlay mask visually identifies that part of the intermediate image that will be used to produce the particular Transformed Image. The user can manipulate the slider bar 361 to adjust the scale factor SF. For example, moving the slider bar 361 to the right increases the scale factor SF, while moving the slider bar to the left decreases the scale factor SF. As the scale factor SF is changed by manipulation of the slider bar 361, the intermediate image 363 is updated by scaling the Source Image 355 with the updated scale factor SF, and the display window 301 is updated to display the representation of the updated intermediate image. Furthermore, the user can click on the transparent part 365 of overlay mask and move it to adjust which part of the intermediate region it covers. The size of the transparent part 365 of the overlay mask remains the same as it moves. The pixel coordinates PC that specify the range of pixels in the intermediate image 363 are updated to correspond to the movement of the transparent part 365 of the overlay mask. Note that the pixel coordinates PC are used to copy the corresponding pixel data values of the intermediate image to produce the particular Transformed Image. One or more graphic items is displayed overlaid on the intermediate image 363. A box 413 surrounds a graphic item when the user hovers over or selects the graphic item. The size of the box 413 can be manipulated by user input to allow the user to adjust the size of the graphic item. Furthermore, the user can click on the box 413 to move the graphic item to another position overlaying the intermediate image 363 as desired by the user. After adjusting the position of the graphic item (and/or its size) and/or the scale factor SF by moving the slider bar 361 and/or moving the transparent part 365 of overlay mask, the user can save the changes by clicking on the X button 415 as shown. After saving the changes, the pixel coordinates PC are used to copy the corresponding pixel data values of the intermediate image 363 (which is produced by scaling the Source Image 355 by the scale factor SF) to update the Transformed Image, and the TI area of the display window 301 is rendered and displayed to include a representation of the updated Transformed Image with the overlay graphics item(s) at the specified position(s) along with representations of one or more other non-edited Transformed Images. FIGS. 3W and 3X shows an example where the user has adjusted the position of the "Bus" graphics item from the top-right corner to the middle of a particular Transformed Image (specifically, the upper-left Transformed Image of FIG. 3U). FIGS. 3X and 3Y shows an example where the user has increased the size of the "Bus" graphics item in the particular Transformed Image (specifically, the upper-left Transformed Image of FIG. 3U). FIG. 3Z shows the display window 301 that includes a representation of the updated Transformed Image with the overlay graphics item(s) edited in FIG. 3Y along with representations of one or more other non-edited Transformed Images.

In performing the graphics overlay operations of block 261, the image resizer application component 111 can adjust the data that represents the position of the overlay graphics item relative to the position of a particular Transformed Image in response to the user input operations that moves or nudges the overlay text item. For example, the coordinate $O_{xc}$ that represents the x position of the center of overlay graphics item and the coordinate $O_{xm}$ that represents the respective maximum x position of the overlay graphics item can be updated (increased or decreased) in response to the user input operations that moves or nudges the overlay graphics item in the x direction. Similarly, the coordinate $O_{xy}$ that represents the y position of the center of overlay graphics item and the coordinate $O_{ym}$ that represents the respective maximum y position of the overlay graphics item can be updated (increased or decreased) in response to the user input operations that moves or nudges the overlay graphics item in the y direction. And the coordinates $O_{xc}$ and $O_{yc}$ that represent the x and y positions of the center of overlay graphics item and the coordinates $O_{xm}$ and $O_{ym}$ that represent the respective maximum x and y positions of the overlay graphics item can be updated (increased or decreased) in response to the user input operations that moves or nudges the overlay graphics item in both the x and y directions.

Furthermore, in performing the graphic overlay operations of block 261, the image resizer application component 111 can adjust the data that represents the size (in pixels) of the overlay graphic item relative to the position of a particular Transformed Image in response to the user input operations that changes the size of the overlay graphic item. For example, the coordinate $O_{xm}$ that represents the respective maximum x position of the overlay graphic item can be updated (increased or decreased) in response to the user input operations that changes the size of the overlay graphic item in the x direction. Similarly, the coordinate $O_{ym}$ that represents the respective maximum y position of the overlay graphic item can be updated (increased or decreased) in response to the user input operations that changes the size of the overlay graphic item in the y direction. And the coordinates $O_{xm}$ and $O_{ym}$ represent the respective maximum x and y positions of the overlay graphic item can be updated (increased or decreased) in response to the user input operations that changes the size of the overlay graphic item in both x and y directions. The image resizer application component 111 can be configured to render and update the display window 301 or parts thereof to display the change in size of the overlay graphic item in response to the user input operations that changes the size of the overlay graphic item. The resizing of the overlay graphic item in block 237 can involve reducing the physical size of the overlay graphic item by decreasing the number of pixels that the overlay graphic item contains, which typically involves cropping or scaling by interpolation. The resizing of the overlay graphic item in block 237 can also possibly involve enlarging the physical size of the overlay graphic item by increasing the number of pixels that the overlay graphic item contains, which typically involves interpolation such as a linear interpolation, cubic interpolation or other suitable interpolation method.

In block 263, the application executing on the client computing device 103 and the image resizer application component 111 can cooperate to optionally present and display user interface controls on the display device(s) 157 of the client computing device 103 that allows a user to edit properties of the overlay graphics item. In response thereto, the user can optionally interact with such user interface controls to edit properties of the overlay graphics item.

In block 265, the application executing on the client computing device 103 and the image resizer application component 111 can cooperate to update the display of the overlay graphic item on one or more of the Transformed Images displayed in the TI area of the display window based on the properties of the overlay graphic item edited in block 263. Note that some or all of the properties of the overlay graphic item as edited in block 263 can be applied globally to all the Transformed Images displayed in the TI area of the display window. Alternatively, some or all of the properties can be selectively applied to only those Transformed Images where the corresponding local overlay graphic property has not been changed. Furthermore, the application of such overlay graphic properties to a particular Transformed Image can also be blocked (or later enabled) by locking (or later unlocking) the particular Transformed Image (block 267).

In one embodiment, user interface controls similar to the text editing controls of FIG. 3ZA can be used to edit an overlay graphics item. Here, the user first clicks on the "logo" button 401 and triggers editing of a particular overlay graphic item displayed in the left panel of the display window 301, and the display window 301 is updated with reserved space that allows for user to edit the particular overlay graphic item. The graphic item can be displayed in the reserved space with controls that allow the user to increase or decrease the size of the graphics item. After editing the graphic item, the user can save the graphic item. The updated graphic item is then displayed in in the left panel adjacent the TI area of the display window 301 and the updated graphic item is displayed on one or more of the Transformed Images displayed in the TI area of the display window 301. Note that some or all of the properties of the edited overlay graphic item can be applied globally to all the Transformed Images displayed in the TI area of the display window 301. Alternatively, some or all of the properties of the edited overlay graphic item can be selectively applied to only those Transformed Images where the corresponding local overlay graphic property has not been changed. Moreover, the application of such overlay graphic properties to a particular Transformed Image can also be blocked (or later enabled) by locking (or later unlocking) the particular Transformed Image (block 267).

In the case that the user has selected a particular advertiser in block 209, the advertiser-specific settings of block 207 for that particular advertiser can specify format or style settings pertaining to graphic overlays. Such advertiser-specific settings can be used to control the graphic overlay operations of blocks 253 to 265 for Transformed Images ("Ad images") for use by the particular advertiser. For example, the advertiser-specific settings of block 207 that pertain to the format or style settings for graphic overlays for the particular advertiser selected in block 209 can be used as default format or style settings (e.g., file type or minimum image size) for the graphic overlay operations of blocks 253 to 265. The image resizer application component 111 can be configured such that user cannot change such default format or style settings. In other words, the default format or style settings can be immutable by the user. The image resizer application component 111 can be configured to raise an error message or warning in the case that the format or style settings of the graphic overlay operations of blocks 253 to 265 do not conform to the advertiser-specific settings for the particular advertiser selected in block 209. For example, the image resizer application component 111 can raise an error flag or warning if the user selects an overlay graphic whose file type that does conform to the default "file type" format or style settings for the particular advertiser selected in block 209. In another example, the image resizer application component 111 can raise an error flag or warning if the user selects an overlay graphic whose size does conform to the default "minimum image size" format or style settings for the particular advertiser selected in block 209. The advertiser-specific settings of block 207 for the particular advertiser can also be used for other suitable controls of the graphic overlay operations of blocks 253 to 265 for Transformed Images ("Ad images") for use by the particular advertiser.

In block 267, the application executing on the client computing device 103 and the image resizer application component 111 can cooperate to optionally present and display user interface controls on the display device(s) 157 of the client computing device 103 that allows a user to lock (or unlock) and/or delete a particular Transformed Image displayed in the TI area of the display window. In response thereto, the user can optionally interact with such user interface controls to lock (or unlock) and/or delete a particular Transformed Image displayed in the TI area of the display window. For example, FIG. 3ZC shows interface controls that include a lock button 511 and a delete button 513 that are displayed adjacent a particular Transformed Image when the user hovers over or selects a particular Transformed Image. The user can click on the lock button 511 to lock the particular Transformed Image. The user can click on the delete button 513 to delete the particular Transformed Image. When a particular Transformed Image is locked, no changes can be made to the Transformed Image, thus blocking the following operations: i) the addition of new overlay text or graphics items to the Transformed Image, ii) any change to the properties of overlay text or graphics items that existed prior to the lock operation, and iii) any change to the properties of Transformed Image that existed prior to the lock operation.

In block 269, the application executing on the client computing device 103 and the image resizer application component 111 cooperate to optionally present and display user interface controls on the display device(s) 157 of the client computing device 103 that allows a user to filter (and clear such filtering for) the Transformed Images (with optional graphic and/or text overlay) displayed in the TI area of the display window. In response thereto, the user optionally interacts with such user interface controls by operation of the input device(s) 155 of the client computing device 103 to filter the Transformed Images (with optional graphic and/or text overlay) displayed in the TI area of the display window. The filtering operations can be controlled by user-specified criterion, such as selection of one or more publishers that are associated with the set of the plurality of image sizes or selection of one or more image sizes from the set of the plurality of image sizes. An example of such user interface controls is shown in FIG. 3Z where the user can click on one or more of the publisher logos 311a-311f presented in a list near the upper left corner of the TI area 351 of the display window 301 by operation of the input device(s) 155 of the client computing device 103 in order to select one or more of such publisher logos. The Transformed Image thumbnails (with optional graphic and/or text overlay) whose size conforms to the publisher(s) associated with the user-selected one or more publisher logos are displayed in the TI area 351, while the Transformed Image thumbnails (with optional graphic and/or text overlay) whose size does not conform to the publisher(s) associated with the user-selected one or more publisher logos are not displayed in (or removed from) the TI area 351.

In block 271, the application executing on the client computing device 103 and the image resizer application component 111 cooperate to optionally present and display user interface controls on the display device(s) 157 of the client computing device 103 that allows a user to copy and/or download one or more (or all) of the Transformed Images (with optional graphic and/or text overlay) displayed in the TI area of the display window. In response thereto, the user optionally interacts with such user interface controls by operation of the input device(s) 155 of the client computing device 103 to copy and/or download one or more (or all) of Transformed Images (with optional graphic and/or text overlay) displayed in the TI area of the display window. An example of such user interface controls is shown in FIG. 3Z where the user can click on the "Download Images" button 501 of the display window 301 by operation of the input device(s) 155 of the client computing device 103 in order to copy and/or download all of the Transformed Images displayed in the TI area 351 of the display window simultaneously. Where the image resizer application component 111 is executing on the client computing device 103, a copy of all of the Transformed Images (with optional graphic and/or text overlay) displayed in the TI area 351 of the display window 301 can be copied from main memory 153 and/or mass storage of the client computing device 103 to a user-specified or default file storage location on the client computing device 103. The copies of the Transformed Images (with optional graphic and/or text overlay) can be packaged together in a compressed file (such as a .zip file). The compression and packaging of the copies of the Transformed Images (with optional graphic and/or text overlay) can be performed by the image resizer application component 111 executing on the server 107 or possibly on the client computing device 103. The compressed file can be downloaded from the server 107 and stored in the user-specified or default file storage location on the client computing device 103. The copies of the Transformed Images (with optional graphic and/or text overlay) and/or the compressed file for such copies can also possibly be stored in the mass storage of the server 107 and/or the database 113. Note that the user can perform the filtering operations of block 269 prior to the image download operations of block 271 in order to select and copy/download only those Transformed Images (with optional graphic and/or text overlay) whose sizes conform to one or more particular social network publishers of interest to the user and/or to the particular advertiser selected in block 209. In block 271, the copy of a particular Transformed Image with graphic and/or text overlay can be derived by combining or flattening the layer(s) of the overlay graphic and/or text with the layer representing the Transformed Image to produce a corresponding composite image for certain file formats (such as JPEG and PNG file formats).

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting. Furthermore, the ordering of the operations discussed above in the non-limiting examples can be varied and are cited merely to illustrate at least one embodiment and are not intended to limit the scope thereof.

As described herein, the operations of the image resizing methodology (including data storage) can be distributed between a client computing device and a server (such as a remote server connected to the client computer device over a network). For example, at least part of the operations of the image resizing methodology can be embodied in a client-side script downloaded from the remote server to the client computing device for execution on the client computing device. In another example, at least part of the operations of the image-resizing method can be embodied in a server-side script or function executed by the remote server to the client computing device. The client computing device can execute an application (such as web browser) to carry out the image-resizing method. Alternatively, the operations of the image resizing methodology (including data storage) can be carried out by a desktop application executing on a computing device.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. An image processing method comprising:
storing in computer memory image size data representing a plurality of image sizes;
displaying first user interface controls on a display device to allow a user to specify a source image;
using the image size data stored in computer memory to produce data representing a plurality of transformed images corresponding to the source image with sizes that correspond to the image sizes represented by the image size data;
displaying a display window on the display device, wherein the data representing the plurality of transformed images is used to simultaneously display representations of the plurality of transformed images in a particular area of the display window for viewing by the user;
displaying second user interface controls on the display device that allows the user to specify at least one graphic item and overlay the at least one graphic item specified by the user on the plurality of transformed images displayed in the particular area of the display window such that at least one graphic item is viewed on top of at least one of the plurality of transformed images displayed in the particular area of the display window; and
displaying third user interface controls on the display device that allows the user to specify at least one text item and overlay at least one text item specified by the user on the plurality of transformed images displayed in the particular area of the display window such that at least one text item is viewed on top of at least one of the plurality of transformed images displayed in the particular area of the display window.

2. An image processing method according to claim 1, wherein:
the representations of the plurality of transformed images that are displayed in the particular area of the display window are selected from thumbnails of the plurality of transformed images and the plurality of transformed images themselves.

3. An image processing method according to claim 1, further comprising:
storing in computer memory data representing the plurality of transformed images.

4. An image processing method according to claim 1, wherein:
the representations of the plurality of transformed images are simultaneously displayed in the particular area of the display window in an automatic manner upon the user specifying the source image.

5. An image processing method according to claim 1, wherein:
the display window also displays a representation of the source image together with the representations of the plurality of transformed images.

6. An image processing method according to claim 5, wherein:
the representation of the source image displayed in the display window is selected from a thumbnail of the source image and the source image itself; and
the representation of the source image is displayed adjacent the particular area of the display window.

7. An image processing method according to claim 5, wherein:
the first user interface controls allow the user to specify a plurality of source images;
the image size data stored in computer memory is used to produce data representing a plurality of transformed images corresponding to each one of the plurality of source images with sizes that correspond to the image sizes represented by the image size data;
the particular area of the display window simultaneously displays representations of the plurality of transformed images corresponding to each one of the plurality of source images; and
the display window displays representations of the plurality of source images together with the representations of the plurality of transformed images.

8. An image processing method according to claim 1, wherein:
the plurality of transformed images corresponds to sizes for at least one publisher or channel that is used by a particular user-selected advertiser.

9. An image processing method according to claim 1, further comprising:
displaying fourth user interface controls on the display device that allows the user to edit a user-selected one of the plurality of transformed images displayed in the particular area of the display window.

10. An image processing method according to claim 1, wherein:
the second user interface controls displays a representation of the at least one graphic item specified by user interaction in the display window.

11. An image processing method according to claim 1, wherein:
a graphic item is simultaneously overlaid on the plurality of transformed images displayed in the particular area of the display window in an automatic manner upon the user specifying the graphic item.

12. An image processing method according to claim 1, wherein:
the second user interface controls allows the user to overlay a graphic item specified by the user on a user-selected one of the plurality of transformed images displayed in the particular area of the display window; and
the second user interface controls involves drag and drop operations from a representation of a graphic item to a representation of the user-selected one of the plurality of transformed images displayed in the particular area of the display window.

13. An image processing method according to claim 1, wherein:
the second user interface controls allow the user to simultaneously overlay a graphic item specified by the user on the plurality of transformed images displayed in the particular area of the display window.

14. An image processing method according to claim 1, further comprising:
displaying fifth user interface controls on the display device that allows the user to edit a graphic item overlaid on at least one of the plurality of transformed images displayed in the particular area of the display window.

15. An image processing method according to claim 14, wherein the fifth user interface controls is configured to provide at least one function selected from the group consisting of:
  i) user-controlled editing of properties of a graphic item overlaid on at least one of the plurality of transformed images displayed in the particular area of the display window;
  ii) user-controlled adjustment of size or position of a graphic item overlaid on a user-selected one of the plurality of transformed images displayed in the particular area of the display window;
  iii) user-controlled simultaneous adjustment of position of a graphic item overlaid on the plurality of transformed images displayed in the particular area of the display window; and
  iv) a grid of predefined overlay positions that are selectable by the user.

16. An image processing method according to claim 15, wherein the fifth user interface controls has a configuration that provides at least one of the following functions:
  v) global application of some or all of the properties of the graphic item that are edited by the user to the display of the graphic item as overlaid on the plurality of transformed images displayed in the particular area of the display window; and
  vi) selective application of some or all of the properties of the graphic item that are edited by the user to only those transformed images displayed in the particular area of the display window where the corresponding local overlay graphic property has not been changed.

17. An image processing method according to claim 1, wherein:
  at least one attribute of the graphic item is dictated by advertiser-specific settings, wherein the at least one attribute is selected from the group including file type extension and minimum size in pixels.

18. An image processing method according to claim 1, wherein:
  the third user interface controls displays a representation of the at least one text item specified by user interaction in the display window.

19. An image processing method according to claim 1, wherein:
  a text item is simultaneously overlaid on the plurality of transformed images displayed in the particular area of the display window in an automatic manner upon the user specifying the text item.

20. An image processing method according to claim 1, wherein:
  the third user interface controls allows the user to overlay a text item specified by the user on a user-selected one of the plurality of transformed images; and
  the third user interface controls involves drag and drop operations from a representation of a text item to a representation of the user-selected one of the plurality of transformed images displayed in the particular area of the display window.

21. An image processing method according to claim 1, wherein:
  the third user interface controls allow the user to simultaneously overlay a text item specified by the user on the plurality of transformed images displayed in the particular area of the display window.

22. An image processing method according to claim 20, further comprising:
  displaying sixth user interface controls on the display device that allows the user to edit a text item overlaid on at least one of the plurality of transformed images displayed in the particular area of the display window.

23. An image processing method according to claim 22, wherein the sixth user interface controls is configured to provide at least one function selected from the group consisting of:
  i) user-controlled editing of properties of a text item overlaid on at least one of the plurality of transformed images displayed in the particular area of the display window;
  ii) user-controlled adjustment of size or position of a text item overlaid on a user-selected one of the plurality of transformed images displayed in the particular area of the display window;
  iii) user-controlled simultaneous adjustment of position of a text item overlaid on the plurality of transformed images displayed in the particular area of the display window; and
  iv) a grid of predefined overlay positions that are selectable by the user.

24. An image processing method according to claim 23, wherein:
  at least one attribute of the text item is dictated by advertiser-specific settings, wherein the at least one attribute is selected from the group including font family, font size, font style and color.

25. An image processing method according to claim 1, further comprising:
  displaying seventh user interface controls on the display device that allows the user to filter the plurality of transformed images displayed in the particular area of the display window.

26. An image processing method according to claim 25, wherein:
  the filter involves selecting one or more online publishers or channels that support image sizes that belong to the plurality of image sizes represented by the stored image size data.

27. An image processing method according to claim 1, further comprising:
  displaying eighth user interface controls on the display device that allows the user to copy or download one or more of the plurality of transformed images displayed in the particular area of the display window as modified by any graphic item and any text item that is overlaid on the plurality of transformed images by combining layers of a respective transformed image and the graphic item or text item that is overlaid on the respective transformed image to produce a corresponding composite image.

28. An image processing method according to claim 1, further comprising:
  displaying ninth user interface controls on the display device that allows the user to select a particular advertiser, wherein the plurality of transformed images displayed in the particular area of the display window corresponds to sizes for at least one publisher or channel that is used by the particular advertiser selected by the user.

29. An image processing method according to claim 1, which is configured to provide at least one feature selected from the group consisting of:

i) at least part of the method is carried out by a client computing device in conjunction with a remote server;

ii) at least part of the method is embodied in a client-side script downloaded from the remote server to the client computing device for execution on the client computing device;

iii) at least part of the method is embodied in a server-side script or function executed by the remote server;

iv) a client computing device executes an application to carry out the method; and v) at least part of the method is carried out by a desktop application executing on a computing device.

30. An image processing system comprising:

a computer memory storing image size data representing a plurality of image sizes; and at least one computer processing platform that interfaces to a display device;

wherein the at least one computer processing platform and the display device cooperate to display first user interface controls on the display device to allow a user to specify a source image;

wherein the at least one computer processing platform is configured to use the image size data stored in computer memory to produce data representing a plurality of transformed images corresponding to the source image with sizes that correspond to the image sizes represented by the image size data;

wherein the at least one computer processing platform and the display device cooperate to display a display window on the display device, wherein the data representing the plurality of transformed images is used to simultaneously display representations of the plurality of transformed images in a particular area of the display window for viewing by the user;

wherein the at least one computer processing platform and the display device cooperate to display second user interface controls on the display device that allows the user to specify at least one graphic item and overlay the at least one graphic item specified by the user on the plurality of transformed images displayed in the particular area of the display window such that at least one graphic item is viewed on top of at least one of the plurality of transformed images displayed in the particular area of the display window; and wherein the at least one computer processing platform and the display device cooperate to display third user interface controls on the display device that allows the user to specify at least one text item and overlay at least one text item specified by the user on the plurality of transformed images displayed in the particular area of the display window such that at least one text item is viewed on top of at least one of the plurality of transformed images displayed in the particular area of the display window.

* * * * *